(12) United States Patent
Watanabe et al.

(10) Patent No.: US 8,159,598 B2
(45) Date of Patent: Apr. 17, 2012

(54) DISTANCE ESTIMATION APPARATUS, DISTANCE ESTIMATION METHOD, STORAGE MEDIUM STORING PROGRAM, INTEGRATED CIRCUIT, AND CAMERA

(75) Inventors: Tatsumi Watanabe, Osaka (JP);
Yasuhiro Kuwahara, Osaka (JP);
Takeshi Ito, Osaka (JP); Bumpei Toji, Gifu (JP); Daisuke Sato, Osaka (JP);
Shinya Kiuchi, Osaka (JP); Yoshiaki Owaki, Osaka (JP)

(73) Assignee: Panasonic Corporation, Osaka (JP)

( * ) Notice: Subject to any disclaimer, the term of this patent is extended or adjusted under 35 U.S.C. 154(b) by 491 days.

(21) Appl. No.: 12/542,886

(22) Filed: Aug. 18, 2009

(65) Prior Publication Data
US 2010/0046802 A1    Feb. 25, 2010

(30) Foreign Application Priority Data

Aug. 19, 2008    (JP) .................................. 2008-211055

(51) Int. Cl.
*H04N 5/232* (2006.01)
(52) U.S. Cl. .... 348/345; 348/270; 348/349; 348/E5.042
(58) Field of Classification Search .................. 348/270, 348/345, 349, E5.042
See application file for complete search history.

(56) References Cited

U.S. PATENT DOCUMENTS

| | | | |
|---|---|---|---|
| 5,748,236 A * | 5/1998 | Shibazaki | 348/270 |
| 7,330,205 B2 * | 2/2008 | Hakamata | 348/65 |
| 2002/0018649 A1 * | 2/2002 | Hakamata | 396/17 |
| 2004/0189798 A1 * | 9/2004 | Hakamata | 348/65 |
| 2005/0186754 A1 * | 8/2005 | Kim | 438/401 |
| 2006/0120595 A1 | 6/2006 | Nakamura et al. | |

FOREIGN PATENT DOCUMENTS

| | | |
|---|---|---|
| JP | 2000-121339 | 4/2000 |
| JP | 2006-84429 | 3/2006 |

* cited by examiner

*Primary Examiner* — Khanh Dinh
(74) *Attorney, Agent, or Firm* — Wenderoth, Lind & Ponack, L.L.P.

(57) ABSTRACT

Attempts to achieve a higher resolution and a higher frame rate of a distance image when a distance to an object within a target space is estimated using the TOF method would cause CCD saturation due to shot noise or environment light, and lower distance precision. A distance estimation apparatus illuminates an object with illumination light for distance estimation emitted from a light source that can emit light (electromagnetic wave) having a predetermined illumination frequency, receives reflected light of the illumination light, obtains information about the distance from the apparatus to the object, generates distance image data based on the distance information, extracts edge information of a color image formed using a visible light component obtained in synchronization with the reflected light, and corrects distance information of a target part of the distance image using distance information of a neighboring part of the target part based on the edge information.

16 Claims, 25 Drawing Sheets

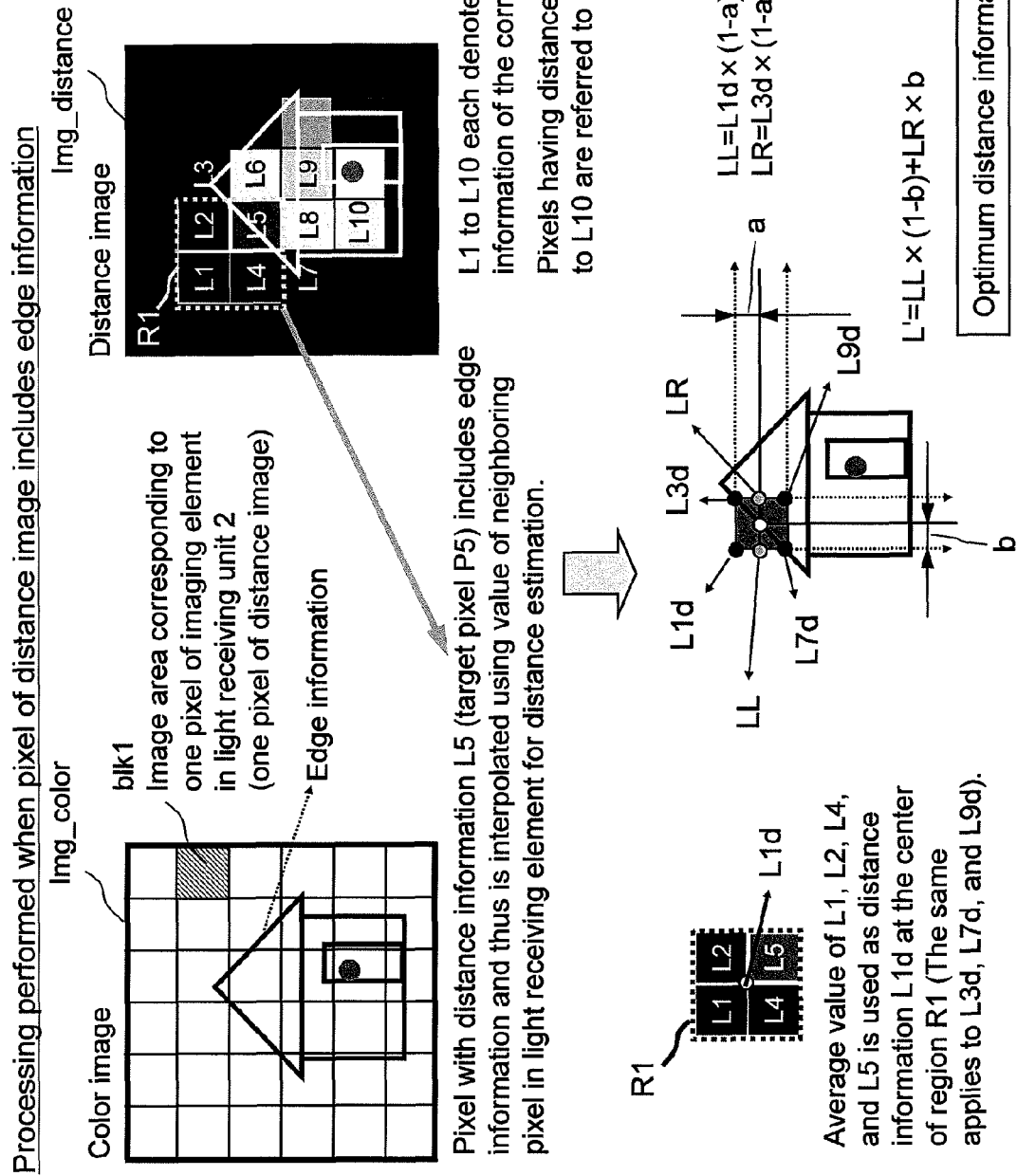

Reliability $R(i,j) = func(L(i,j), D(i,j)) = e^{-((L(i,j)^2 + (D(i,j) - MaxD)^2)/delta^2)}$

DISTANCE ESTIMATION APPARATUS, DISTANCE ESTIMATION METHOD, STORAGE MEDIUM STORING PROGRAM, INTEGRATED CIRCUIT, AND CAMERA

This application claims priority to Japanese Patent Application No 2008-211055 filed on Aug. 19, 2008, the entire disclosure of which is hereby incorporated herein by reference.

BACKGROUND OF THE INVENTION

1. Field of the Invention

The present invention relates to an apparatus and a method that enhance depth feel and stereoscopic effect of an image formed by an imaging apparatus, such as a movie camera or a digital still camera (DSC), by capturing an image of a target space and estimating a distance to an object within the target space.

2. Description of the Related Art

Three-dimensional space measuring techniques have potential applications in many fields. To put the 3D space measuring techniques into practical use, a variety of methods have been used. Typical methods include light sectioning of laser slit light using scanning, triangulation such as stereo triangulation, and a TOF method for determining a distance by illuminating a measurement-target object with illumination light and timing the time-of-flight (TOF), or the time required by the illumination light to return from the object.

The 3D space measurement using triangulation requires light scanning to be performed in a target space (a three-dimensional space whose image is to be captured) to obtain 3D information of the target space. The measurement using triangulation requires a relatively long time to obtain 3D information of the entire target space. Thus, triangulation is considered unsuitable for applications that would require, for example, tracking of a moving object.

Unlike triangulation, the 3D space measurement using the TOF method does not require such laser beam scanning. The 3D space measurement using the TOF method enables a distance to an object (distance from an imaging apparatus to an object) to be detected at a high speed in units of pixels of a television image (captured image), and also enables its distance measurement range to be set relatively large (set to about 3 meters or more). Moreover, the 3D space measurement using the TOF method does not need to use a laser light source but can use a light-emitting diode (LED), which enables safe imaging of humans. With these advantages of the TOF method, various approaches to perform the 3D space measurement using the TOF method have been reported, and commercial distance sensors that perform the 3D space measurement using the TOF method have also been reported.

With the TOF method, a distance in a three-dimensional space is determined using equation 1. The distance L, which is a distance between a measurement reference point and a measurement target point, is determined using the following equation.

Equation 1

$$L = c \cdot \Delta t / 2 \qquad (1)$$

where c is the speed of light, which is written as $c=3.0*10^8$ [m/sec], and $\Delta t$ is the time required from when light emitted from a light source, which is at the measurement reference point, illuminates a measurement target, which is at the measurement target point, to when its reflected light from the measurement target returns to the light source at the measurement reference point. In other words, $\Delta t$ is the round-trip time of the light from the light source to the measurement target.

The TOF method may be implemented based on many different methods. Typical methods are a phase TOF method and a pulse TOF method.

With the phase TOF method, a measurement-target object is illuminated mainly with a light beam having a modulated intensity, reflected light from the measurement-target object is detected and converted through photoelectronic conversion, and photoelectrons resulting from the conversion are accumulated into a plurality of accumulation units in a temporally shifted manner, and distance information is generated according to the number of photoelectrons accumulated in these accumulation units.

With the pulse TOF method, a measurement-target object is illuminated with a pulsed light beam, and a distance is measured using a phase difference between reflected light from the measurement-target object and the measurement light beam. In detail, two-dimensional scanning is performed using the measurement beam, and a distance at each measurement point is measured to obtain a three-dimensional shape.

With the phase TOF method, a distance is obtained using a phase amount $\Delta\Phi$ instead of the time $\Delta t$ in equation 1. With the phase TOF method, a distance at which the phase amount $\Delta\Phi$ is $2\pi$ (or at which $\Delta t$ is T: the one-cycle time of the modulated intensity) is a maximum detected distance Lmax, which is determined using equation 2. More specifically, the maximum detected distance Lmax depends on a modulation frequency f of the measurement light beam, and is determined using the following equation.

Equation 2

$$L_{max} = c/2f \qquad (2)$$

The distance L is determined using equation 3 with the phase amount $\Delta\Phi$.

Equation 3

$$L = (L_{max} \times \Delta\phi)/2\pi \qquad (3)$$

However, when the distance to the measurement-target object is greater than or equal to the value of the wavelength corresponding to the cycle of the intensity modulation of the measurement light beam, the phase TOF method in principle would fail to obtain a uniquely determined distance calculation result (in other words, this method would fail to determine the distance to the measurement-target object).

To obtain a distance image, the pulse TOF method requires two-dimensional scanning using a measurement light beam. The pulse TOF method requires physical scanning of a measurement light beam, such as laser light emitted from a light source, from side to side and up to down by using an oscillating mirror or a polygon mirror. The pulse TOF method consequently requires a long time to obtain a distance image.

Many currently-available techniques of 3D space measurement use the phase TOF method or the like (see, for example, Patent Citations 1 and 2). Conventional distance estimation apparatuses (conventional examples 1 and 2) using the phase TOF method will now be described.

CONVENTIONAL EXAMPLE 1

An apparatus according to conventional example 1 (technique disclosed in Patent Citation 1) will be described first.

FIG. 18 is a block diagram of a distance estimation apparatus 900 according to conventional example 1. The distance estimation apparatus 900 includes a projection unit 902 and an imaging unit 903. The projection unit 902 illuminates an object OBJ1 with illumination light S906 having a modulated amplitude. The imaging unit 903 changes the gain of imaging with time and receives reflected light S907 from the object, and forms an optical image of the object. The distance estimation apparatus 900 further includes a signal processing unit 904 and a signal generation unit 901. The signal processing unit 904 converts a video signal S904 output from the imaging unit 903 to a stereoscopic view signal S905. The signal generation unit 901 generates an illumination light modulation signal S901, an imaging gain modulation signal S902, and control signals S903a and S903b.

FIG. 19 is a schematic block diagram showing distance detection performed by the distance estimation apparatus 900 according to conventional example 1.

As shown schematically in FIG. 19, the distance estimation apparatus 900 illuminates an object with infrared light having a light intensity modulated at a high speed, and captures reflected light from the object with an ultrahigh-speed shutter.

As shown in the upper part of FIG. 19 (Ex901 in FIG. 19), the distance estimation apparatus 900 illuminates objects O1 and O2 with illumination light (measurement light beam) that is modulated in a manner that the light intensity decreases with time (for example, illumination light having a light intensity modulated in period tr1 in FIG. 19). The distance estimation apparatus 900 then captures reflected light from the objects O1 and O2 at a predetermined shutter timing and with a predetermined shutter time (shutter time ts1 in FIG. 19), and converts the reflected light to generate a captured image. The reflected light from the objects O1 and O2 is modulated in a manner that the light intensity decreases with time. More specifically, the reflected light from the object O1, which is near the distance estimation apparatus (camera) 900, has a high light intensity, whereas the reflected light from the object O2, which is far from the distance estimation apparatus 900, has a low light intensity. The illumination light is modulated in a manner that the light intensity decreases with time. Thus, the reflected light from the object O1, whose traveling time (time required by the light emitted from the distance estimation apparatus 900 to be reflected by the object O1 and to return to the distance estimation apparatus 900) is short, has a high light intensity (the light intensity of the reflected light decreases less), whereas the reflected light from the object O2, whose traveling time is long, has a low light intensity (the light intensity of the reflected light decreases more).

The distance estimation apparatus 900 captures the reflected light from the objects O1 and O2 at a predetermined shutter timing and with a predetermined shutter time (shutter time ts1 in FIG. 19). In the captured image A, an image I1 of the object O1, for which the traveling time of the illumination light is short, is bright, whereas an image I2 of the object O2 is dark. In other words, the distance information is expressed as the brightness in the captured image A.

However, the brightness of the captured image A is affected by the reflectance of each object and spatial variations of the illumination light amount and also by attenuation of the diffused reflected light over distances.

To correct the effects of the reflectance etc., the distance estimation apparatus 900 performs the processing described below.

As shown schematically in the lower part of FIG. 19 (Ex902 in FIG. 19), the distance estimation apparatus 900 illuminates the objects O1 and O2 with illumination light (measurement light beam) that is modulated in a manner that the light intensity increases with time (for example, illumination light having a light intensity modulated in period tr2 in FIG. 19). The distance estimation apparatus 900 then captures reflected light from the objects O1 and O2 at a predetermined shutter timing and with a predetermined shutter time (shutter time ts2 in FIG. 19), and converts the light to generate a captured image. The reflected light from the objects O1 and O2 is modulated in a manner that the light intensity increases with time. Thus, the reflected light from the object O1, which is near the distance estimation apparatus (camera) 900, has a low light intensity, whereas the reflected light from the object O2, which is far from the distance estimation apparatus 900, has a high light intensity.

The distance estimation apparatus 900 captures the reflected light from the objects O1 and O2 with a predetermined shutter timing and a predetermined shutter time (shutter time ts2 in FIG. 19). In the captured image B, an image I1 of the object O1, for which the traveling time of the illumination light is short, is dark, whereas an image I2 of the object O2 is bright. In other words, the distance information is expressed as the brightness in the captured image B.

The distance estimation apparatus 900 obtains the brightness ratio of the captured images A and B, and generates a distance image (distance image C in FIG. 19) from which the effects of the reflectance etc. is corrected based on the brightness ratio of the two images.

In this manner, the distance estimation apparatus 900 calculates the TOF by performing division using the two captured images. As a result, the distance estimation apparatus 900 theoretically cancels the effects of infrared light diffusion, the reflectance of each object, the direction of reflection, and background light. However, the distance estimation apparatus 900 requires reflected light from an object to have a certain level of light intensity, and thus requires a light-emitting diode (LED) array, which is formed by a plurality of LEDs, to be used as a light source. The use of the LED array as the light source would increase the size of the distance estimation apparatus 900.

CONVENTIONAL EXAMPLE 2

An apparatus according to conventional example 2 (technique disclosed in Patent Citation 2) will now be described.

FIG. 20 is a block diagram of a distance estimation apparatus 950 according to conventional example 2. The distance estimation apparatus 950 includes a light source 951, a photodetection element 952, a control circuit 953, and an image generation unit 954. The light source 951 illuminates a target space with illumination light S95 11. The photodetection element 952 receives light from the target space and outputs an electric signal with an output value reflecting the amount of the received light. The control circuit 953 controls the light source 951 and the photodetection element 952. The image generation unit 954 subjects an output from the photodetection element 952 to image generation processing. The distance estimation apparatus 950 further includes a light receiving optical system 955. As shown in FIG. 20, the photodetection element 952 includes a plurality of photosensitive units 9521, a plurality of sensitivity control units 9522, a plurality of charge accumulation units 9523, and a charge obtaining unit 9524.

The light source 951 illuminates a target space with light that has been modulated according to a modulation signal having a predetermined cycle. The photodetection element 952 captures an image of the target space. The image generation unit 954 calculates a distance to an object OBJ2 within the target space based on a phase difference between the modulation signal of the illumination light and a modulation signal of light that is reflected by the object OBJ2 and is received by the photodetection element 952.

The control circuit 953 controls a light receiving period of each photosensitive unit 9521 included in the photodetection element 952. The photosensitive unit 9521 receives light from the target space during the light receiving period. Each photosensitive unit 9521 receives light in its light receiving period that is synchronized with a different phase of a modulation signal. The photodetection element 952 outputs charge accumulated during a detection period, which corresponds to one or more cycles of a modulation signal, to the image generation unit 954. The image generation unit 954 then calculates a distance based on the amount of charge corresponding to each light receiving period accumulated during a plurality of detection periods.

FIG. 21 schematically shows a distance detection method used by the distance estimation apparatus 950 according to conventional example 2.

The distance estimation apparatus 950 according to conventional example 2 samples a light receiving signal (reflected wave) at predetermined timings in synchronization with the modulation cycle of infrared light (illuminated wave) having a light intensity that is modulated to have a sine wave $y(t)=a*\sin(2\pi t/T)+b$, and calculates the phase amount of the light receiving signal. More specifically, the distance estimation apparatus 950 according to conventional example 2 samples at four points (for example, points A0, A1, A2, and A3 in FIG. 21) per modulation cycle, and calculates a phase shift amount $\psi$ using equation 4.

Equation 4

$$A_0 = y(0) = A\sin(0 - \Psi) + B = -A\sin\Psi + B \quad (4)$$
$$A_1 = y(T/4) = A\sin(\pi/2 - \Psi) + B = A\cos\Psi + B$$
$$A_2 = y(T/2) = A\sin(\pi - \Psi) + B = A\sin\Psi + B$$
$$A_3 = y(3T/4) = A\sin(3\pi/2 - \Psi) + B = -A\cos\Psi + B$$
$$\frac{A_2 - A_0}{A_1 - A_3} = \frac{2A\sin\Psi}{2A\cos\Psi} = \tan\Psi$$
$$\Psi = \tan^{-1}\left(\frac{A_2 - A_0}{A_1 - A_3}\right)$$

The distance estimation apparatus 950 according to conventional example 2 enables distance detection with a high aperture ratio by using a special charge-coupled device (CCD) imaging element, in which a light receiving unit and a demodulation unit are integrated, to calculate the phase shift amount $\psi$, and also by using a unique method for driving the imaging element. Although the distance estimation apparatus 950 according to conventional example 2 is compact and has high resolving power, its captured image (video) has a low resolution and a low frame rate.

Patent Citation 1: Japanese Unexamined Patent Publication No. 2000-121339

Patent Citation 2: Japanese Unexamined Patent Publication No. 2006-84429

SUMMARY OF INVENTION

Technical Problem

To obtain a distance image with a higher precision using the TOF method, the distance estimation apparatus may include a larger number of photodetection elements. However, when the distance estimation apparatus includes a larger number of photodetection elements, a smaller amount of light (reflected light) would enter each photosensitive unit included in the photodetection element (a smaller amount of light would enter each pixel of the imaging element (such as a CCD)). As a result, each photosensitive unit included in the photodetection element would obtain a signal having a lower level.

Also, random noise (shot noise) Ss included in the charge amount corresponding to the photoelectric effect (shot noise Ss generated through photoelectric conversion) is proportional to the ½th power of the charge amount Ns. When a smaller amount of light enters each pixel of the imaging element (such as a CCD), the ratio of noise (shot noise) included in the charge amount obtained in each pixel of the imaging element would increase. In other words, when a smaller amount of light enters each pixel of the imaging element (such as a CCD), the signal-to-noise ratio (S/N ratio) of a signal obtained in each pixel of the imaging element would decrease. As a result, the distance obtained by the distance estimation apparatus would have a lower precision.

The problem described above may be overcome by the following countermeasures:

(1) Increasing the amount of light emission of the LED (the light source of the illumination light), and (2) Lengthening the detection period of charge (corresponding to one or more cycles) and increasing the amount of charge obtained in each pixel of the imaging element.

With these countermeasures, the accumulated charge amount of each pixel of the imaging element increases. In this case, shot noise also increases based on the principle described above. However, the ratio of the charge amount Ns, which is the charge amount obtained by converting reflected light from the object through photoelectric conversion (charge amount of the signal element), and the shot noise Ss, or the ratio SN=Ns/Ss, would be larger as the charge amount Ns is larger.

After photoelectric conversion performed in the imaging element, environment light etc. would appear as constant noise that is not dependent on the charge amount accumulated in each pixel of the imaging element. The S/N ratio of the charge amount is determined by the charge amount Ns (charge amount of the signal element), the shot noise Ss, which is proportional to the ½th power of the charge amount Ns, and the constant noise due to environment light etc. Thus, the S/N ratio of the charge amount would improve and consequently the S/N ratio of a signal obtained by the imaging element would improve as the charge amount Ns becomes larger. As a result, the distance estimation apparatus would measure a distance with higher axial resolving power.

However, the constant noise due to environment light or the like would be far greater than the charge amount (charge amount Ns) of the reflected light. Thus, when the amount of light emission of the light source of the distance estimation apparatus is increased, saturation would easily occur in each pixel of the imaging element (such as a CCD). Also, when the amount of light emission of the light source is increased, the distance estimation apparatus would have practical limitations (size, power, etc.).

Further, when the charge accumulation period of each pixel of the imaging element (such as a CCD) is lengthened, the constant noise element would increase. In this case, the S/N ratio of the amount of accumulated charge in each pixel would be lower. In other words, the amount of signal element (corresponding to the charge amount Ns) would be extremely small relative to the large amount of noise element.

Also, each pixel (photosensitive unit) of the imaging element included in the photodetection element has a limited capacity of charge accumulation. Thus, saturation may be highly likely to occur in each pixel. When saturation occurs in the photodetection element, the amount of light received in each photosensitive unit would have no correlation with the light having a modulated light intensity. The distance estimation apparatus, which uses a signal obtained from a pixel corresponding to the photosensitive unit, would fail to calculate the distance correctly based on the signal.

To solve the above problem, it is an object of the present invention to provide a distance estimation apparatus, a distance estimation method, a storage medium storing a program, and an integrated circuit that enable a distance image having a higher resolution to be formed with the TOF method by interpolating and estimating distance information between pixels of an imaging element (such as a CCD) based on distance information obtained using an imaging element (such as a CCD) having a small number of pixels. It is another object of the present invention to provide a distance estimation apparatus, a distance estimation method, a storage medium storing a program, and an integrated circuit that improve the precision of distance image data by correcting distance information of a pixel having an insufficient precision based on either the amplitude of reflected light or the value of the distance image data.

Technical Solution

A first aspect of the present invention provides a distance estimation apparatus that illuminates an object with light having a modulated light intensity and estimates a distance to an object using reflected light from the object. The distance estimation apparatus includes a light source, a light source control unit, a light receiving optical system, a color separation unit, a light receiving unit, a charge accumulation unit, a signal processing unit, a distance image generation unit, an imaging unit, a high resolution image generation unit, an edge information extraction unit, and a distance image correction unit.

The light source emits light whose light intensity can be modulated. The light source control unit controls the light source. The light receiving optical system focuses light from the object. The color separation unit separates light received by the light receiving optical system into a first light component and a second light component based on a frequency of the light. The light receiving unit converts the second light component separated by the color separation unit to obtain charge. The charge accumulation unit accumulates the charge obtained by the light receiving unit and obtains a charge signal. The signal processing unit calculates distance information based on the charge signal. The distance image generation unit generates a distance image having a first number of pixels based on the distance information. The imaging unit converts the second light component separated by the color separation unit to an image generation charge signal. The high resolution image generation unit generates a high resolution image having pixels more than the first number of pixels based on the image generation charge signal obtained by the imaging unit. The edge information extraction unit extracts edge information from the high resolution image generated by the high resolution image generation unit. The distance image correction unit corrects distance information of a target pixel of the distance image based on a neighboring pixel of the target pixel in the distance image and based on the edge information extracted by the edge information extraction unit.

The distance estimation apparatus obtains a distance image with a high precision by interpolating and estimating distance information between pixels of a distance image having a small number of pixels obtained by the light receiving unit using edge information of a high resolution image having a larger number of pixels. The distance estimation apparatus improves the precision of distance estimation without the need to increase the number of pixels of an imaging element (such as a CCD) included in the light receiving unit.

The "target pixel" refers to a pixel that is being processed by the distance estimation apparatus.

A second aspect of the present invention provides the distance estimation apparatus of the first aspect of the present invention in which when an image area of the high resolution image corresponding to the target pixel of the distance image includes edge information, the distance image correction unit corrects the distance information of the target pixel of the distance image by specifying position information $Pos(x, y)$ of the edge information in the distance image, weighting distance information of the neighboring pixel based on a positional relationship between the position information $Pos(x, y)$ and the neighboring pixel, calculating distance information of the position information $Pos(x, y)$ using the weighted distance information of the neighboring pixel, and replacing the calculated distance information of the position information $Pos(x, y)$ with the distance information of the target pixel.

When a target pixel of a distance image includes edge information extracted from a high resolution image, distance information of the target pixel may have a low precision. Thus, the distance estimation apparatus obtains distance information (interpolated distance information) by performing interpolation based on distance information of a neighboring pixel of the target pixel, and uses the interpolated distance information as the distance information of the target pixel.

Thus, the distance estimation apparatus obtains a distance image (distance information) with a high precision without the need to increase the number of pixels of the imaging element included in the light receiving unit (imaging element for distance estimation).

A third aspect of the present invention provides the distance estimation apparatus of the first aspect of the present invention in which when an image area of the high resolution image corresponding to the target pixel of the distance image includes edge information, the distance image correction unit corrects the distance information of the target pixel of the distance image by dividing the target pixel into pixel parts based on the edge information in the distance image, and calculating distance information of each pixel part using distance information of a neighboring pixel of the target pixel that is near the pixel part in the distance image.

The distance estimation apparatus divides a target pixel including edge information into pixel parts based on the edge information, and calculates an interpolated value for each pixel part based on distance information of a neighboring pixel of the pixel part that is highly correlated with the pixel part, and uses the interpolated value as distance information of the pixel part. As a result, the distance estimation apparatus improves the precision of obtained distance information (distance image).

A fourth aspect of the present invention provides a distance estimation apparatus that illuminates an object with light having a modulated light intensity and estimates a distance to an object using reflected light from the object. The apparatus includes a light source, a light source control unit, a light receiving optical system, a color separation unit, a light receiving unit, a charge accumulation unit, a signal processing unit, a distance image generation unit, a distance image storage unit, an imaging unit, a high resolution image generation unit, a high resolution image storage unit, a motion vector detection unit, and a distance image correction unit.

The light source emits light whose light intensity can be modulated. The light source control unit controls the light source. The light receiving optical system focuses light from the object. The color separation unit separates light received by the light receiving optical system into a first light component and a second light component based on a frequency of the light. The light receiving unit converts the second light component separated by the color separation unit to obtain charge. The charge accumulation unit accumulates the charge obtained by the light receiving unit and obtains a charge signal. The signal processing unit calculates distance information based on the charge signal. The distance image generation unit generates a distance image having a first number of pixels based on the distance information. The distance image storage unit stores the distance image. The imaging unit converts the second light component separated by the color separation unit to an image generation charge signal. The high resolution image generation unit generates a high resolution image having pixels more than the first number of pixels based on the image generation charge signal obtained by the imaging unit. The high resolution image storage unit stores the high resolution image. The motion vector detection unit detects a motion vector by comparing a high resolution image Img_color(t) that is obtained at a predetermined unit timing t by the high resolution image generation unit and a high resolution image Img_color(t−α) that is obtained at a timing (t−α) preceding the predetermined unit timing t and stored in the high resolution image storage unit. The distance image correction unit corrects distance information of a target pixel of the distance image based on a distance image Img_distance(t) that is obtained at the predetermined unit timing t by the distance image generation unit, a distance image Img_distance(t−α) that is obtained at the timing (t−α) preceding the predetermined unit timing t and stored in the distance image storage unit, and a motion vector that is detected by the motion vector detection unit.

The distance estimation apparatus corrects a distance image obtained at a current timing based on a motion vector, which is obtained using a high resolution image. As a result, the distance estimation apparatus improves the precision of a distance image without the need to increase the number of pixels of the imaging element included in the light receiving unit 2 (imaging element for distance estimation).

The "predetermined unit timing" refers to the timing corresponding to, for example, a single frame when a motion vector is detected in units of frames. When a motion vector is detected in units of frames, the image Img_color(t) is a frame image obtained at the timing t and the image Img_color(t−α) is a frame image obtained at a timing preceding the timing t by α frame(s) (The same applies to a distance image).

A fifth aspect of the present invention provides a distance estimation apparatus that illuminates an object with light having a modulated light intensity and estimates a distance to an object using reflected light from the object. The apparatus includes a light source, a light source control unit, a light receiving optical system, a light receiving unit, a charge accumulation unit, a signal processing unit, a distance image generation unit, a distance reliability calculation unit, and a distance image correction unit.

The light source emits light whose light intensity can be modulated. The light source control unit controls the light source. The light receiving optical system focuses light from the object. The light receiving unit converts the light received by the light receiving optical system to obtain charge. The charge accumulation unit accumulates the charge obtained by the light receiving unit and obtains a charge signal. The signal processing unit calculates distance information based on the charge signal. The distance image generation unit generates a distance image based on the distance information. The distance reliability calculation unit calculates a reliability of a pixel of the distance image based on at least one of the distance information and the charge signal. The distance image correction unit corrects distance information of the pixel of the distance image based on the reliability calculated by the distance reliability calculation unit.

The distance estimation apparatus calculates the reliability of distance information (value of distance image data) of each pixel of the distance image according to distance information of each pixel or the intensity of reflected light, and corrects the distance image data based on the calculated reliability and obtains an optimum distance image. Even when the level of reflected light (amplitude of a reflected wave) obtained at a pixel of the imaging element included in the light receiving unit is small, the distance estimation apparatus corrects distance information of a pixel corresponding to the pixel of the imaging element included in the light receiving unit based on the reliability, and effectively prevents the precision of distance estimation of the distance image from decreasing.

A sixth aspect of the present invention provides the distance estimation apparatus of the fifth aspect of the present invention in which the reliability calculation unit calculates the reliability in a manner that a value of the reliability is smaller as a value of distance information of a target pixel of the distance image is larger.

A seventh aspect of the present invention provides the distance estimation apparatus of the fifth aspect of the present invention in which the reliability calculation unit calculates the reliability in a manner that a value of the reliability is smaller as an amplitude value of the charge signal corresponding to a target pixel of the distance image is smaller.

An eighth aspect of the present invention provides a distance estimation method for illuminating an object with light having a modulated light intensity and estimating a distance to an object using reflected light from the object. The method is used by a distance estimation apparatus including a light source operable to emit light whose light intensity can be modulated, a light receiving optical system operable to focus light from the object, a color separation unit operable to separate light received by the light receiving optical system into a first light component and a second light component based on a frequency of the light, a light receiving unit operable to convert the second light component separated by the color separation unit to obtain charge, a charge accumulation unit operable to accumulate the charge obtained by the light receiving unit and obtain a charge signal, and an imaging unit operable to convert the second light component separated by the color separation unit to an image generation charge signal. The distance estimation method includes a light source control process, a signal processing process, a distance image generation process, a high resolution image generation process, an edge information extraction process, and a distance image correction process.

In the light source control process, the light source is controlled. In the signal processing process, distance information is calculated based on the charge signal. In the distance image generation process, a distance image having a first number of pixels is generated based on the distance information. In the high resolution image generation process, a high resolution image having pixels more than the first number of pixels is generated based on the image generation charge signal obtained by the imaging unit. In the edge information extraction process, edge information is extracted from the high resolution image generated in the high resolution image generation process. In the distance image correction process, distance information of a target pixel of the distance image is corrected based on a neighboring pixel of the target pixel in the distance image and based on the edge information extracted in the edge information extraction process.

The distance estimation method has the same advantageous effects as the distance estimation apparatus of the first aspect of the present invention.

A ninth aspect of the present invention provides a distance estimation method for illuminating an object with light having a modulated light intensity and estimating a distance to an object using reflected light from the object. The method is used by a distance estimation apparatus including a light source operable to emit light whose light intensity can be modulated, a light receiving optical system operable to focus light from the object, a color separation unit operable to separate light received by the light receiving optical system into a first light component and a second light component based on a frequency of the light, a light receiving unit operable to convert the second light component separated by the color separation unit to obtain charge, a charge accumulation unit operable to accumulate the charge obtained by the light receiving unit and obtain a charge signal, and an imaging unit operable to convert the second light component separated by the color separation unit to an image generation charge signal. The distance estimation method includes a light source control process, a signal processing process, a distance image generation process, a distance image storage process, a high resolution image generation process, a high resolution image storage process, a motion vector detection process, and a distance image correction process. In the light source control process, the light sources is controlled. In the signal processing process, distance information is calculated based on the charge signal. In the distance image generation process, a distance image having a first number of pixels is generated based on the distance information. In the distance image storage process, the distance image is stored. In the high resolution image generation process, a high resolution image having pixels more than the first number of pixels is generated based on the image generation charge signal obtained by the imaging unit. In the high resolution image storage process, the high resolution image is stored. In the motion vector detection process, a motion vector is detected by comparing a high resolution image Img_color(t) that is obtained at a predetermined unit timing t in the high resolution image generation process and a high resolution image Img_color(t−α) that is obtained at a timing (t−α) preceding the predetermined unit timing t and stored in the high resolution image storage process. In the distance image correction process, distance information of a target pixel of the distance image is corrected based on a distance image Img_distance(t) that is obtained at the predetermined unit timing t in the distance image generation process, a distance image Img_distance(t−α) that is obtained at the timing (t−α) preceding the predetermined unit timing t and stored in the distance image storage process, and a motion vector that is detected in the motion vector detection process.

The distance estimation method has the same advantageous effects as the distance estimation apparatus of the fourth aspect of the present invention.

A tenth aspect of the present invention provides a distance estimation method for illuminating an object with light having a modulated light intensity and estimating a distance to an object using reflected light from the object. The method is used by a distance estimation apparatus including a light source operable to emit light whose light intensity can be modulated, a light receiving optical system operable to focus light from the object, a light receiving unit operable to convert the light received by the light receiving optical system to obtain charge, and a charge accumulation unit operable to accumulate the charge obtained by the light receiving unit and obtain a charge signal. The method includes a light source control process, a signal processing process, a distance image generation unit, a distance reliability calculation process, and a distance image correction process.

In the light source control process, the light source is controlled. In the signal processing process, distance information is calculated based on the charge signal. In the distance image generation unit, a distance image is generated based on the distance information. In the distance reliability calculation process, a reliability of a pixel of the distance image is calculated based on at least one of the distance information and the charge signal. In the distance image correction process, distance information of the pixel of the distance image is corrected based on the reliability calculated in the distance reliability calculation process.

The distance estimation method has the same advantageous effects as the distance estimation apparatus of the fifth aspect of the present invention.

An eleventh aspect of the present invention provides a storage medium storing a program for enabling a computer to implement the distance estimation method of the eighth aspect of the present invention.

The storage medium storing the program has the same advantageous effects as the distance estimation apparatus of the first aspect of the present invention.

A twelfth aspect of the present invention provides a storage medium storing a program for enabling a computer to implement the distance estimation method of the ninth aspect of the present invention.

The storage medium storing the program has the same advantageous effects as the distance estimation apparatus of the fourth aspect of the present invention.

A thirteenth aspect of the present invention provides a storage medium storing a program for enabling a computer to implement the distance estimation method of the tenth aspect of the present invention.

The storage medium storing the program has the same advantageous effects as the distance estimation apparatus of the fifth aspect of the present invention.

A fourteenth aspect of the present invention provides an integrated circuit used in a distance estimation apparatus that illuminates an object with light having a modulated light intensity and estimates a distance to an object using reflected light from the object. The distance estimation apparatus includes a light source operable to emit light whose light intensity can be modulated, a light receiving optical system operable to focus light from the object, a color separation unit operable to separate light received by the light receiving optical system into a first light component and a second light component based on a frequency of the light, a light receiving unit operable to convert the second light component separated by the color separation unit to obtain charge, a charge accumulation unit operable to accumulate the charge obtained by the light receiving unit and obtain a charge signal, and an imaging unit operable to convert the second light component separated by the color separation unit to an image generation charge signal. The integrated circuit includes a light source control unit, a signal processing unit, a distance image generation unit, a high resolution image generation unit, an edge information extraction unit, and a distance image correction unit.

The light source control unit controls the light source. The signal processing unit calculates distance information based on the charge signal. The distance image generation unit generates a distance image having a first number of pixels based on the distance information. The high resolution image generation unit generates a high resolution image having pixels more than the first number of pixels based on the image generation charge signal obtained by the imaging unit. The edge information extraction unit extracts edge information from the high resolution image generated by the high resolution image generation unit. The distance image correction unit corrects distance information of a target pixel of the distance image based on a neighboring pixel of the target pixel in the distance image and based on the edge information extracted by the edge information extraction unit.

The integrated circuit has the same advantageous effects as the distance estimation apparatus of the first aspect of the present invention.

A fifteenth aspect of the present invention provides an integrated circuit used in a distance estimation apparatus that illuminates an object with light having a modulated light intensity and estimates a distance to an object using reflected light from the object. The distance estimation apparatus includes a light source operable to emit light whose light intensity can be modulated, a light receiving optical system operable to focus light from the object, a color separation unit operable to separate light received by the light receiving optical system into a first light component and a second light component based on a frequency of the light, a light receiving unit operable to convert the second light component separated by the color separation unit to obtain charge, a charge accumulation unit operable to accumulate the charge obtained by the light receiving unit and obtain a charge signal, and an imaging unit operable to convert the second light component separated by the color separation unit to an image generation charge signal. The integrated circuit includes a light source control unit, a signal processing unit, a distance image generation unit, a distance image storage unit, a high resolution image generation unit, a high resolution image storage unit, a motion vector detection unit, and a distance image correction unit.

The light source control unit controls the light source. The signal processing unit calculates distance information based on the charge signal. The distance image generation unit generates a distance image having a first number of pixels based on the distance information. The distance image storage unit stores the distance image. The high resolution image generation unit generates a high resolution image having pixels more than the first number of pixels based on the image generation charge signal obtained by the imaging unit. The high resolution image storage unit stores the high resolution image. The motion vector detection unit detects a motion vector by comparing a high resolution image Img_color(t) that is obtained at a predetermined unit timing t by the high resolution image generation unit and a high resolution image Img_color(t−α) that is obtained at a timing (t−α) preceding the predetermined unit timing t and stored in the high resolution image storage unit. The distance image correction unit corrects distance information of a target pixel of the distance image based on a distance image Img_distance(t) that is obtained at the predetermined unit timing t by the distance image generation unit, a distance image Img_distance(t−α) that is obtained at the timing (t−α) preceding the predetermined unit timing t and stored in the distance image storage unit, and a motion vector that is detected by the motion vector detection unit.

The integrated circuit has the same advantageous effects as the distance estimation apparatus of the fourth aspect of the present invention.

A sixteenth aspect of the present invention provides an integrated circuit used in a distance estimation apparatus that illuminates an object with light having a modulated light intensity and estimates a distance to an object using reflected light from the object. The distance estimation apparatus includes a light source operable to emit light whose light intensity can be modulated, a light receiving optical system operable to focus light from the object, a light receiving unit operable to convert the light received by the light receiving optical system to obtain charge, and a charge accumulation unit operable to accumulate the charge obtained by the light receiving unit and obtain a charge signal. The integrated circuit includes a light source control unit, a signal processing unit, a distance image generation unit, a distance reliability calculation unit, and a distance image correction unit.

The light source control unit controls the light source. The signal processing unit calculates distance information based on the charge signal. The distance image generation unit generates a distance image based on the distance information. The distance reliability calculation unit calculates a reliability of a pixel of the distance image based on at least one of the distance information and the charge signal. The distance image correction unit corrects distance information of the pixel of the distance image based on the reliability calculated by the distance reliability calculation unit.

The integrated circuit has the same advantageous effects as the distance estimation apparatus of the fifth aspect of the present invention.

The seventeenth aspect of the invention is a camera that includes the distance estimation apparatus according to any one of the first through seventh aspects of the invention.

The camera has the same advantageous effects as the distance estimation apparatus according to any one of the first through seventh aspects of the invention.

It should be noted that the "camera" is a concept that includes a still camera for capturing still image, a camera for capturing moving images, a camera for capturing both still image and moving images, and a camera that have a function of generating 3D image (3D moving images) from captured images (captured moving images).

It should be noted that the camera can also use a high resolution image generated by the high resolution image generation unit in the distance estimation apparatus as a captured image, or can also use a capture image obtained by an image sensor which is added to the distance estimation apparatus.

Advantageous Effects

The distance estimation apparatus, the distance estimation method, the storage medium storing the program, and the integrated circuit of the present invention enable a distance image having a higher resolution to be formed with the TOF method by interpolating and estimating distance information between pixels of an imaging element (such as a CCD) based on distance information obtained using an imaging element (such as a CCD) having a small number of pixels. The distance estimation apparatus, the distance estimation method, the storage medium storing the program, and the integrated circuit of the present invention further improve the precision of distance image data by correcting distance information of a pixel having an insufficient precision based on either the amplitude of reflected light or the value of the distance image data.

BRIEF DESCRIPTION OF THE DRAWINGS

FIG. 3A shows an overview of distance image interpolation performed with a distance estimation method according to the first embodiment.

EXPLANATION OF REFERENCE

Figure 1:
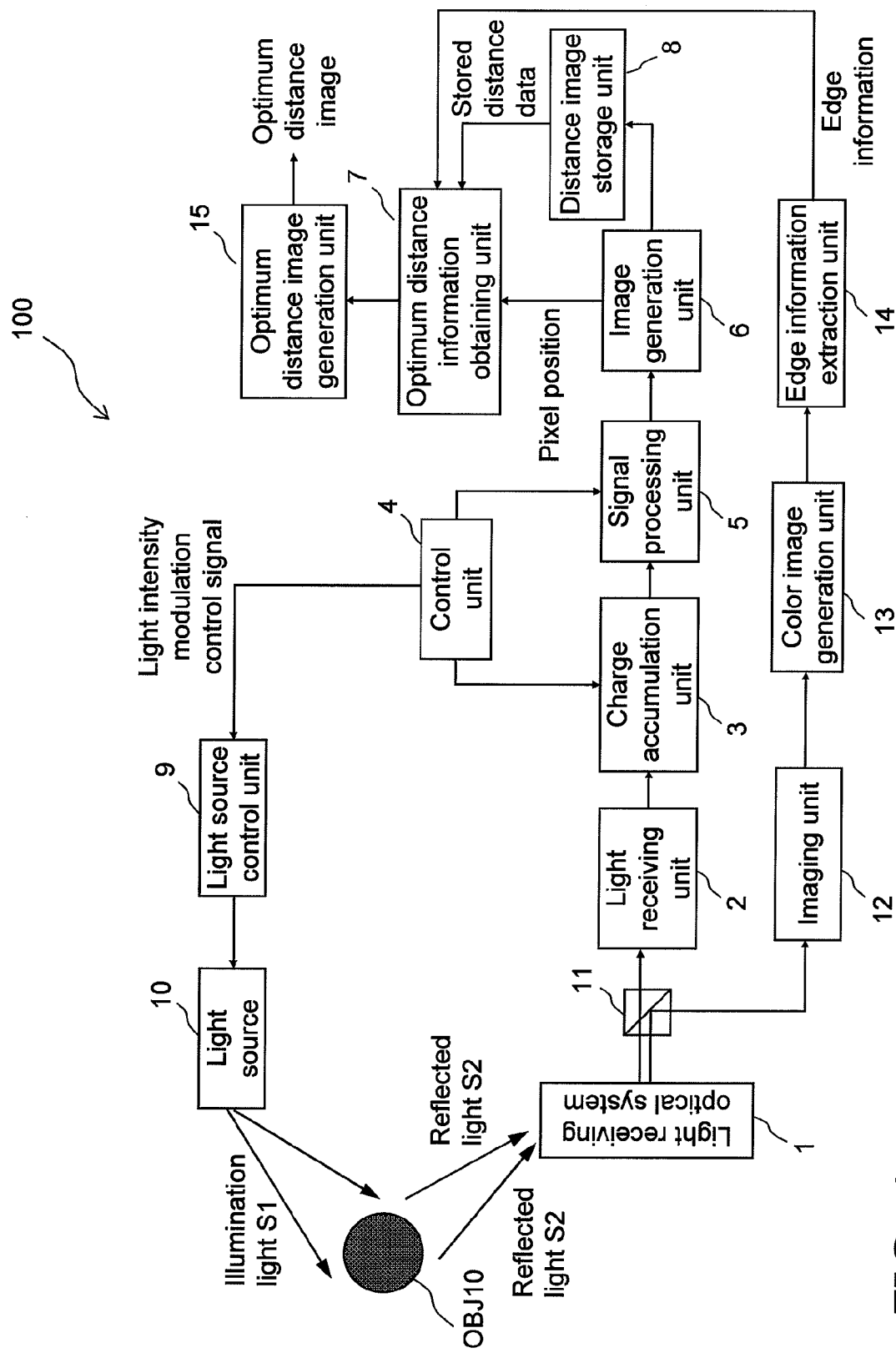
FIG. 1 is a block diagram of a distance estimation apparatus according to a first embodiment of the present invention.

100, 200, 300 distance estimation apparatus
10 light source
9 light source control unit
1 light receiving optical system
11 color separation prism
2 light receiving unit
3 charge accumulation unit
4 control unit
5 signal processing unit
6 image generation unit
7 optimum distance information obtaining unit
8 distance image storage unit
12 imaging unit
13 color image generation unit
14 edge extraction unit
15 optimum distance image generation unit
21 color image storage unit
22 motion vector detection unit
23 distance image correction unit
31 distance reliability calculation unit
32 distance image correction unit

BEST MODE FOR CARRYING OUT THE INVENTION

First to third embodiments of the present invention will now be described as the best mode for carrying out the invention.

A distance estimation apparatus and a distance estimation method according to the first embodiment enable distance estimation to be performed by illuminating an object with illumination light for distance estimation emitted from a light source, which can emit light having a predetermined light emission frequency (frequency of light (electromagnetic wave)), receiving reflected light of the illumination light, obtaining distance information, which is information about the distance from the distance estimation apparatus to the object, generating distance image data based on the obtained distance information, extracting edge information of a color image formed using a visible light component that is obtained in synchronization with the reflected light of the illumination light, and correcting distance information of a target part of the distance image based on distance information of a neighboring part of the target part.

A distance estimation apparatus and a distance estimation method according to the second embodiment enable distance estimation to be performed by illuminating an object with illumination light for distance estimation emitted from a light source, which can emit light having a predetermined light emission frequency, receiving reflected light of the illumination light, obtaining distance information, which is information about the distance from the distance estimation apparatus to the object, generating distance image data based on the obtained distance information, detecting a motion vector of a color image formed using a visible light component that is obtained in synchronization with the reflected light of the illumination light, and correcting distance information of a part of the distance image corresponding to the motion vector that is obtained at a target timing based on the detected motion vector information and distance information of the part of the distance image obtained at a timing preceding the target timing by one unit timing.

A distance estimation apparatus and a distance estimation method according to the third embodiment enable distance estimation to be performed by illuminating an object with illumination light for distance estimation emitted from a light source, which can emit light having a predetermined light emission frequency, receiving reflected light of the illumination light, obtaining distance information, which is information about the distance from the distance estimation apparatus to the object, generating distance image data based on the obtained distance information, calculating the reliability of the value of the distance image data according to the value of the distance image data or the intensity of the reflected light, and correcting the distance image data based on the calculated reliability.

First Embodiment

The first embodiment of the present invention will now be described with reference to FIGS. 1 to 5.

FIG. 1 is a schematic block diagram of a distance estimation apparatus 100 according to the first embodiment.

Figure 2:
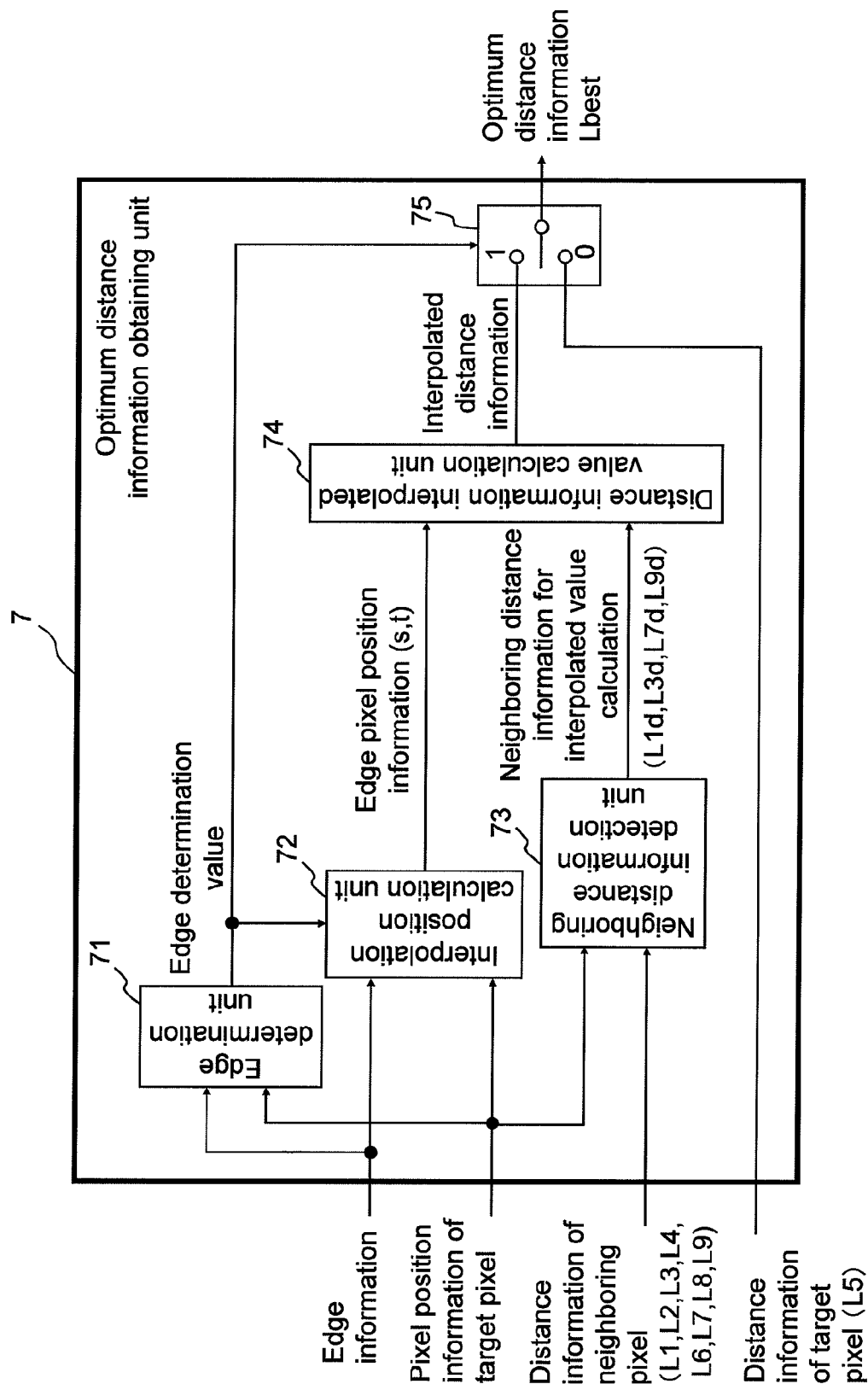
FIG. 2 is a block diagram of an optimum distance information obtaining unit according to the first embodiment.

FIG. 2 is a schematic block diagram of an optimum distance information obtaining unit 7 included in the distance estimation apparatus 100 of the first embodiment.

Figure 3B:
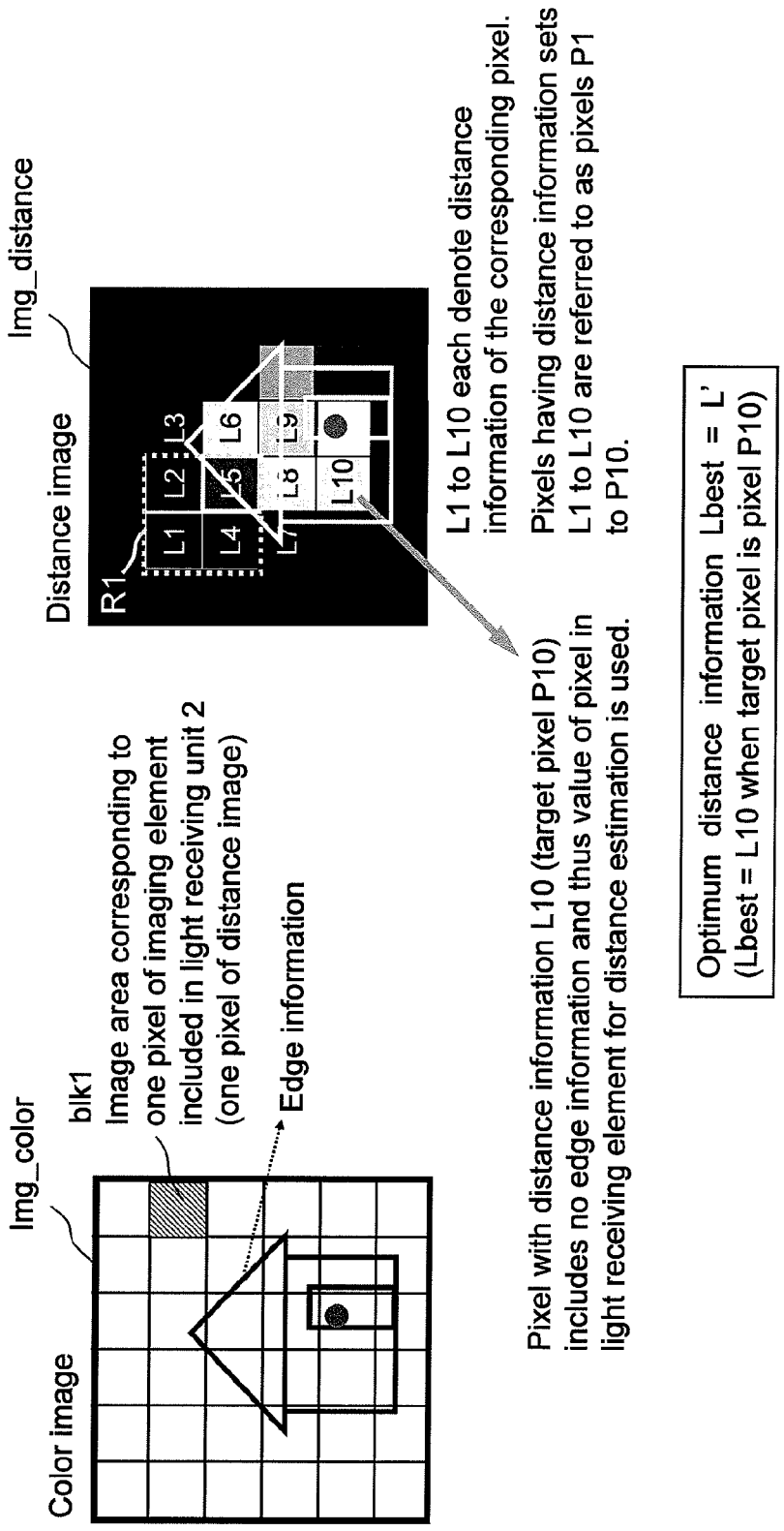
FIG. 3B shows an overview of distance image interpolation performed with the distance estimation method according to the first embodiment.

FIGS. 3A and 3B schematically show an overview of image interpolation performed with a distance estimation method according to the first embodiment.

Figure 4:
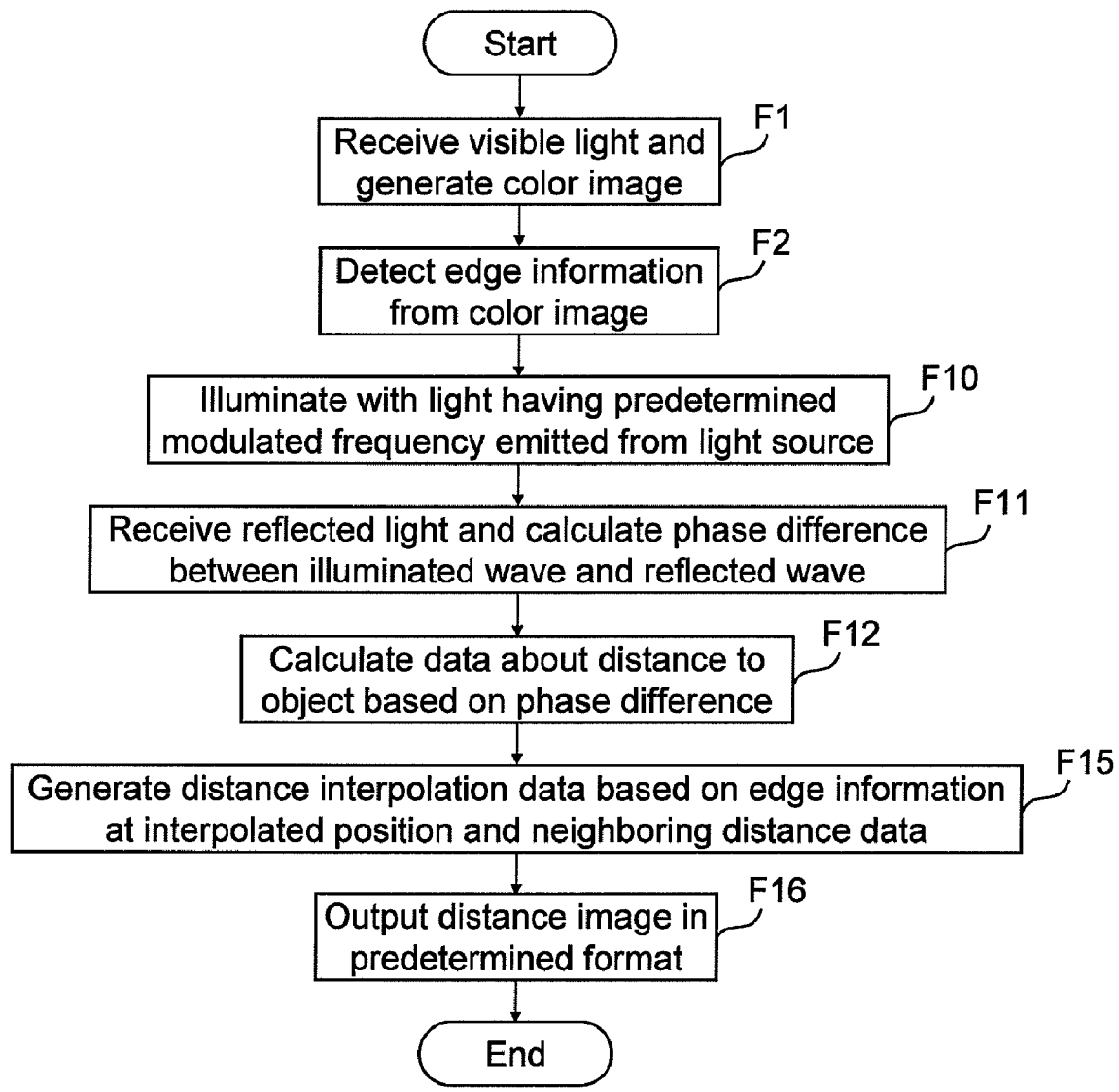
FIG. 4 is a flowchart showing the processing performed with the distance estimation method according to the first embodiment.

FIG. 4 is a flowchart showing the processing performed with the distance estimation method of the first embodiment.

Figure 5A:
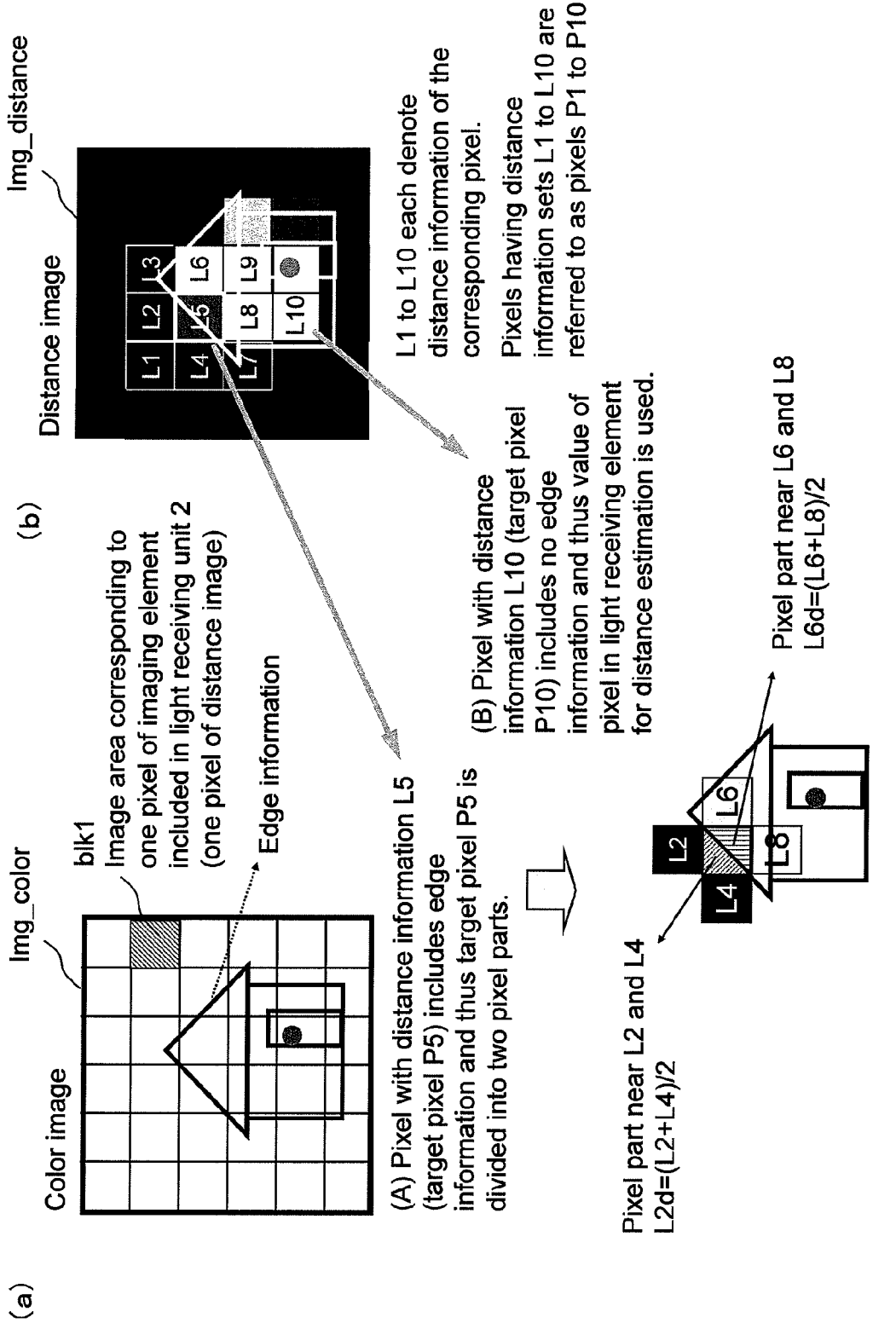
FIG. 5A shows an overview of second distance image interpolation (first modification) performed with the distance estimation method according to the first embodiment.
Figure 5B:
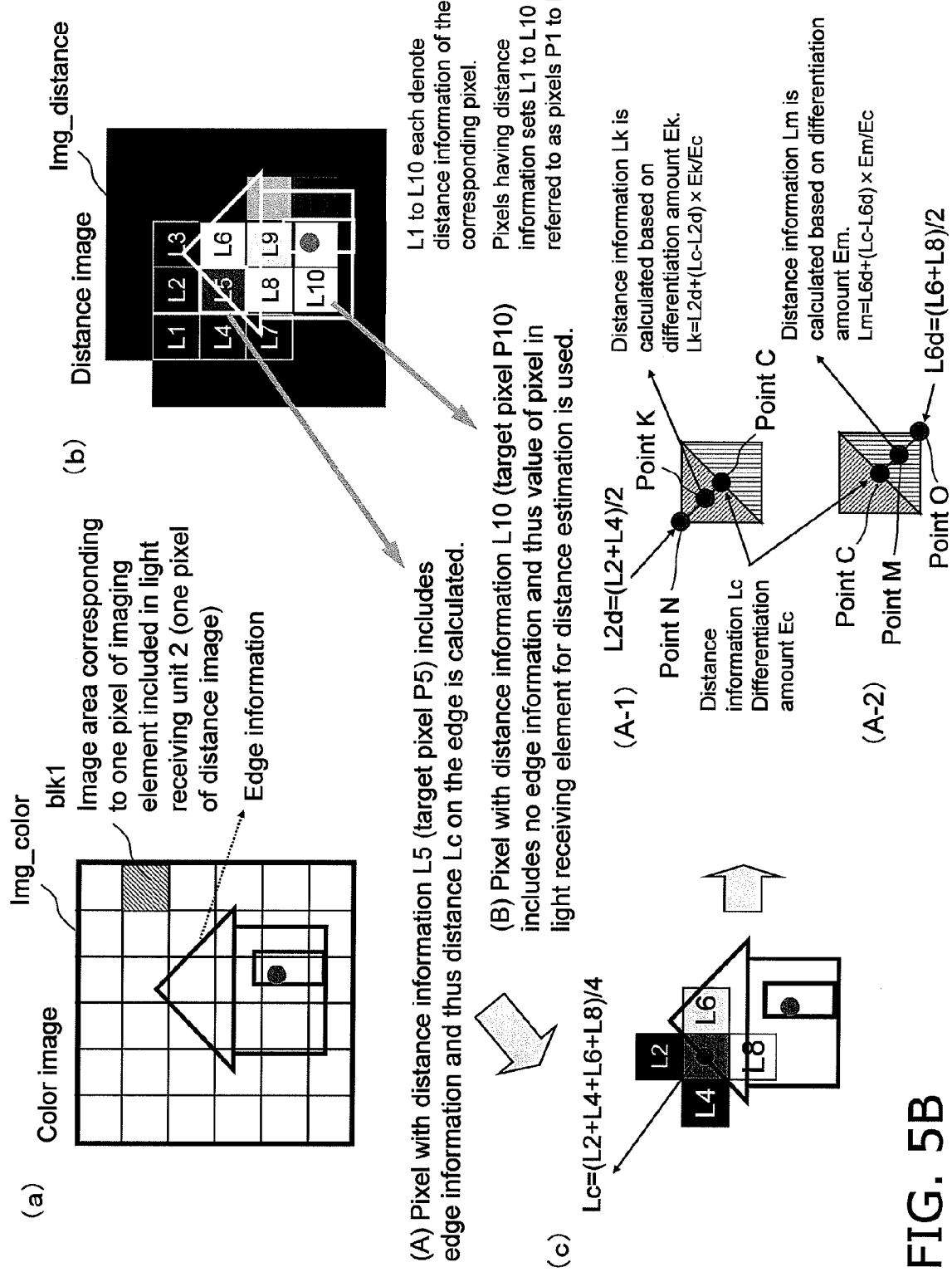
FIG. 5B shows an overview of third distance image interpolation (second modification) performed with the distance estimation method according to the first embodiment.

FIG. 5A schematically shows an overview of second image interpolation (first modification) and FIG. 5B schematically shows an overview of third image interpolation (second modification) performed with the distance estimation method of the first embodiment.

The distance estimation apparatus and the distance estimation method of the present invention enhance depth feel and stereoscopic effect of an image formed by an imaging apparatus, such as a movie camera or a digital still camera (DSC), by capturing an image of a target space and estimating a distance from the imaging apparatus to an object within the target space. The distance estimation apparatus of the present invention is mounted on, for example, an imaging device such as a digital still camera or a digital video camera, a mobile telephone used in a mobile environment, and a car mobile device or a PDA. The distance estimation method of the present invention is implemented by such devices.

1.1 Structure of the Distance Estimation Apparatus

As shown in FIG. 1, the distance estimation apparatus 100 includes a light source 10, a light source control unit 9, a light receiving optical system 1, a color separation prism 11, a light receiving unit 2, a charge accumulation unit 3, and a distance image storage unit 8. The light source 10 can emit light having a modulated light intensity. The light source control unit 9 controls the light source 10 to emit light. The light receiving optical system 1 focuses light from an object. The color separation prism 11 separates light received by the light receiving optical system 1 into a visible light component and an infrared light component (light component used for distance measurement). The light receiving unit 2 includes an element (imaging element) that converts the infrared light component separated by the color separation prism 11 through photoelectric conversion. The charge accumulation unit 3 accumulates charge resulting from the conversion performed by the light receiving unit 2 and outputs the accumulated charge as a charge signal. The distance image storage unit 8 stores a distance image generated by the image generation unit 6. The distance estimation apparatus 100 further includes an imaging unit 12, a color image generation unit 13, and an edge information extraction unit 14. The imaging unit 12 converts the visible light component separated by the color separation prism 11 through photoelectric conversion and obtains a charge signal that is used to form an image. The color image generation unit 13 generates an image based on the charge signal obtained by the imaging unit 12. The edge information extraction unit 14 extracts edge information from the image formed by the color image generation unit 13. The distance estimation apparatus 100 further includes an optimum distance information obtaining unit 7 and an optimum distance image generation unit 15. The optimum distance information obtaining unit 7 obtains optimum distance information from sets of distance information stored in the distance image storage unit 8. The optimum distance image generation unit 15 generates an optimum distance image based on the optimum distance information obtained by the optimum distance information obtaining unit 7.

The light source 10 is controlled by the light source control unit 9. As controlled by the light source control unit 9, the light source 10 can emit illumination light S1 having a modulated light intensity. The light source 10 emits light that is used for distance measurement. The light emitted from the light source 10 is preferably infrared light (X^Y denotes X to the Y-th power). Thus, it is preferable to use a light source that emits an electromagnetic wave having a frequency in an infrared region (infrared light) (for example, in a range of 1*10^6 [MHz] to 1*10^9 [MHz]) (X^Y denotes X to the Y-th power). To emit light having a frequency in an infrared region, it is preferable to use an LED light source that emits light having a frequency in an infrared region.

In the following example, infrared light is used as the light for distance measurement emitted from the light source 10.

The light source control unit 9 controls light emission from the light source 10. The light source control unit 9 also modulates the light intensity of illumination light S1 emitted from the light source 10 based on a light intensity modulation control signal, which is output from the control unit 4.

The light receiving optical system 1 focuses light from an imaging target space. The light receiving optical system 1 includes an optical lens and an optical filter.

The color separation prism 11 is an optical prism that separates the optical path (or the optical components) of light (electromagnetic wave) based on the frequency of the light. In this example, the color separation prism 11 separates reflected light S2 focused by the light receiving optical system 1 into an infrared light component, which is used for distance estimation, and a visible light component, which is used to form a color image. The infrared light component (electromagnetic wave) for distance measurement, which is separated by the color separation prism 11, enters the light receiving unit 2, whereas the visible light component (electromagnetic wave) for a color image, which is separated by the color separation prism 11, enters the imaging unit 12.

The light receiving unit 2 includes an imaging element consisting of a plurality of pixels. Each pixel of the imaging element includes a photoelectric converter, such as a photo diode. The light receiving unit 2 obtains, pixel by pixel, charge determined according to the amount of received light that has been converted through photoelectric conversion. The charge obtained by the light receiving unit 2 is output to the charge accumulation unit 3. When infrared light is emitted from the light source 10, it is preferable to use a charge-coupled device (CCD) for infrared light as the imaging element included in the light receiving unit 2. Also, to cut electromagnetic waves outside an infrared region, a filter (optical filter) for filtering infrared light may be arranged at a position preceding the imaging element of the light receiving unit 2.

The charge accumulation unit 3 accumulates charge resulting from photoelectric conversion performed by the light receiving unit 2 based on a predetermined charge accumulation time, which is set by the control unit 4, and obtains a charge signal Di. The charge accumulation unit 3 then outputs the obtained charge signal Di to a signal processing unit 5 in response to a command provided from the control unit 4.

The signal processing unit 5 subjects the charge signal Di output from the charge accumulation unit 3 to, for example, the processing expressed by equation 4 to calculate distance information Li. The charge signal Di corresponds to a pixel i of the imaging element included in the light receiving unit 2, and the distance information Li corresponds to the pixel i. The signal processing unit 5 outputs the calculated distance information Li to the image generation unit 6.

The control unit 4 outputs a light intensity modulation control signal to the light source control unit 9. The light source control unit 9 controls the intensity of light emitted from the light source 10 to be modulated based on the light intensity modulation control signal. The control unit 4 then obtains the amount of charge accumulated in the charge accumulation unit 3 at a predetermined timing in synchronization with the modulation cycle of the illumination light S1, whose light intensity has been modulated based on the light intensity modulation control signal. The control unit 4 then controls the charge accumulation unit 3 to output the obtained charge to the signal processing unit 5 as a charge signal Di. The control unit 4 then controls the signal processing unit 5 to subject the charge signal Di to, for example, the processing expressed by equation 4.

The "predetermined timing" refers to a timing equivalent to sampling performed at four points (for example, points A0 to A4 in equation 4) per modulation cycle of the illumination light S1, whose light intensity has been modulated based on the light intensity modulation control signal. The number of sampling points per modulation cycle of the illumination light S1 should not be limited to four.

When the number of sampling points per modulation cycle of the illumination light S1 is four, the signal processing unit 5 subjects the charge signal Di, which is output from the charge accumulation unit 3, to the processing expressed by equation 4. As a result, the signal processing unit 5 obtains a phase shift amount $\psi$, and further easily obtains distance information Li.

The image generation unit 6 receives the distance information Li calculated by the signal processing unit 5, and generates a distance image based on the distance information Li. The "distance image" refers to a two-dimensional image corresponding to the pixel i of the imaging element included in the light receiving unit 2. More specifically, the value of a part of the distance image corresponding to the pixel i is the distance information corresponding to the pixel i. In other words, the value of the part of the distance image corresponding to the pixel i is the value of a distance from the distance estimation apparatus 100 to an object within the imaging target space corresponding to the pixel i. The value of the part of the distance image corresponding to the pixel i may not be directly the value of the distance, but may be a value that has a correlation with the distance.

The distance image storage unit 8 receives the distance image generated by the image generation unit 6, and stores the distance image.

The imaging unit 12 includes an imaging element consisting of a plurality of pixels, each of which includes a photoelectric converter, such as a photo diode. The imaging unit 12 obtains and accumulates, pixel by pixel, the charge according to the amount of light that has been converted through photoelectric conversion. The imaging unit 12 then outputs the accumulated charge to the color image generation unit 13. The imaging unit 12 may preferably be a CCD image sensor or a complementary metal oxide semiconductor (CMOS) image sensor.

The color image generation unit 13 receives the charge that is output pixel by pixel from the imaging unit 12, and generates a color image signal based on the received charge. The color image generation unit 13 outputs the generated color image signal to the edge information extraction unit 14.

The edge information extraction unit 14 extracts an edge pixel from the color image signal generated by the color image generation unit 13, and obtains (or extracts) edge information. The edge information extraction unit 14 then outputs the extracted edge information to the optimum distance information obtaining unit 7.

The optimum distance information obtaining unit 7 receives the edge information output from the edge information extraction unit 14, distance information of a neighboring pixel of the target pixel, which is output from the distance image storage unit 8, distance information of the target pixel, which is output from the image generation unit 6, and information about the pixel position of the target pixel. The optimum distance information obtaining unit 7 obtains optimum distance information based on the pixel position information of the target pixel, the distance information of the target pixel, and the distance information of the neighboring pixel of the target pixel, and outputs the obtained optimum distance information to the optimum distance image generation unit 15. The "target pixel" refers to a pixel (in the distance image) for which distance information is to be calculated (processing target pixel).

The optimum distance information obtaining unit 7 may have the structure shown in FIG. 2. As shown in FIG. 2, the optimum distance information obtaining unit 7 includes an edge determination unit 71, an interpolation position calculation unit 72, a neighboring distance information detection unit 73, a distance information interpolated value calculation unit 74, and a switch 75.

The edge determination unit 71 receives the edge information output from the edge information extraction unit 14 and the pixel position information of the target pixel output from the image generation unit 6, and determines whether the target pixel includes an edge based on the edge information. More specifically, the edge determination unit 71 determines whether an image area of an image that is formed using a color image signal generated by the color image generation unit 13 corresponding to the target pixel of the distance image includes an edge. When determining that the image area corresponding to the target pixel of the distance image includes an edge, the edge determination unit 71 sets an edge determination value to 1 and outputs the edge determination value of 1. When determining that the image area corresponding to the target pixel of the distance image includes no edge, the edge determination unit 71 sets the edge determination value to 0 and outputs the edge determination value of 0. The edge determination unit 71 outputs the edge determination value to the interpolation position calculation unit 72 and the switch 75. Alternatively, the edge determination unit 71 may output the edge determination value to the neighboring distance information detection unit 73 and the distance information interpolated value calculation unit 74.

The interpolation position calculation unit 72 receives the edge information output from the edge information extraction unit 14, the pixel position information of the target pixel output from the image generation unit 6, and the edge determination value output from the edge determination unit 71. The interpolation position calculation unit 72 operates only when the edge determination value is set at 1 (only when the image area includes an edge), and calculates edge pixel position information based on the edge information and the pixel position information of the target pixel. The interpolation position calculation unit 72 outputs the calculated edge pixel position information to the distance information interpolated value calculation unit 74.

The neighboring distance information detection unit 73 receives the pixel position information of the target pixel output from the image generation unit 6 and the distance information of the neighboring pixel of the target pixel output from the distance image storage unit 8, and obtains neighboring distance information, which will be used to calculate an interpolated value. The neighboring distance information detection unit 73 outputs the obtained neighboring distance information for calculating an interpolated value to the distance information interpolated value calculation unit 74.

The distance information interpolated value calculation unit 74 receives the edge pixel position information output from the interpolation position calculation unit 72 and the neighboring distance information for calculating an interpolated value output from the neighboring distance information detection unit 73. The distance information interpolated value calculation unit 74 calculates interpolated distance information Li' based on the edge pixel position information and the neighboring distance information for calculating an interpolated value. The distance information interpolated value calculation unit 74 outputs the interpolated distance information Li' to the switch 75.

The switch 75 receives the interpolated distance information Li' output from the distance information interpolated value calculation unit 74 and the distance information Li of the target pixel output from the image generation unit 6, and switches its output based on the edge determination value output from the edge determination unit 71. More specifically, the switch 75 outputs the interpolated distance information Li' of the target pixel when the edge determination value is set at 1 (when the image area includes an edge), and outputs the distance information Li of the target pixel when the edge determination value is set at 0 (when the image area includes no edge).

The optimum distance information obtaining unit 7 outputs, as optimum distance information, the output from the switch 75 to the optimum distance image generation unit 15.

The optimum distance image generation unit 15 receives the optimum distance information output from the optimum distance information obtaining unit 7, and generates an optimum distance image based on the optimum distance information. The optimum distance image generation unit 15 then outputs the generated optimum distance image.

1.2 Operation of the Distance Estimation Apparatus

The operation of the distance estimation apparatus 100 with the above-described structure and the distance estimation method that is implemented by the distance estimation apparatus 100 will now be described with reference to FIGS. 1 to 5.

In the distance estimation apparatus 100, the light source control unit 9 first controls the light source 10 to emit light. In that state, light from a target object OBJ10 enters the light receiving optical system 1.

The light entering the light receiving optical system 1 is separated by the color separation prism 11 into an infrared light component, which is used for distance estimation, and a visible light component, which is used to form a color image.

In each pixel of the light receiving unit 2, the infrared light component used for distance estimation is converted through photoelectric conversion and is obtained as charge.

The charge obtained in the light receiving unit 2 is accumulated by the charge accumulation unit, and is output, as a charge signal Di, to the signal processing unit 5. More specifically, the amount of charge accumulated in the charge accumulation unit 3 at a predetermined timing synchronized with the modulation cycle of the illumination light Si is obtained in response to a command provided from the control unit 4. The illumination light Si has a light intensity modulated based on the light intensity modulation control signal. The amount of accumulated charge is then output to the signal processing unit 5 as a charge signal Di. The "predetermined timing" refers to a timing corresponding to sampling performed at four points (for example, points A0 to A4 in equation 4) per modulation cycle of the illumination light S1, which has a light intensity modulated based on the light intensity modulation control signal. For ease of explanation, the number of sampling points per modulation cycle of the illumination light S1 is assumed to be four in the following example.

The signal processing unit 5 subjects an input charge signal Di (charge signal Di obtained by sampling at four points per modulation cycle of the illumination light S1) to the processing expressed by equation 4 and obtains a phase shift amount $\psi$. The signal processing unit 5 then subjects the phase shift amount $\psi$ to the processing expressed by equation 3 and obtains distance information Li of the pixel i.

The distance information Li obtained by the signal processing unit 5 is output to the image generation unit 6.

The image generation unit 6 generates a distance image based on the distance information Li, which is obtained by the signal processing unit 5.

To sum up the processing performed in the distance estimation apparatus 100, the light receiving unit 2 receives the reflected light S2, the control unit 4 controls the charge signal Di, which is obtained through the conversion and accumulation performed by the light receiving unit 2 and the charge accumulation unit 3, and the signal processing unit 5 converts the charge signal Di to obtain the distance information Li of the corresponding pixel i.

Figure 19:
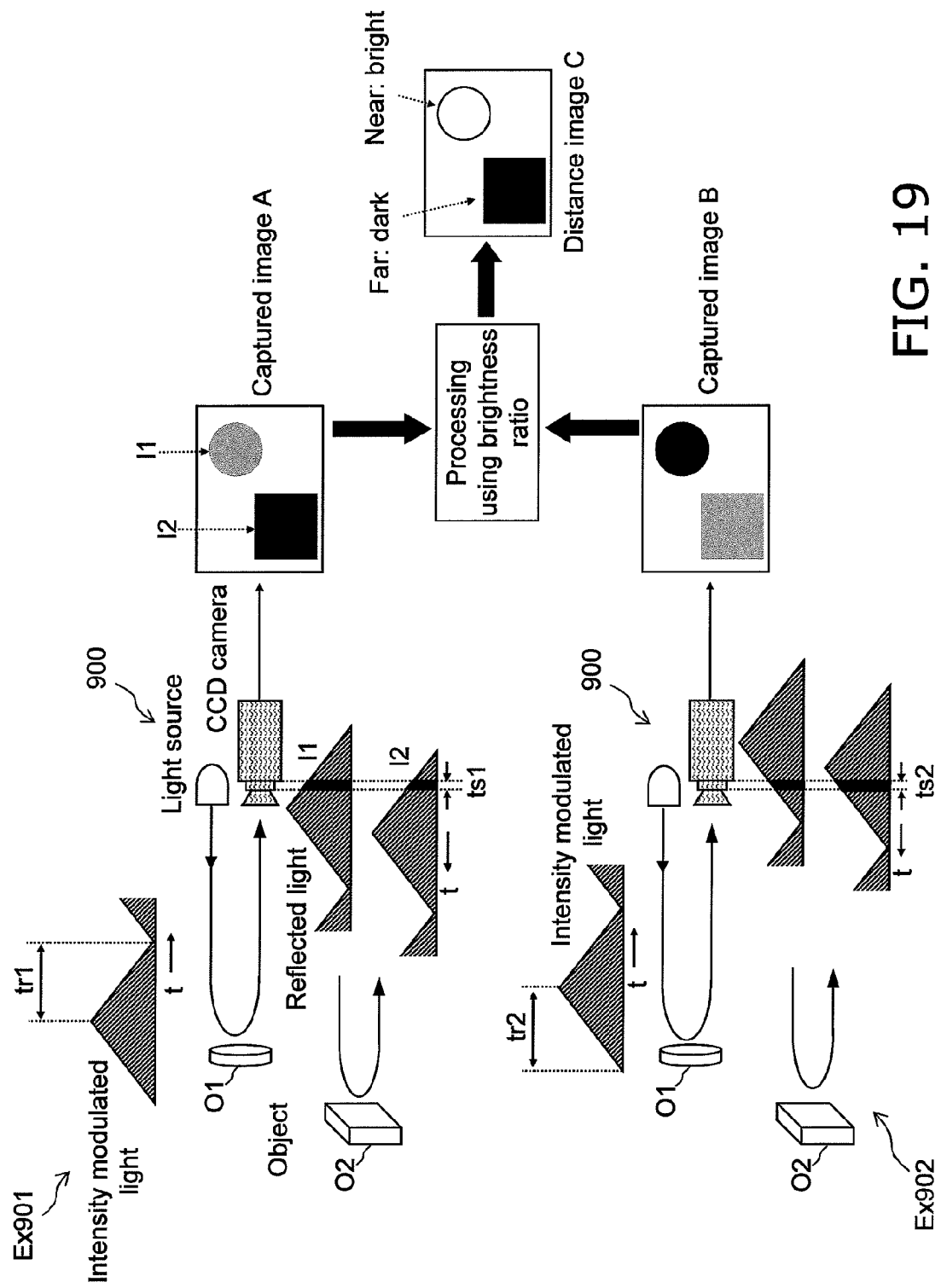
FIG. 19 shows an overview of a distance estimation method according to conventional example 1.
Figure 20:
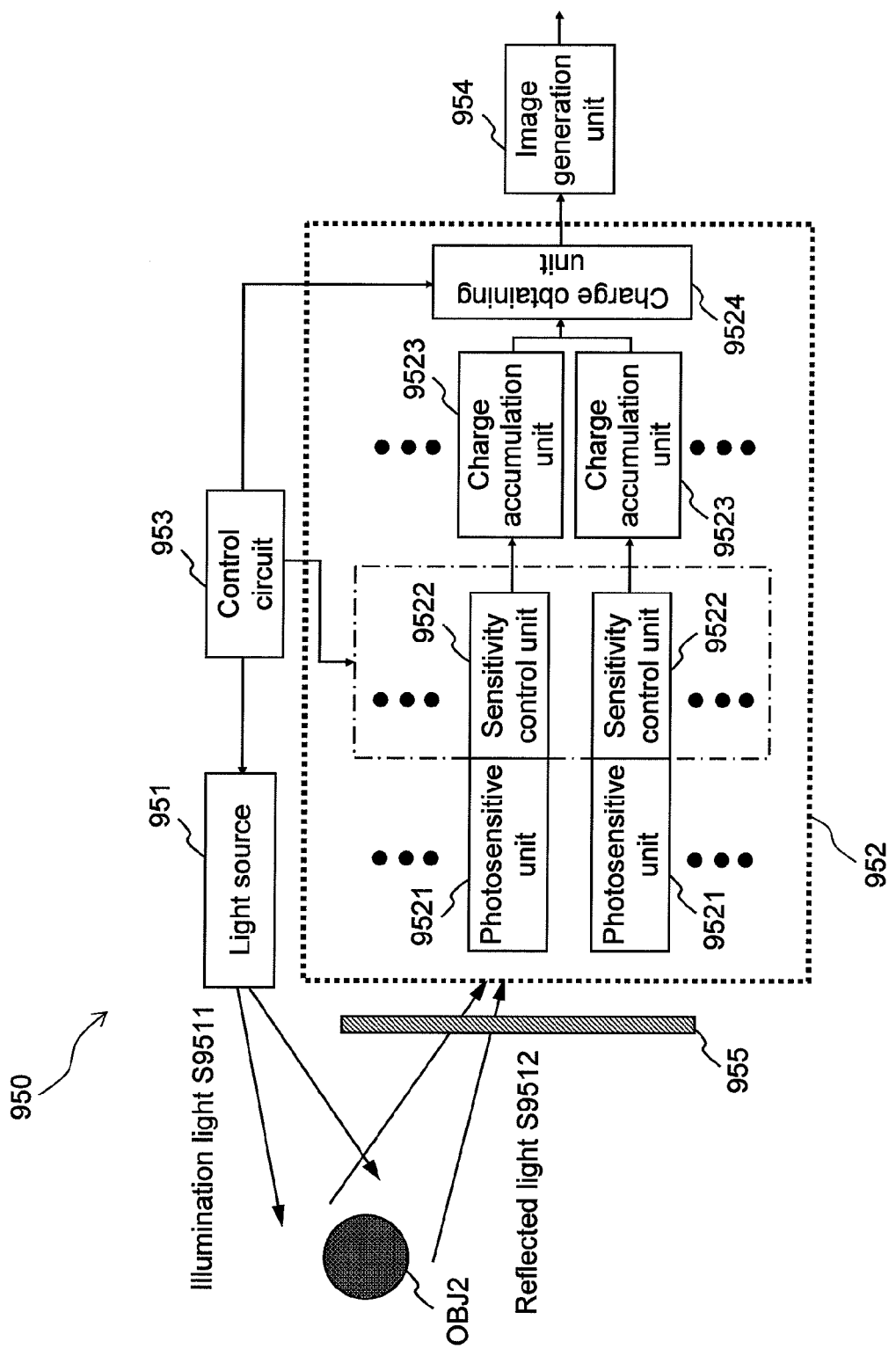
FIG. 20 is a block diagram of a distance estimation apparatus according to conventional example 2.
Figure 21:
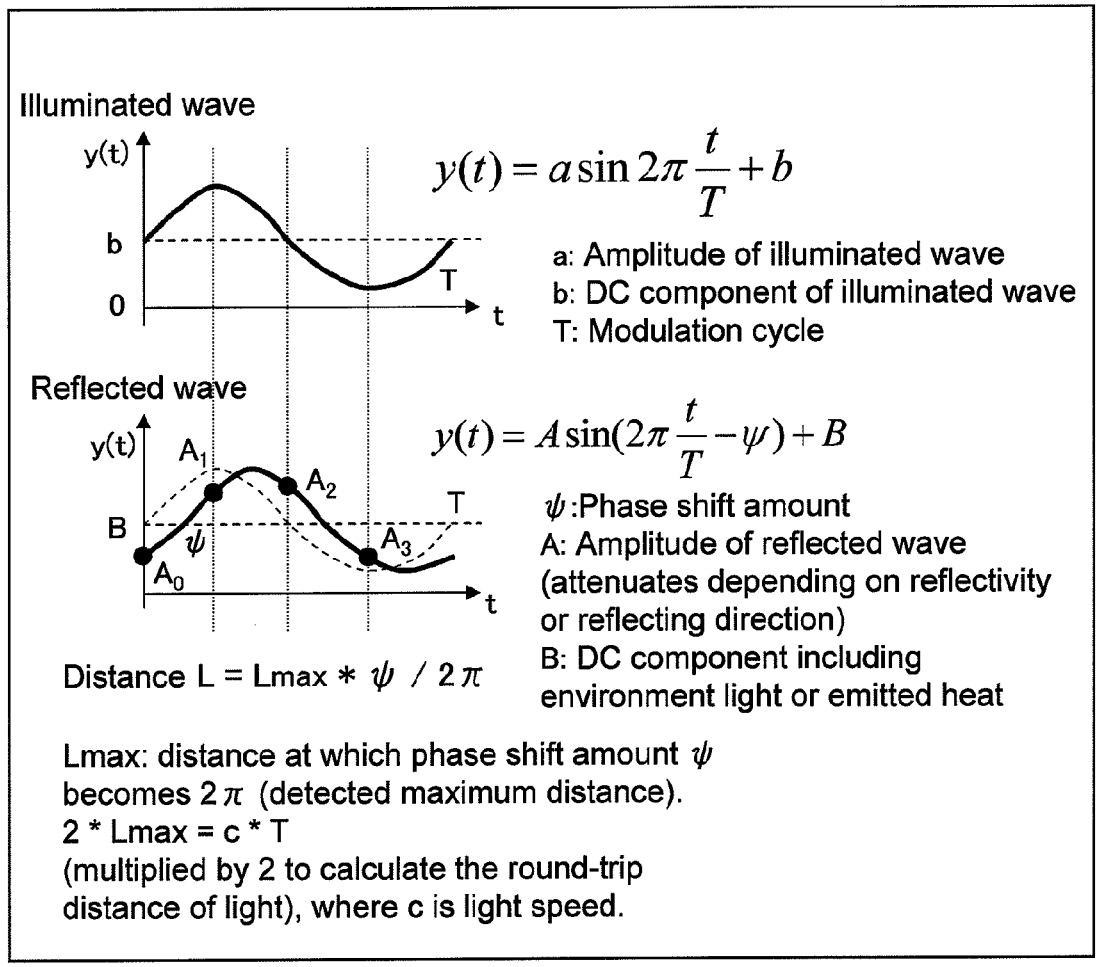
FIG. 21 shows an overview of a distance estimation method according to conventional example 2.

In the same manner as in the apparatus according to conventional example 2, the distance estimation apparatus 100 samples the charge signal Di at four points (points A0, A1, A2, and A3) per modulation cycle shown in FIG. 19 and obtains the phase shift amount $\psi$ using equation 4. The distance estimation apparatus 100 then substitutes the obtained phase amount $\psi$ (phase amount calculated using the four points A0 to A3) into equation 3, and obtains the distance information Li of the pixel i.

The distance image storage unit 8 stores a distance image generated by the image generation unit 6.

The visible light component for forming a color image, which is separated by the color separation prism 11, is received and accumulated by the imaging unit 12, and is converted by the color image generation unit 13 to obtain a color image signal (image data). The color image signal obtained by the color image generation unit 13 is then output to the edge information extraction unit 14.

The edge information extraction unit 14 calculates a differential vector vd(i, j) (xd(i, j), yd(i, j)) of each pixel (i, j) included in the image by two-dimensional filtering (processing expressed by equation 6) performed using a two-dimensional filter having a size of 3 by 3 pixels, which is expressed by equation 5. The edge information extraction unit 14 calculates the magnitude stv(ij) of the differential vector vd(i, j) using the equation $$stv(ij)=(xd(i,j)*xd(i,j)+yd(i,j)*yd(i,j))^{0.5}.$$

The edge information extraction unit 14 extracts an edge pixel by comparing the differential vector magnitude stv(i, j) of each pixel (i, j) with the processing expressed by equation 7 using a predetermined threshold TH2. Equation 7 expresses binarization that is performed to indicate whether each pixel of an image formed using a color image signal is a pixel included in the edge (edge pixel). When E(i, j)=1, the pixel (i, j) is an edge pixel.

Equation 5

$$fx = \begin{bmatrix} fx_{00} & fx_{10} & fx_{20} \\ fx_{01} & fx_{11} & fx_{21} \\ fx_{02} & fx_{12} & fx_{22} \end{bmatrix} = \begin{bmatrix} -1 & 0 & 1 \\ -2 & 0 & 2 \\ -1 & 0 & 1 \end{bmatrix}, \quad (5)$$

$$fy = \begin{bmatrix} fy_{00} & fy_{10} & fy_{20} \\ fy_{01} & fy_{11} & fy_{21} \\ fy_{02} & fy_{12} & fy_{22} \end{bmatrix} = \begin{bmatrix} -1 & -2 & -1 \\ 0 & 0 & 0 \\ 1 & 2 & 1 \end{bmatrix}$$

Equation 6

$$xd(i, j) = \sum_{n=-1}^{1} \sum_{m=-1}^{1} fx_{n+1\,m+1} \cdot k(i-n, j-m) \quad (6)$$

$$yd(i, j) = \sum_{n=-1}^{1} \sum_{m=-1}^{1} fy_{n+1\,m+1} \cdot k(i-n, j-m)$$

Equation 7

$$E(i, j) = \begin{bmatrix} 1 & \text{if } (stv(i, j) \geq TH2) \\ 0 & \text{if } (stv(i, j) < TH2) \end{bmatrix} \quad (7)$$

The edge information E(i, j) (hereafter may be referred to simply as "edge information Ei") obtained by the edge information extraction unit 14 is then output to the optimum distance information obtaining unit 7.

An image (image formed using a color image signal) generated by the color image generation unit 13 has a higher resolution than a distance image generated by the image generation unit 6. In the distance estimation apparatus 100, the number of pixels of the imaging element included in the light receiving unit 2, which is used for distance estimation, is smaller than the number of pixels of the imaging element included in the imaging unit 12, which is used for color image generation. More specifically, the imaging element used for distance estimation is not required to have a resolution so high as the resolution of the imaging element used for color image generation. Thus, the imaging element included in the light receiving unit 2 may consist of less pixels than the imaging element included in the imaging unit 12 used for color image generation.

The precision of distance estimation (measurement) may decrease due to shot noise or environment light etc. generated when the number of light receiving elements included in the light receiving unit 2 (number of pixels of the imaging element included in the light receiving unit 2) is increased to improve the resolution of a distance image. To prevent the precision of distance estimation from decreasing, it is preferable that the light receiving unit 2 include a small number of elements (or the resolution of the distance image be low).

Thus, the number of pixels of the imaging element included in the light receiving unit 2 is hereafter assumed to be smaller than the number of pixels of the imaging element included in the imaging unit 12 in the distance estimation apparatus 100.

In one example, the optimum distance information obtaining unit 7 has the structure shown in FIG. 2. FIG. 3A schematically shows an overview of the processing performed by the optimum distance information obtaining unit 7 when a pixel of a distance image includes edge information. FIG. 3B schematically shows an overview of the processing performed by the optimum distance information obtaining unit 7 when a pixel of a distance image includes no edge information. In the distance images shown in FIGS. 3A and 3B, a pixel has distance information indicating a shorter distance as the pixel is brighter (or as the brightness of the pixel is higher). In other words, a pixel has distance information indicating a shorter distance between an imaging space (object) corresponding to the pixel and the distance estimation apparatus in a three-dimensional space as the pixel is brighter.

The processing performed by the optimum distance information obtaining unit 7 performed when a pixel of a distance image includes edge information will now be described.

A color image Img_color shown in FIG. 3A, which is an image formed using a color image signal generated by the color image generation unit 13, includes edge information extracted by the edge information extraction unit 14. Each block of the color image Img_color in FIG. 3A is an image area corresponding to one pixel of the distance image. More specifically, an image area blk1 in the color image Img_color corresponds to one pixel of the distance image. The image area blk1 includes a plurality of pixels of the color image. More specifically, the number of pixels forming the color image is larger than the number of pixels forming the distance image. In other words, the size of each pixel of the color image is smaller than the size of each pixel of the distance image.

In the color image Img_color in FIG. 3A, each pixel of the corresponding distance image Img_distance is expressed as a block, which is defined by dividing the color image (block consisting of a plurality of pixels forming the color image Img_color). In this case, each pixel of the distance image Img_distance generated with the TOF method corresponds to each block of the color image Img_color. Distance information of the distance image is also obtained in units of blocks of the color image img_color. As a result, the distance image is coarser than the color image.

The distance image Img_distance shown in FIG. 3A is generated by the image generation unit 6. Reference numerals L1 to L10 written within pixels respectively denote the distance information Li of the pixels P1 to P10. In the distance image Img_distance in FIG. 3A, pixels having distance information L1 to L10 are referred to as pixels P1 to P10.

1.2.1 Processing Performed When a Target Pixel of a Distance Image Includes Edge Information The processing performed when the target pixel of the distance image includes edge information will now be described.

The processing performed when the target pixel is the pixel P5 will be described with reference to FIGS. 2 and 3A.

When the target pixel is the pixel P5, the edge determination unit 71 determines whether the target pixel P5 includes edge information (whether the target pixel includes an edge) based on pixel position information of the target pixel P5 and edge information E(i, j) in an image area of the color image corresponding to the target pixel P5. In this example, the target pixel P5 includes edge information. Thus, the edge determination unit 71 sets the edge determination value to 1 and outputs the edge determination value of 1.

The interpolation position calculation unit 72 next obtains the pixel position Pedg(s, t) of the pixel including the edge information. The pixel position Pedg(s, t) of the pixel including the edge information, which is obtained by the interpolation position calculation unit 72, is output to the distance information interpolated value calculation unit 74.

The neighboring distance information detection unit 73 obtains distance information sets $L1d$, $L3d$, $L7d$, and $L9d$ corresponding to the four corners of the target pixel P5 using pixels P1, P2, P3, P4, P6, P7, P8, and P9, which are adjacent to the target pixel P5 in distance image Img_distance. The processing will be described in more detail focusing on the region R1 shown in FIG. 3A as one example.

As shown in FIG. 3A, the neighboring distance information detection unit 73 obtains the distance information set $L1d$, which corresponds to the central position of the region R1 or corresponds to the upper left corner of the target pixel P5, by performing the processing expressed by equation 8 using the distance information set $L1$ of the target pixel P1 and the distance information sets $L1$, $L2$, and $L4$ of the pixels P1, P2, and P4 adjacent to the target pixel P5.

In the same manner, the neighboring distance information detection unit 73 obtains the distance information set $L3d$ corresponding to the upper right corner of the target pixel P5, the distance information set $L7d$ corresponding to the lower left corner of the target pixel P5, and the distance information set $L9d$ corresponding to the lower right corner of the target pixel P5 by performing the processing expressed by equation 8.

Equation 8

$$L1d=(L1+L2+L4+L5)/4$$

$$L3d=(L2+L3+L5+L6)/4$$

$$L7d=(L4+L5+L7+L8)/4$$

$$L9d=(L5+L6+L8+L9)/4 \qquad (8)$$

The distance information sets $L1d$, $L3d$, $L7d$, and $L9d$ corresponding to the four corners of the target pixel P5 (referred to as "neighboring distance information sets used for interpolated value calculation"), which are obtained by the neighboring distance information detection unit 73, are then output to the distance information interpolated value calculation unit 74.

The distance information interpolated value calculation unit 74 obtains interpolated distance information $L'$ of the target pixel P5 using the neighboring distance information sets $L1d$, $L3d$, $L7d$, and $L9d$ for interpolated value calculation and the pixel position Pedg(s, t) of the pixel including the edge information.

As shown in FIG. 3A, when the horizontal distance from a vertical line linking the target pixel edges Pos($L1d$) and Pos($L7d$) to the interpolation position (the position of the pixel including the edge information) Pedg(s, t) is the distance b and the vertical distance from a vertical line linking the target pixel edges Pos($L1d$) and Pos($L3d$) to the position Pedg(s, t) is the distance a, the interpolated value $L'$ for the position Pedg(s, t) is calculated using equation 9. Both the distances a and b are values obtained when the distance between pixels of the light receiving element for distance estimation is normalized to 1. Thus, the distances a and b satisfy $0 \leq a \leq 1$ and $0 \leq b \leq 1$. Also, the pixel edges Pos($L1d$), Pos($L3d$), Pos($L7d$), and Pos($L9d$) indicate the positions of the four corners of the target image P5.

Equation 9

$$LL=L1d \times (1-a)+L7d \times a$$

$$LR=L3d \times (1-a)+L9d \times a$$

$$L'=LL \times (1-b)+LR \times b \qquad (9)$$

The interpolated distance information $L'$ obtained in the above manner corresponds to a value obtained by linearly interpolating the neighboring distance information for interpolated value calculation (corresponding to the distance information of the four corners of the target pixel PS) in a two-dimensional manner.

The interpolated distance information $L'$ calculated by the distance information interpolated value calculation unit 74 is output to the switch 75.

When the target pixel is the pixel P5 in FIG. 3A, the target pixel P5 includes edge information and the edge determination value output set at 1 is output from the edge determination unit 71. In this case, the interpolated distance information $L'$ obtained by the distance information interpolated value calculation unit 74 is output from the switch 75 as the optimum distance information Lbest.

1.2.2 Processing Performed When the Target Pixel of the Distance Image Includes No Edge Information The processing performed when the target pixel of the distance image includes no edge information will now be described.

The processing performed when the target pixel is the pixel P10 will be described with reference to FIGS. 2 and 3B. In FIG. 3B, the processing part that is the same as the processing described with reference to FIG. 3A is shown in the same manner as in FIG. 3A and will not be described.

When the target pixel is the pixel P10, the edge determination unit 71 determines whether the target pixel P10 includes edge information (whether the target pixel includes an edge) based on pixel position information of the target pixel P10 and edge information E(i, j) included in an image area of the color image corresponding to the target pixel P10. In this example, the target pixel P10 includes no edge information. Thus, the edge determination unit 71 sets the edge determination value to 0 and outputs the edge determination value of 0.

As shown in FIG. 2, when the edge determination value is set at 0, the distance information Li of the target pixel Pi is output from the switch 75 of the optimum distance information obtaining unit 7 without requiring interpolation to be performed. In this example, the target pixel is the pixel P10. Thus, the distance information $L10$ of the target pixel P10 is output from the switch 75 of the optimum distance information obtaining unit 7. In this case, the optimum distance information obtaining unit 7 outputs the distance information $L10$ (=Li) as the optimum distance information Lbest.

In the above example, the image area of the color image corresponding to the target pixel P10 is a flat area. In this case, the distance information $L10$ of the pixel P10 of the distance image is considered to have a high precision. Thus, the distance estimation apparatus 100 maintains the precision of distance estimation by outputting the optimum distance information Lbest with the processing described above.

As described above, the optimum distance information Lbest calculated by the optimum distance information obtaining unit 7 is output to the optimum distance image generation unit 15.

The optimum distance image generation unit 15 generates an optimum distance image based on the optimum distance information Lbest, and outputs the generated optimum distance image.

The distance estimation apparatus 100 determines whether the target pixel of the distance image (image area of the color image corresponding to the target pixel of the distance image) includes an edge (edge detected from the color image). When the target pixel includes an edge, the distance estimation apparatus 100 replaces the distance information of the target pixel of the distance image with an interpolated value calculated based on distance information of neighboring pixels of the target pixel. In this manner, the distance estimation apparatus 100 improves the resolution of a part of the distance image. More specifically, by performing the processing described above, the distance estimation apparatus 100 overcomes the disadvantage that the distance image has a low resolution and cannot express intermediate distance information. In particular, the distance information of the target pixel that includes an edge can often have a low precision. Even when the distance information has a low precision, the distance estimation apparatus 100 improves the precision of its distance estimation to a certain level by performing the above interpolation processing.

Although in the above example the pixel position information of the target pixel is output from the image generation unit 6, the pixel position information of the target pixel may be output from the distance image storage unit 8.

Although in the above example the interpolated distance information L' is calculated by the distance information interpolated value calculation unit 74 by performing two-dimensional linear interpolation shown in FIG. 3A, the interpolated distance information L' may alternatively be calculated in the manner described below.

The distance information interpolated value calculation unit 74 may calculate weighting coefficients w1, w2, w3, and w4 by substituting the following:

the distance lens1 between Pedg and P(L1$d$), which is lens1=sqrt(a^2+b^2), the distance lens2 between Pedg and P(L3$d$), which is lens2=sqrt(a^2+(1−b)^2), the distance lens3 between Pedg and P(L7$d$), which is lens3=sqrt((1−a)^2+b^2), and the distance lens4 between Pedg and P(L9$d$), which is lens4=sqrt((1−a)^2+(1−b)^2) (sqrt(x) is the square root of x, and x^y is the y-th power of x) into a predetermined nonlinear weighting function weight(len), which is expressed by equation 10. The distance information interpolated value calculation unit 74 may then calculate the average value of the weighting coefficients w1, w2, w3, and w4, which are the weighting values respectively for the distance information sets L1$d$, L2$d$, L3$d$, and L4$d$, and may use the calculated weighting average value as the interpolated distance information L'.

Equation 10 weight(len)=exp(−keisu×len×len)  (10)

In equation 10, keisu is a predetermined positive constant.

Alternatively, the optimum distance information obtaining unit 7 may prestore tables (for example, lookup tables (LUTs)) having the values lens1, lens2, lens3, and lens4 and L1 to L9 as variables, and may obtain the interpolated distance information L' by referring to these tables.

Further, although in the above example the distance estimation apparatus 100 uses eight pixels adjacent to the target pixel to obtain the interpolated distance information L', the present invention should not be limited to this method. For example, the distance estimation apparatus 100 may perform interpolation using four pixels on the left, right, top, and bottom of the target pixel (target distance pixel) of the distance image to obtain the interpolated distance information L'. In this case, the distance estimation apparatus 100 may use the target pixel of the distance image (distance information L5 of the target pixel P5 when processing the region R1 in FIG. 3A) in the interpolation processing.

Alternatively, the distance estimation apparatus 100 may perform interpolation that selectively uses neighboring pixels of the target pixel of the distance image to obtain the interpolated distance information L'. In one example, the target pixel is the pixel P5 in FIG. 3A. When the distance a is smaller than 0.5 and the distance b is smaller than 0.5, or more specifically when the pixel position Pedg(s, t) of the pixel including edge information is in the upper left area within the target pixel P5, the distance estimation apparatus 100 may perform interpolation using the neighboring pixels P2 and P4, which are highly correlated with the pixel position Pedg(s, t) of the pixel including edge information.

More specifically, the distance estimation apparatus 100 calculates a one-dimensional interpolated value VL1$d$ in the vertical direction of the distance information L2 of the neighboring pixel P2 and the distance information L5 of the target pixel P5. In this case, interpolation (calculation of an interpolated value of distance information) is performed by assuming that the distance information L2 of the neighboring pixel and the distance information L5 of the target pixel are respectively in the centers of the pixels P2 and P5.

The distance estimation apparatus 100 further calculates a one-dimensional interpolated value HD1$d$ in the horizontal direction of the neighboring pixel P4 and the target pixel P5. In this case as well, interpolation (calculation of an interpolated value of distance information) is performed by assuming that the distance information L4 of the neighboring pixel P4 and the distance information L5 of the target pixel P5 are respectively in the centers of the pixels P4 and P5.

The distance estimation apparatus 100 then uses the average value of the one-dimensional interpolated value VL1$d$ calculated in the vertical direction and the one-dimensional interpolated value HD1$d$ calculated in the horizontal direction as the interpolated distance information L'.

As described above, the distance estimation apparatus 100 may calculate the interpolated distance information L' by selectively using neighboring pixels of the target pixel that are highly correlated with the target pixel based on the pixel position Pedg(s, t) of the pixel including edge information.

Although in the above example interpolation is performed using the single pixel position Pedg(s, t) of the pixel including edge information, the present invention should not be limited to this method. For example, when the target pixel of the distance image includes a plurality of pixel positions Pedg(s, t) of pixels including edge information, the distance estimation apparatus 100 may extract a predetermined point among the plurality of pixel positions Pedg(s, t) of the pixels including edge information (for example, the central point among the plurality of pixel positions Pedg(s, t) of the pixels including edge information), and may perform the same processing as described above based on the extracted predetermined point.

In the flowchart shown in FIG. 4, the processing in steps F1 and F2 may be performed at any timing prior to step F15.

As described above, when the target pixel of the distance image includes no edge information extracted from the color image, the distance estimation apparatus 100 uses distance information of the target pixel, which is considered to have a high precision, as the optimum distance information Lbest. When the target pixel of the distance image includes edge information extracted from the color image, the distance estimation apparatus 100 does not use the distance information of the target pixel, which is considered to have a low precision, and instead calculates distance information (interpolated distance information) by performing interpolation using distance information of neighboring pixels of the target pixel and uses the interpolated distance information as the optimum distance information Lbest.

With the processing described above, the distance estimation apparatus 100 obtains a distance image (distance information) with a high precision without the need to increase the number of pixels of the imaging element included in the light receiving unit 2 (imaging element for distance estimation). The distance estimation apparatus 100 therefore effectively prevents the S/N ratio of a charge signal from decreasing and the axial resolving power of its distance image from deteriorating, which would be likely to occur when the number of pixels of the imaging element (imaging element for distance estimation) is simply increased.

First Modification

Alternatively, the distance estimation apparatus 100 may perform distance information interpolation with a modified method described below instead of the above method described with reference to FIGS. 3A and 3B. The first modified method will now be described with reference to FIG. 5A. In FIG. 5A, the processing part that is the same as the processing described with reference to FIGS. 3A and 3B is shown in the same manner as in FIGS. 3A and 3B and will not be described.

As shown in FIG. 5A, the distance estimation apparatus 100 first determines whether a block (image area) in the color image corresponding to the target pixel of the distance pixel (target pixel of the light receiving element for distance estimation) includes edge information. (B) When the target pixel of the distance image includes no edge information, the distance estimation apparatus 100 determines that the target pixel belongs to a flat area, and outputs distance information of the target pixel of the distance image without requiring interpolation to be performed. More specifically, the distance estimation apparatus 100 uses the distance information Li of the target pixel as the optimum distance information Lbest.

(A) When the target pixel of the distance image includes edge information, the distance estimation apparatus 100 divides the target pixel of the distance image including the edge into two pixel parts.

In FIG. 5A, the illustration (c) shows one example of the processing for dividing the target pixel into two pixel parts. In this example, the target pixel is assumed to be the pixel P5.

For an upper left part of the edge (the roof part of the house shown in FIG. 5A(c)) included in the target pixel (target distance pixel) P5, a distance information interpolated value L2d is generated by performing the processing expressed by equation 11 using distance information sets L2 and L4 of neighboring pixels P2 and P4 of the target pixel P5. The distance estimation apparatus 100 then uses the interpolated value L2d as distance information of the upper left part of the target pixel, which is defined by dividing the target pixel into two pixel parts.

For a lower right part of the edge (the roof part of the house shown in FIG. 5A(c)) included in the target pixel P5, a distance information interpolated value L6d is generated by performing the processing expressed by equation 11 using distance information sets L6 and L8 of neighboring pixels P6 and P8 of the target pixel P5. The distance estimation apparatus 100 then uses the interpolated value L6d as distance information of the lower right part of the target pixel, which is defined by dividing the target pixel into two pixel parts.

Equation 11

$$L2d=(L2+L4)/2$$

$$L6d=(L6+L8)/2 \qquad (11)$$

As described above, the distance estimation apparatus 100 divides the target pixel including edge information into pixel parts based on the edge information, and calculates an interpolated value for each pixel part based on distance information of neighboring pixels of the pixel part and uses the interpolated value as distance information of the pixel part. This enables the distance estimation apparatus 100 to obtain a distance image with a higher precision.

Although in the above example the distance estimation apparatus 100 divides the edge part (the roof part of the house shown in FIG. 5A) of the color image into two pixel parts, the present invention should not be limited to this method. For example, the distance estimation apparatus 100 may divide a target pixel of a distance image including the sharpest edge (edge with the largest edge amount) into four or more pixel parts by using the sharpest edge as the center of division, and perform the same processing as described above to obtain a distance image.

Second Modification

Alternatively, the distance estimation apparatus 100 may perform distance information interpolation using another modified method described below instead of the method described with reference to FIGS. 3A and 3B. The second modified method will now be described with reference to FIG. 5B. In FIG. 5B, the processing part that is the same as the processing described with reference to FIGS. 3A and 3B is shown in the same manner as in FIGS. 3A and 3B and will not be described.

As shown in FIG. 5B, the distance estimation apparatus 100 first determines whether a block (image area) in the color image corresponding to the target pixel of the distance pixel (target pixel of the light receiving element for distance estimation) includes edge information.

(B) When the target pixel of the distance image includes no edge information, the distance estimation apparatus 100 determines that the target pixel belongs to a flat area, and outputs distance information of the target pixel of the distance image without requiring interpolation to be performed. More specifically, the distance estimation apparatus 100 uses the distance information Li of the target pixel as the optimum distance information Lbest.

(A) When the target pixel of the distance image includes edge information, the distance estimation apparatus 100 extracts an edge part of the target pixel of the distance image, and interpolates the edge part using differentiation amounts and obtains distance information.

In FIG. 5B, the illustration (c) shows one example of interpolation performed using differentiation amounts. In this example, the target pixel is assumed to be the pixel P5. The interpolation processing will be described using steps 1 and 2.

Step 1

The distance estimation apparatus first extracts a point with a maximum differentiation amount in the target pixel (target distance pixel) P5. More specifically, the distance estimation apparatus extracts a point with a maximum differentiation amount in a color image corresponding to the target pixel (target distance pixel) P5. The edge information extraction unit 14 may perform this processing.

The differentiation amount diff(i, j) may be calculated using the following equation:

$$\text{diff}(i,j)=\text{sqrt}(fx^2+fy^2)$$

where fx is a differentiation value in X-direction at the coordinates (i, j) of the color image, and fy is a differentiation value in Y-direction at the coordinates (i, j) (sqrt(x) is the square root of x).

To simplify the processing, the absolute value of only the differentiation value in X-direction may be used as the differentiation amount diff(i, j) (in other words, diff(i, j)=abs (fx), where abs(fx) is the absolute value of x). Alternatively, the absolute value of only the differentiation value in Y-direction may be used as the differentiation amount diff(i, j) (in other words, diff(i, j)=abs(fy)). Also, the absolute value of a differentiation value in a diagonal direction of the color image may be used as the differentiation amount diff(i, j).

The method for calculating the differentiation amounts should not be limited to the method described above. The differentiation amounts may be calculated using, for example, a Robert edge detection operator, a Prewitt edge detection operator, and a Sobel edge detection operator.

Cases (A-1) and (A-2) in FIG. 5B will now be described. Point C in FIG. 5B is assumed to be a point with a maximum differentiation amount. In case (A-1), distance information Lk of point K, which is on the upper left of point C, is calculated by performing interpolation. In case (A-2), distance information Lm of point M, which is on the lower right of point C, is calculated by performing interpolation.

Step 2

In case (A-1), the distance estimation apparatus of the present modification calculates distance information L2d of point N (point at the upper left corner of the target pixel P5) and distance information Lc of point C as the following:

$$L2d=(L2+L4)/2, \text{ and}$$

$$Lc=(L2+L4+L6+L8)/4,$$

and calculates the distance information Lk of point K as the following:

$$Lk=L2d+(Lc-L2d)*(Ek/Ec),$$

where Ek is a differentiation amount at point K. The differentiation amount Ec is a maximum differentiation amount in an image area of the color image corresponding to the target pixel PS, and 0≦(Ek/Ec)≦1. Interpolation is performed using the differentiation amounts based on the equations above. In the above equations, Lc may be equal to L5.

In case (A-2), the distance estimation apparatus of the present modification calculates distance information L6d of point O (point at the lower right corner of the target pixel P5) and distance information Lc of point C as the following:

$$L6d=(L6+L8)/2, \text{ and}$$

$$Lc=(L2+L4+L6+L8)/4,$$

and calculates the distance information Lm of point M as the following:

$$Lm=L6d+(Lc-L6d)*(Em/Ec),$$

where Em is a differentiation amount at point M. The differentiation amount Ec is a maximum differentiation amount in an image area of the color image corresponding to the target pixel P5, and 0≦(Em/Ec)≦1. Interpolation is performed using the differentiation amounts based on the equations above. In the above equations, Lc may be equal to L5.

The edge information extraction unit 14 may calculate the differentiation amounts, and the optimum distance information obtaining unit may perform the above processing (processing in step 2) using the differentiation amounts calculated by the edge information extraction unit 14.

With the processing above, the distance estimation apparatus of the present modification obtains a distance image in which an edge part of a target pixel has a higher precision by performing interpolation using differentiation amounts.

Second Embodiment

A distance estimation apparatus and a distance estimation method according to a second embodiment of the present invention will now be described. The distance estimation apparatus of the second embodiment corrects a distance image of a current frame based on a motion vector obtained based on a color image of the current frame and a color image of a frame preceding the current frame by one frame (a frame immediately preceding the current frame).

Figure 6:
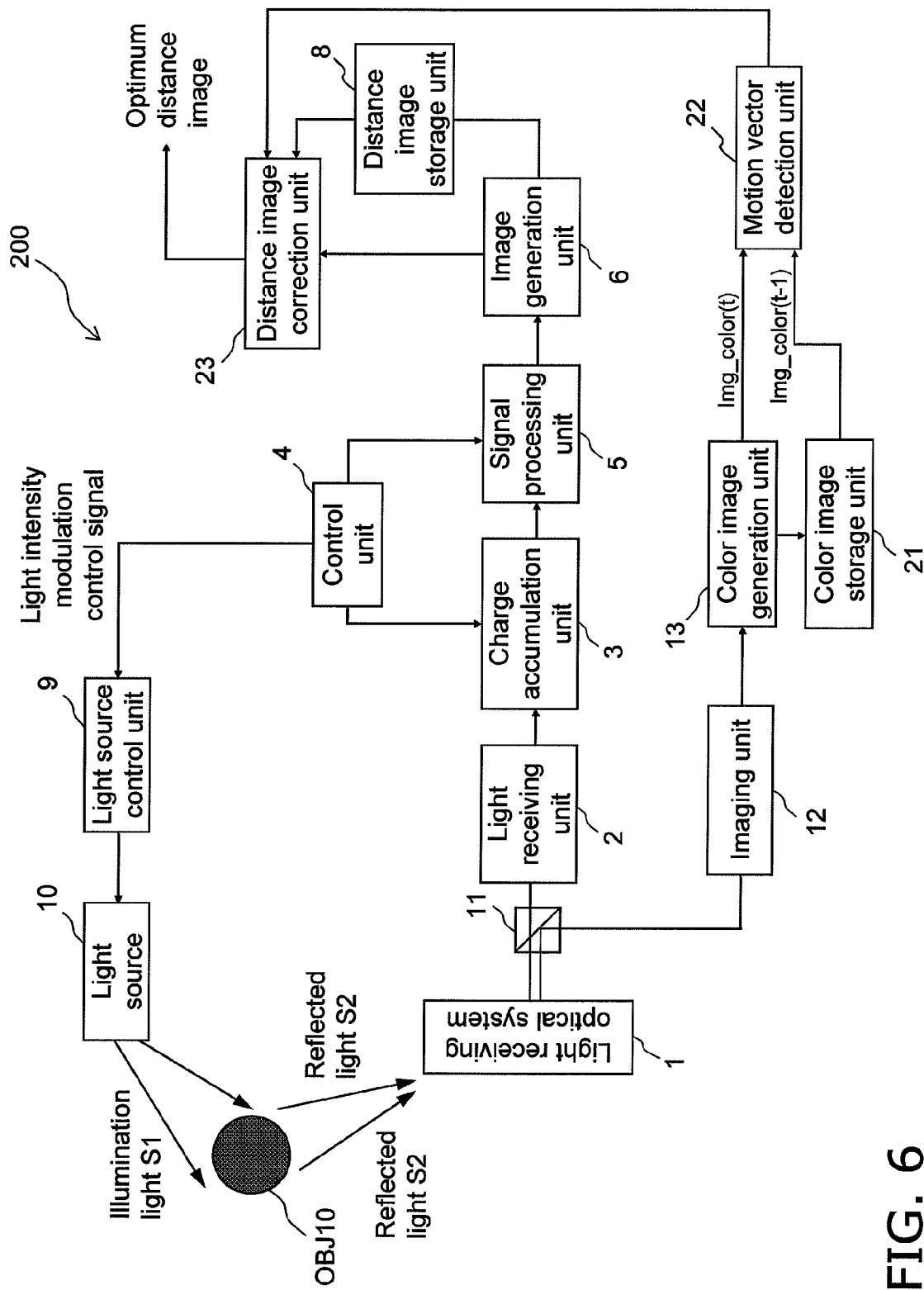
FIG. 6 is a block diagram of a distance estimation apparatus according to a second embodiment of the present invention.
Figure 8:
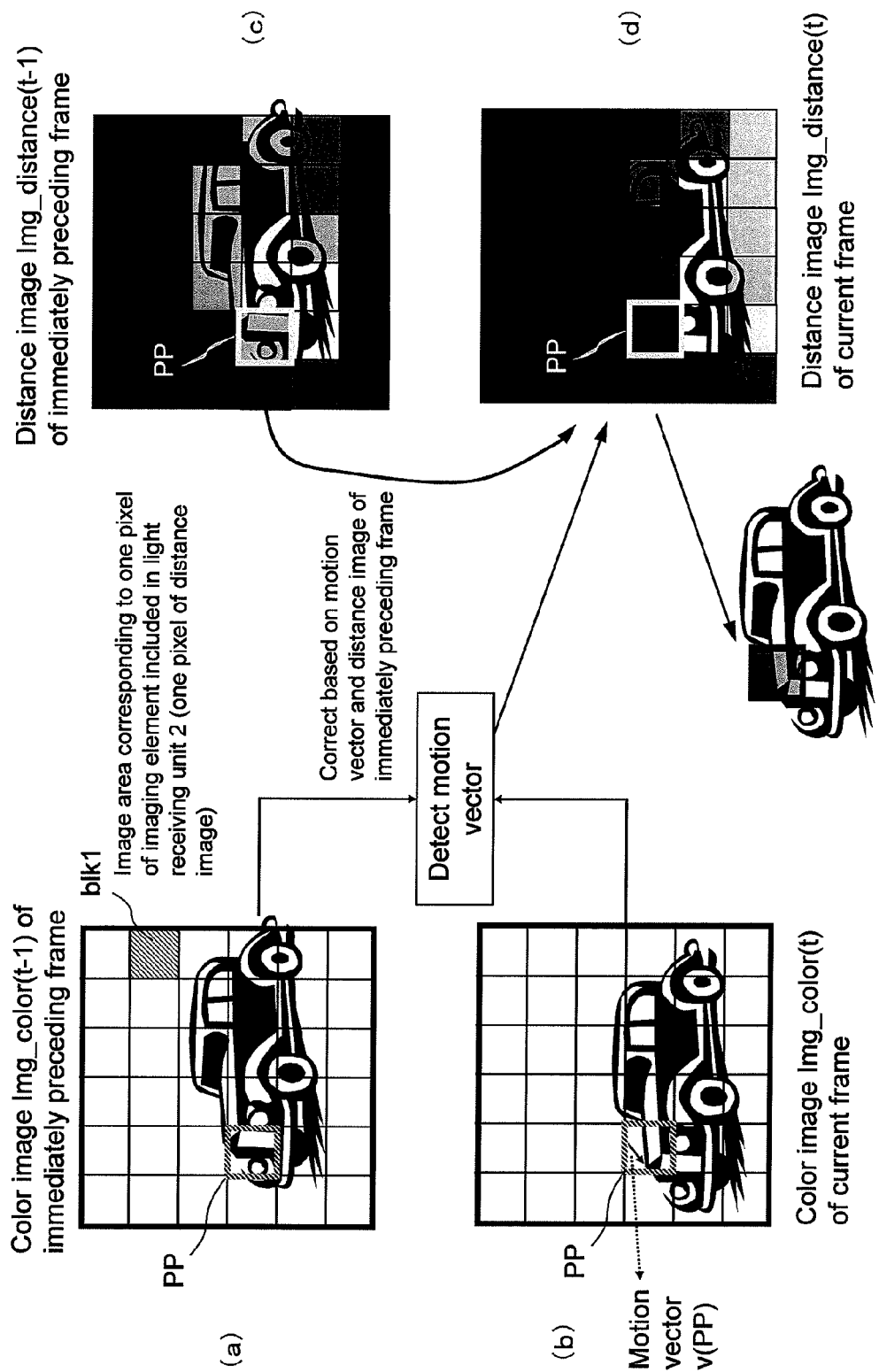
FIG. 8 shows an overview of distance image correction using a motion vector performed with the distance estimation method according to the second embodiment.
Figure 9:
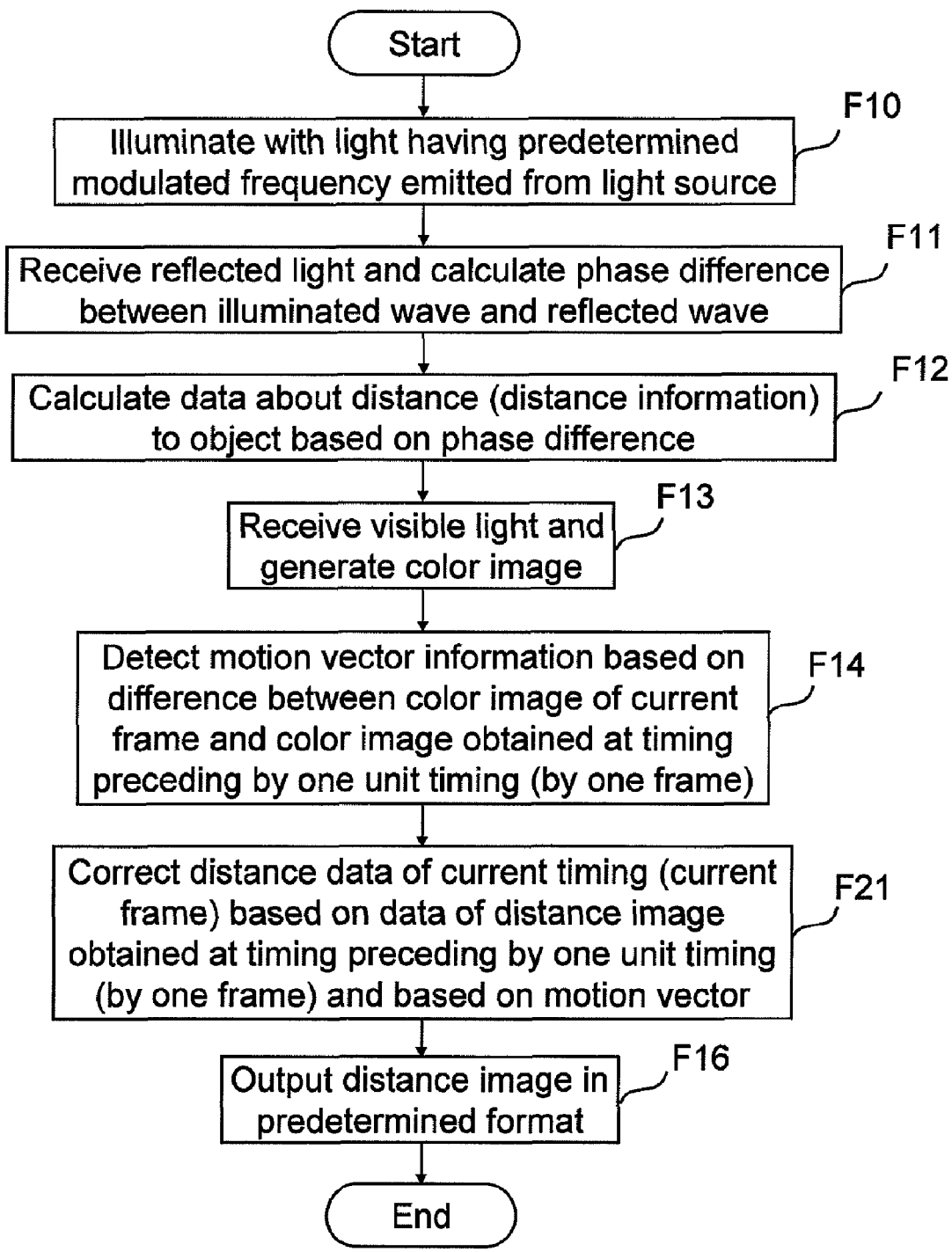
FIG. 9 is a flowchart showing the processing performed with the distance estimation method according to the second embodiment.
Figure 10:
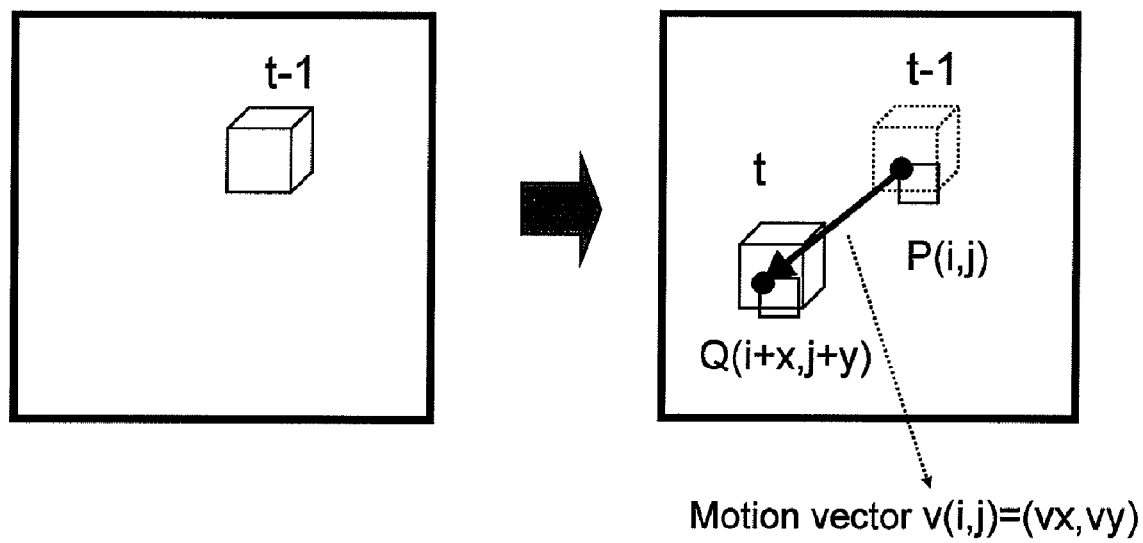
FIG. 10 shows an overview of motion vector detection performed with the distance estimation method according to the second embodiment.

FIG. 6 is a schematic block diagram of a distance estimation apparatus 200 according to the second embodiment. FIG. 8 schematically shows distance image correction performed with the distance estimation method of the second embodiment by the distance estimation apparatus 200. FIG. 9 is a flowchart showing the processing performed with the distance estimation method of the second embodiment. FIG. 10 schematically shows block matching performed in the motion vector detection process. In the second embodiment, the components that are the same as the components in the first embodiment will be given the same reference numerals as those components, and will not be described in detail. The processing part that is the same as in the first embodiment will not be described.

The distance estimation method and the distance estimation apparatus of the second embodiment will now be described with reference to FIGS. 6 to 9.

2.1 Structure of the Distance Estimation Apparatus

As shown in FIG. 6, the distance estimation apparatus 200 of the present embodiment differs from the distance estimation apparatus 100 of the first embodiment only in that it includes a distance image correction unit 23 instead of the optimum distance information obtaining unit 7 and the optimum distance image generation unit 15, eliminates the edge information extraction unit 14, and additionally includes a color image storage unit 21 and a motion vector detection unit 22.

Except these components, the distance estimation apparatus 200 has the same structure as the distance estimation apparatus 100.

The color image storage unit 21 stores an image (color image) generated by a color image generation unit 13 in units of frames. The color image storage unit 21 outputs a color image in units of frames in response to a request provided from the motion vector detection unit 22.

Figure 7:
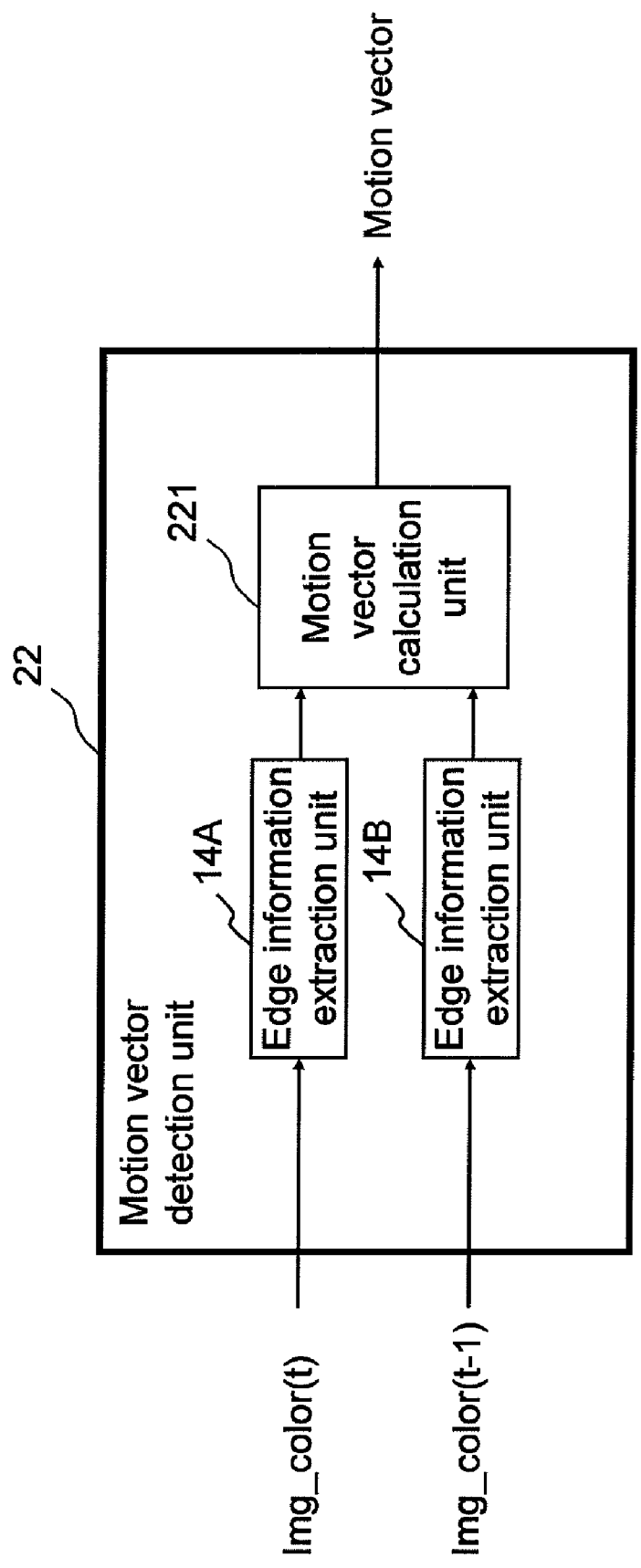
FIG. 7 is a block diagram of a motion vector detection unit included in the distance estimation apparatus according to the second embodiment.

As shown in FIG. 7, the motion vector detection unit 22 includes edge information extraction units 14A and 14B and a motion vector calculation unit 221.

The edge information extraction units 14A and 14B are identical to the edge information extraction unit 14 of the first embodiment.

The edge information extraction unit 14A receives a color image Img_color(t) of a current frame obtained at a current timing t, which is output from the color image generation unit 13, and extracts edge information from the input current frame image Img_color(t). The edge information extraction unit 14A then outputs the extracted edge information to the motion vector calculation unit 221.

The edge information extraction unit 14B receives a color image Img_color(t−1) of a immediately preceding frame obtained at a frame timing (t−1), which is the timing preceding the current frame timing by one unit timing (immediately preceding the current frame timing), which is read from the color image storage unit 21, and extracts edge information from the input immediately preceding frame image Img_color(t−1). The edge information extraction unit 14B then outputs the extracted edge information to the motion vector calculation unit 221.

For ease of explanation, only the processing using the current frame image Img_color(t) and the frame image Img_color(t−1) immediately preceding the current frame will be described.

The motion vector detection unit 22 receives the edge information extracted from the current frame image Img_color(t) and the edge information extracted from the image Img_color(t−1) of the frame immediately preceding the current frame, which are output from the edge information extraction units 14A and 14B, and calculates a motion vector based on the input edge information of the two frame images. The motion vector detection unit 22 then outputs the calculated motion vector to the distance image correction unit 23.

The distance image correction unit 23 receives the motion vector, which is output from the motion vector detection unit 22, the distance image Img_distance(t) obtained at the current frame timing t, which is output from the image generation unit 6, and the distance image Img_distance(t−1) obtained at the timing immediately preceding the current frame timing t, which is output from the distance image storage unit 8. The distance image correction unit 23 then corrects the value of a pixel of the distance image (distance information) based on the motion vector, and obtains an optimum distance image.

2.2 Operation of the Distance Estimation Apparatus

The operation of the distance estimation apparatus 200 with the above-described structure will now be described. The processing part that is the same as in the first embodiment will not be described.

The color image generation unit 13 generates the color image Img_color(t)=(C1($i, j, t$), C2($i, j, t$), and C3($i, j, t$)) at the current frame timing t, and outputs the generated color image Img_color(t) to the motion vector detection unit 22. In the above expression, (i, j) indicates the pixel position in the color image, and C1($i, j, t$) indicates a color information component C1 at the pixel position (i, j) in the color image obtained at the frame timing t. The pixel (i, j) of the color image is often expressed using three color information components, for example, signal components representing red (R), green (G), and blue (B) in the RGB color space, or the brightness component Y and the color difference components Cb and Cr in the YCC color space.

Also, the color image Img_color (t−1)=(C1($i, j, t−1$), C2($i, j, t−1$), and C3($i, j, t−1$)) obtained at the timing (t−1) immediately preceding the current frame timing and stored in the color image storage unit 21 is output to the motion vector detection unit 22.

The motion vector detection unit 22 detects a motion vector by comparing the image Img_color(t−1) of the current frame and the image Img_color(t−1) of the frame immediately preceding the current frame.

The processing performed by the motion vector detection unit 22 using block matching, which is used in video encoding, will be described in this example, although the motion vector detection unit 22 may detect a motion vector with other methods.

In the motion vector detection performed using block matching, the color image is divided, for example, into a block area (image area) having 8 by 8 pixels, and a motion vector between two frames is detected by calculation based on correlations in the block area.

First, the edge information extraction units 14A and 14B extract edge information in the same manner as in the first embodiment. The edge information extracted by the edge information extraction units 14A and 14B is then divided into image blocks each having 8 by 8 pixels, and the resulting image blocks are then subjected to block matching.

In the block matching, the estimation value est(x, y) is calculated for the pixel P(i, j, t−1) included in the color image obtained at the timing immediately preceding the current frame timing and having edge information E(i, j, t−1) indicating 1. The value (x, y) at which the estimation value est(x, y) becomes the minimum is calculated, and the point (pixel) Q(i+x, j+y, t) obtained by adding the vector of the calculated value (x, y) to the pixel P(i, j, t−1) is detected as a pixel point of the current frame corresponding to the pixel P(i, j, t−1) of the immediately preceding frame.

As a result, the motion vector v(i, j) at the pixel P is calculated as $$v(i,j)=(vx,vy)=(x,y)$$

where vx is the x-component of the motion vector and vy is the y-component of the motion vector.

Equation 12

$$est(x, y) = \sum_{n=0}^{N-1}\sum_{m=0}^{N-1} |E(i+m, j+n, t-1) - E(x+m+i, y+n+j, t)| \quad (12)$$

where N is the size of the block. FIG. 10 schematically shows the processing described above. Although each of the pixel point P and the pixel point Q is set at the upper left corner of the image block in FIG. 10, each of the pixel points P and Q may be set in the center of the image block.

The motion vector detection unit 22 outputs the motion vector detected in the manner described above to the distance image correction unit 23.

The distance image correction unit 23 receives the motion vector detected by the motion vector detection unit 22, and performs the correction process as shown in FIG. 8.

FIG. 8A schematically shows the color image Img_color (t−1) of the frame immediately preceding the current frame. FIG. 8B schematically shows the color image Img_color(t) of the current frame. FIG. 8C schematically shows the distance image Img_distance(t−1) of the frame immediately preceding the current frame. FIG. 8D schematically shows the color image Img_distance(t) of the current frame. The processing will be described assuming that the target pixel (processing target pixel) of the distance image is the pixel PP in FIG. 8.

In this example, the motion vector detection unit 22 detects a motion vector v(PP) expressed using an arrow in FIG. 8B (v(PP) indicates a motion vector detected from an image block of a color image corresponding to the pixel PP of a distance image) in a block of a color image corresponding to the target pixel PP of a distance image. In this case, the distance image correction unit 23 corrects distance information of the distance image (pixel value of the distance image) based on the detected motion vector v(PP).

As shown in FIG. 8B, the motion vector v(PP) points to the lower left. This indicates that the body part of the car included in the image block corresponding to the pixel PP of the color image Img_color(t−1) of the frame immediately preceding the current frame will be in the lower part of the image block corresponding to the pixel PP of the color image Img_color(t) of the current frame. Also, as shown in FIG. 8B, the upper part of the image block is the background part of the car. In this case, distance information obtained from the pixel PP of the distance image of the current frame may have a low precision. More specifically, the pixel PP includes both the body part of the car (part with a smaller distance) and the background part (part with a larger distance), and the distance information of the pixel PP is highly likely to have an intermediate value of the boy part and the background part.

Based on the motion vector v(PP), the distance image correction unit 23 determines that distance information of the lower part of the pixel PP is highly correlated with distance information of the pixel PP of the distance image Img_distance(t−1) of the frame immediately preceding the current frame. The distance image correction unit 23 thus interpolates the distance information of the lower part of the pixel PP of the distance image of the current frame based on the distance information of the pixel PP of the distance image Img_distance(t−1) of the frame immediately preceding the current frame (or replaces with the distance information of the pixel PP of the distance image Img_distance(t−1) of the immediately preceding frame).

Based on the motion vector v(PP), the distance image correction unit 23 also determines that the distance information of the upper part of the pixel PP is highly correlated with the distance information of the pixel PP of the distance image Img_distance(t−1) of the frame immediately preceding the current frame. The distance image correction unit 23 thus interpolates the distance information of the upper part of the pixel PP of the distance image of the current frame based on the distance information of the pixel PP of the distance image Img_distance(t−1) of the frame immediately preceding the current frame (or replaces with the distance information of the pixel PP of the distance image Img_distance(t−1) of the immediately preceding frame).

In this manner, the distance image correction unit 23 performs interpolation based on the motion vector that would improve the precision of a distance image, and obtains an optimum distance image.

Although in the above example the target pixel of the distance image is divided into two pixel parts (into the upper and lower parts for the target pixel PP in FIG. 8) when a motion vector is detected (when the magnitude of the motion vector (scalar value) is not 0), and the target pixel of the distance image is interpolated (or replaced) using a pixel of the frame immediately preceding the current frame, the present invention should not be limited to this method. Depending on the motion vector, the target pixel may be divided into more pixel parts to improve the precision of distance information of a predetermined pixel of the distance image.

In the above example, the distance information of the target pixel of the distance image Img_distance(t) of the current frame is replaced with the distance information of the target part of the distance image Img_distance(t−1) of the frame immediately preceding the current frame (corresponding to the brightness of the distance image) that is obtained using the motion vector v(PP) in FIG. 8. Alternatively, the average value of the distance information (brightness value) of the target part of the distance image of the current frame and the distance information (brightness value) of the target part of the distance image Img_distance(t−1) of the immediately preceding frame obtained using the motion vector v(PP) may be used to replace the distance information of the target pixel of the distance image Img_distance(t) of the current frame.

In this manner, the distance estimation apparatus 200 improves the precision of distance estimation by dividing an image part whose distance information has a low precision due to the small number of pixels of the imaging element included in the light receiving unit 2 for distance estimation into more pixel parts and also by using a motion vector.

The distance estimation apparatus 200 of the present embodiment obtains a distance image with a higher precision by correcting a distance image obtained at a current frame timing based on a distance image obtained at a frame immediately preceding the current frame and further based on a motion vector obtained using a color image, without the need to increase the number of pixels of the imaging element included in the light receiving unit 2 (imaging element for distance estimation). The distance estimation apparatus 200 therefore effectively prevents the S/N ratio of a charge signal from decreasing and the axial resolving power of its distance image from deteriorating, which would be likely to occur when the number of pixels of the imaging element included in the light receiving unit 2 (imaging element for distance estimation) is simply increased.

Although in the above example the motion vector detection unit 22 detects a motion vector using block matching, the present invention should not be limited to this method. For example, the motion vector detection unit 22 may detect a motion vector using a method focusing on gradients.

Also, when the distance estimation apparatus 200 divides a pixel of the distance image into pixel parts to correct distance information (distance value), the distance estimation apparatus 200 may use a value calculated based on the magnitude of a motion vector to determine the number of parts into which the pixel of the distance image is to be divided and also to determine positions at which the pixel of the distance image is to be divided.

In the flowchart shown in FIG. 9, the processing in steps F13 and F14 may be performed at any timing prior to step F21.

Third Embodiment

A distance estimation apparatus and a distance estimation method according to a third embodiment of the present invention will now be described with reference to FIGS. 11 to 17. The distance estimation apparatus of the third embodiment estimates a distance by calculating the reliability of a value of distance image data (distance information of a distance image) according to the value of the distance information or according to the intensity of reflected light from an object, and correcting the distance image data (distance information) based on the reliability.

Figure 11:
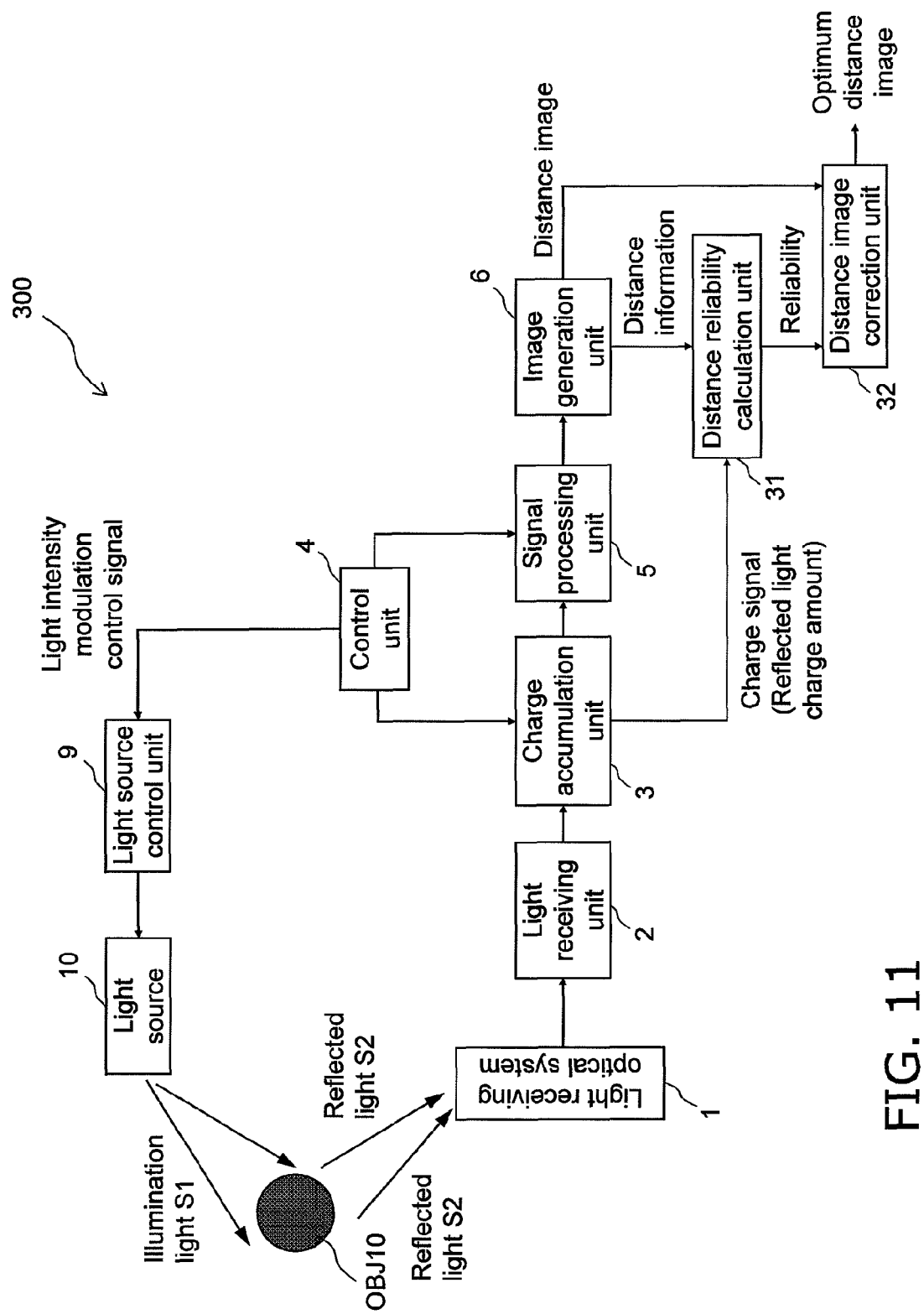
FIG. 11 is a block diagram of a distance estimation apparatus according to a third embodiment of the present invention.

FIG. 11 is a schematic block diagram of a distance estimation apparatus 300 according to the third embodiment.

Figure 12:
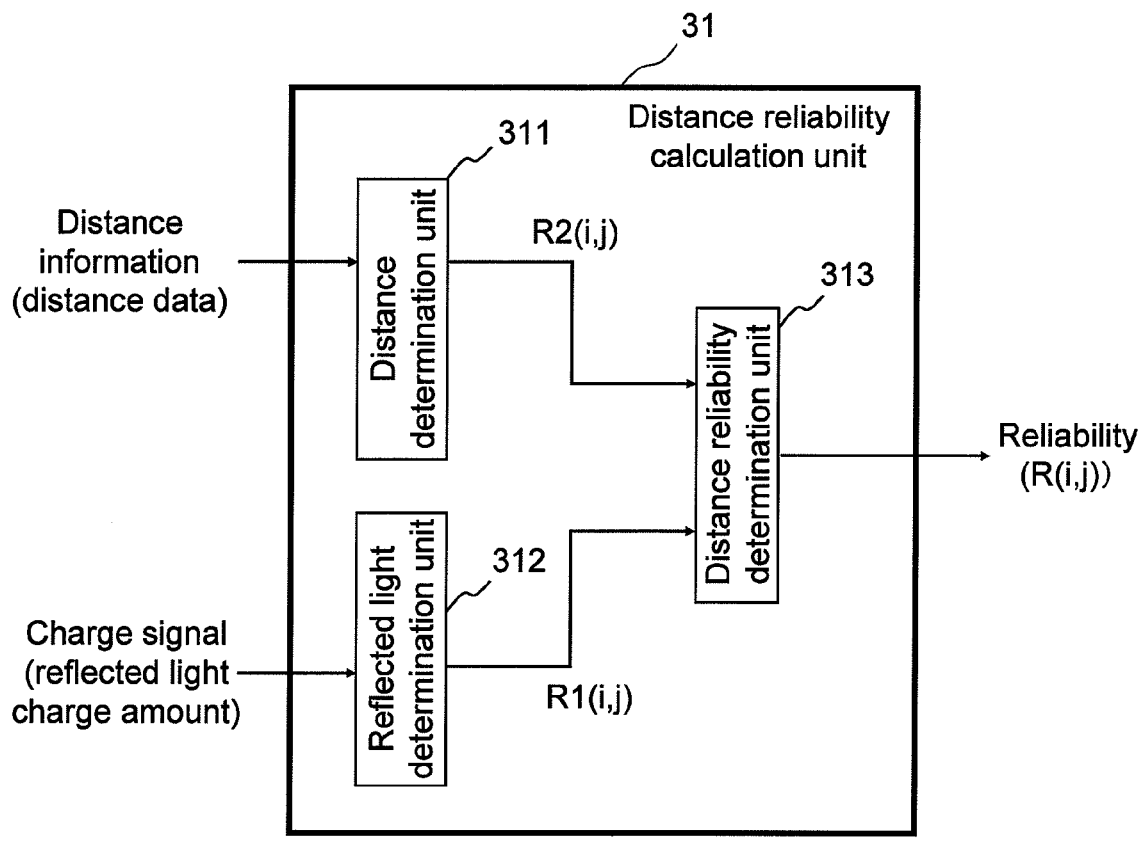
FIG. 12 is a block diagram of a distance reliability calculation unit included in the distance estimation apparatus according to the third embodiment.
Figure 13:
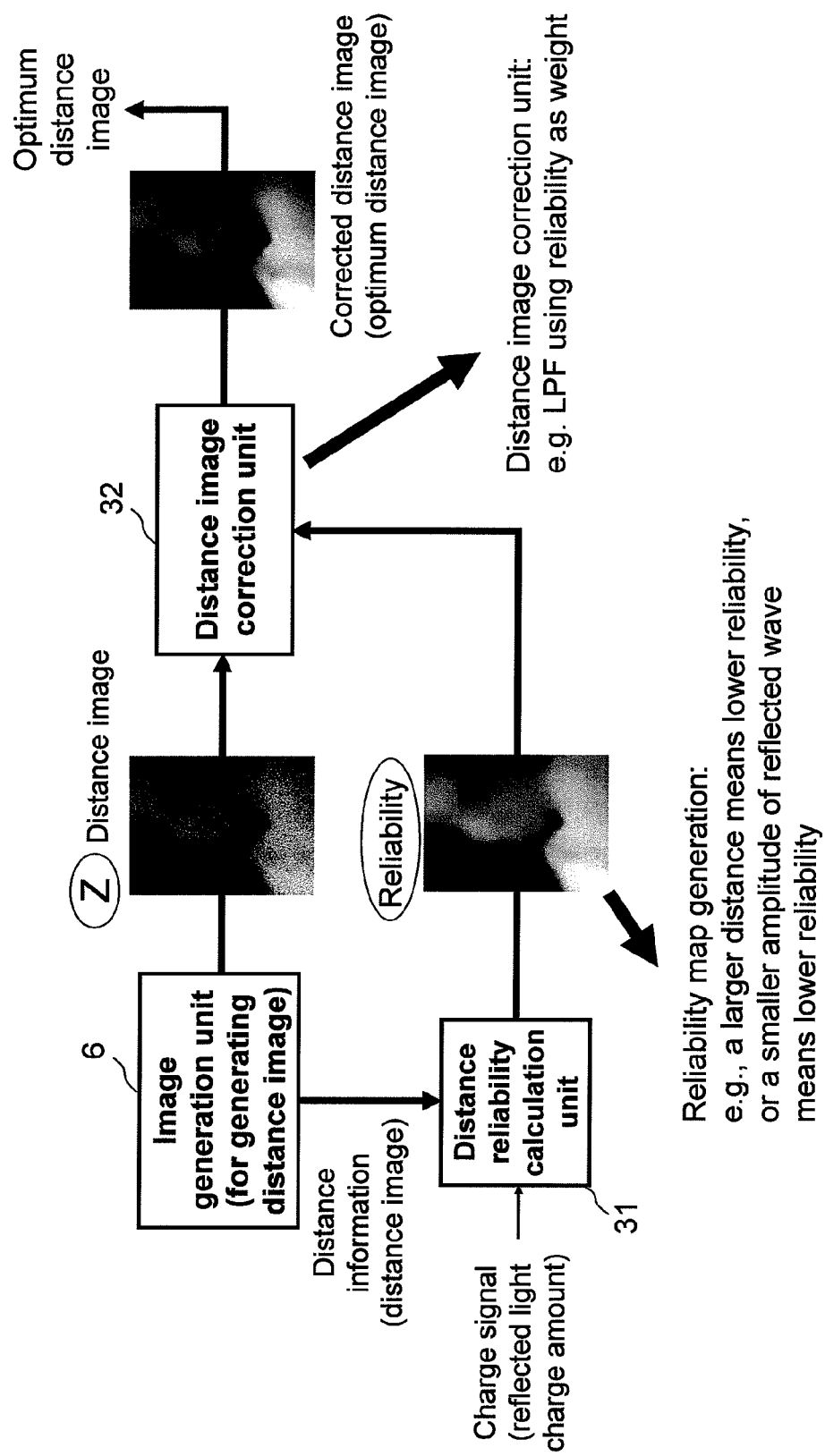
FIG. 13 shows an overview of distance reliability calculation according to the third embodiment.

FIG. 12 is a schematic block diagram of a distance reliability calculation unit 31 included in the distance estimation apparatus 300. FIG. 13 schematically shows correction performed by the distance estimation apparatus of the third embodiment with the distance estimation method of the third embodiment based on the reliability of a distance.

FIGS. 15A and 15B and 16A and 16B show examples of functions used to determine the reliability of a distance in the distance estimation apparatus 300 using the distance estimation method of the third embodiment.

Figure 17:
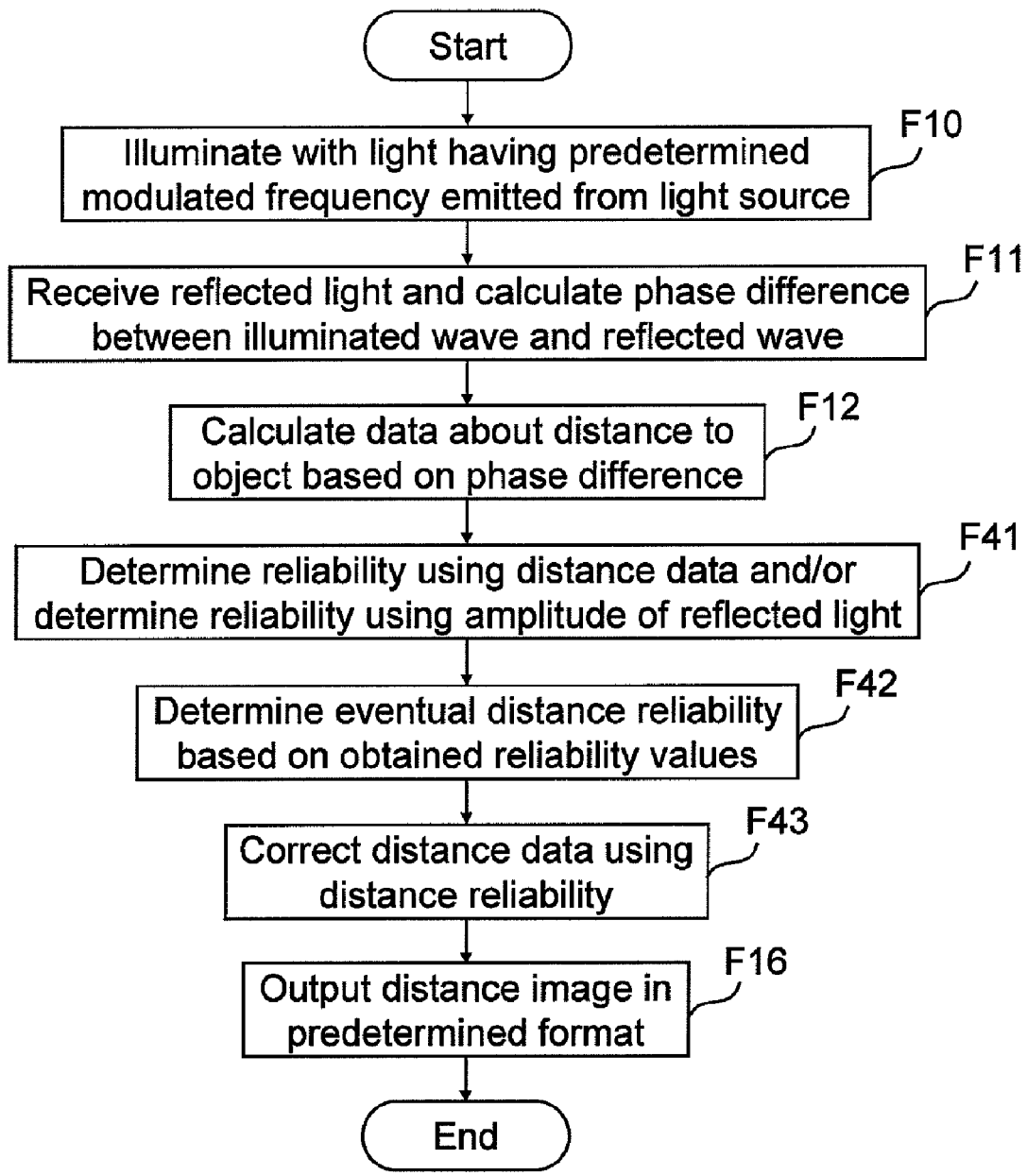
FIG. 17 is a flowchart showing the processing performed with a distance estimation method according to the fourth embodiment.
Figure 18:
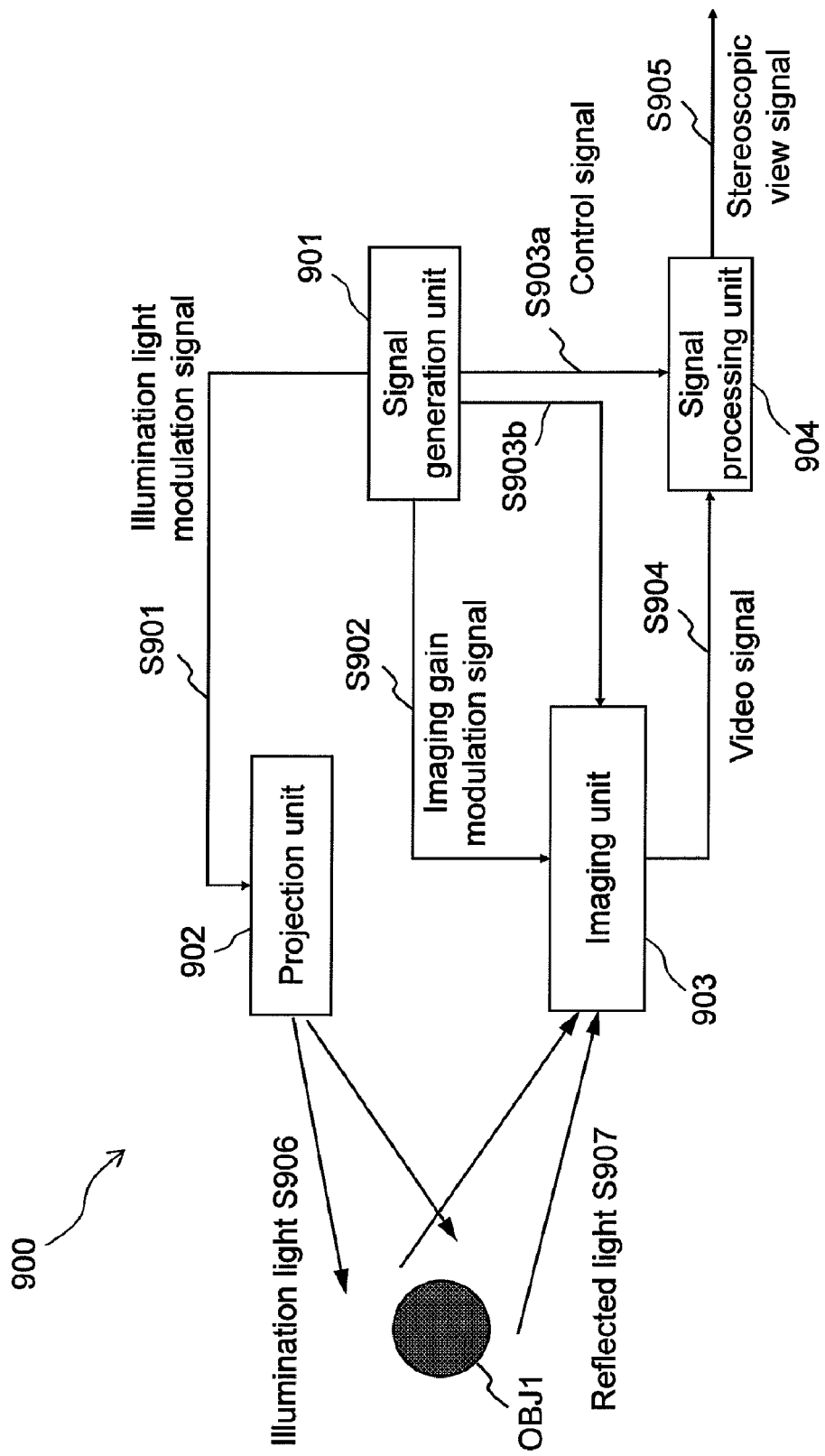
FIG. 18 is a block diagram of a distance estimation apparatus according to conventional example 1.

FIG. 17 is a flowchart showing the processing performed with the distance estimation method of the third embodiment.

In the third embodiment, the components that are the same as the components in the first and second embodiments are given the same reference numerals as those components, and will not be described in detail. The processing part that is the same as in the first and second embodiments will not be described.

The distance estimation method and the distance estimation apparatus according to the third embodiment will now be described with reference to FIGS. 11 to 17.

3.1 Structure of the Distance Estimation Apparatus

As shown in FIG. 11, the distance estimation apparatus 300 of the present embodiment differs from the distance estimation apparatuses of the first and second embodiments only in its functional units that perform signal processing after the processing performed by the image generation unit 6. More specifically, the distance estimation apparatus 300 differs from the distance estimation apparatuses of the first and second embodiments only in that it additionally includes a distance reliability calculation unit 31 and a distance image correction unit 32 as functional units that perform signal processing after the processing performed by the image generation unit 6, and eliminates the color separation prism 11 and the imaging unit 12 and following functional units that perform signal processing for the visible light component.

Except these components, the distance estimation apparatus 300 of the present embodiment has the same structure as the distance estimation apparatuses of the first and second embodiments.

The distance reliability calculation unit 31 receives distance information $L(i, j)$ of a pixel $PP(i, j)$ of a distance image generated by the image generation unit 6 and a charge signal $D(i, j)$ for the pixel $PP(i, j)$ output from the charge accumulation unit 3, and calculates the distance reliability $R(i, j)$ for the pixel $PP(i, j)$ based on the distance information $L(i, j)$ and the charge signal $D(i, j)$. The distance reliability calculation unit 31 then outputs the calculated distance reliability $R(i, j)$ to the distance image correction unit 32.

The distance image correction unit 32 receives the distance reliability $R(i, j)$ output from the distance reliability calculation unit 31 and the distance image output from the image generation unit 6, and corrects the distance image based on the distance reliability $R(i, j)$ and obtains an optimum distance image.

When a light source that emits infrared light is used as the light source 10 in the distance estimation apparatus 300, it is preferable to use a CCD for infrared light as the imaging element included in the light receiving unit 2. In this case, it is also preferable to arrange an optical filter for filtering infrared light and prevent light outside an infrared region from entering the light receiving unit 2.

3.2 Operation of the Distance Estimation Apparatus

The operation of the distance estimation apparatus 300 with the above-described structure will now be described. The processing part that is the same as in the first and second embodiments will not be described.

The distance reliability calculation unit 31 detects the reliability of the distance value $L(i, j)$ of each pixel $PP(i, j)$ of the distance image generated by the image generation unit 6.

The distance estimation apparatus 300 determines the reliability $R(i, j)$ based on the following knowledge:

(S1) When the amplitude of a reflected wave (reflected light) from an object is relatively small (small relative to noise such as environment light), the precision of distance information obtained by the distance estimation apparatus 300 is lower (more easily affected by noise such as environment light) as the distance between the distance estimation apparatus 300 and the object is larger (as the object is further from the distance estimation apparatus 300).

(S2) When the amplitude of a reflected wave (reflected light) from an object is relatively small (small relative to noise such as environment light), the precision of distance information obtained by the distance estimation apparatus 300 is lower (more easily affected by noise such as environment light) as the amplitude of a reflected wave (reflected light) received by the imaging element (for example, a CCD imaging element for infrared light) included in the light receiving unit 2 is smaller.

Based on these, the distance reliability calculation unit 31 calculates the reliability $R(i, j)$ in the manner described in detail below.

Figure 15A:
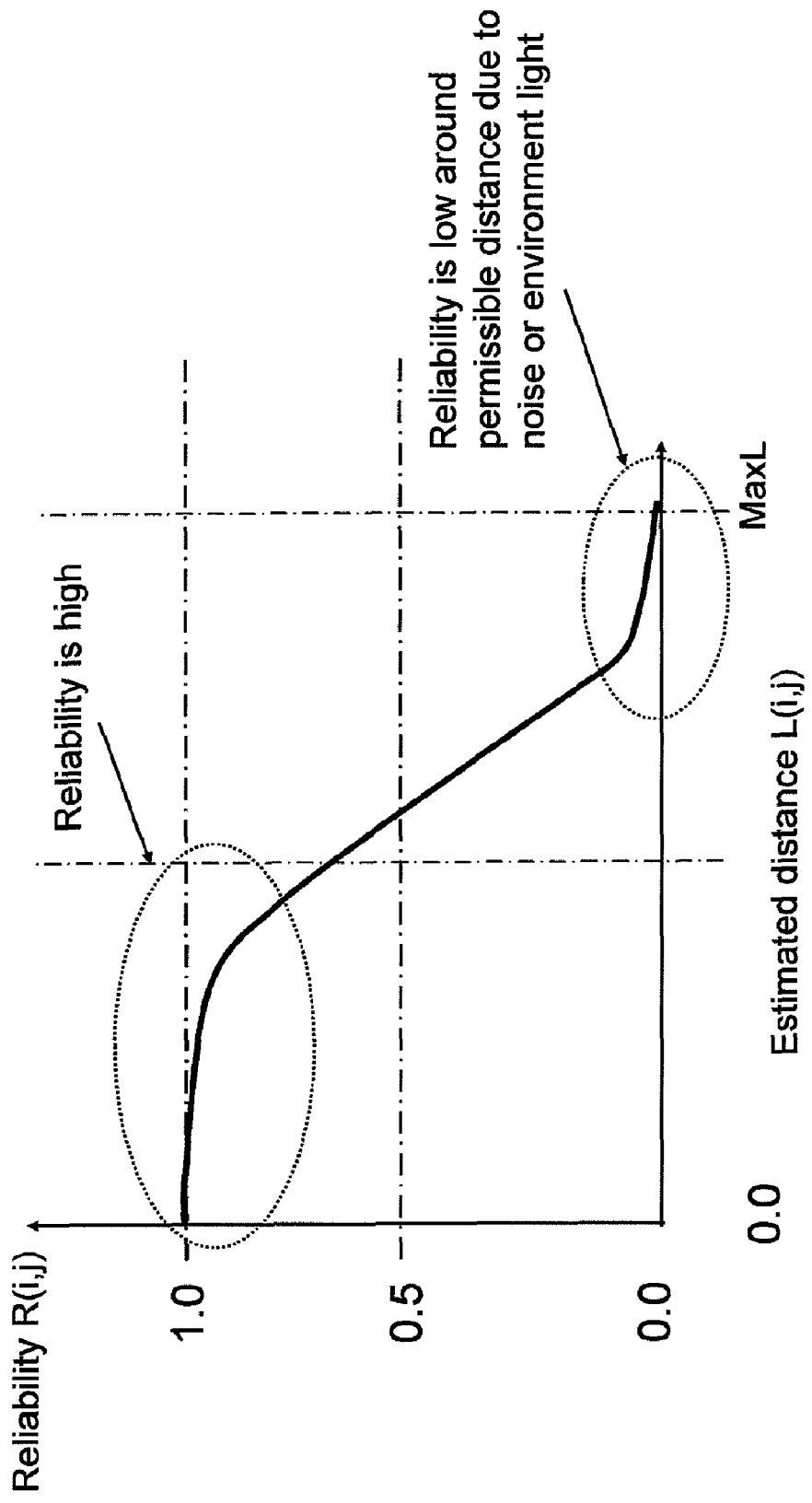
FIG. 15A shows an example of a function that is used to determine the distance reliability according to the third embodiment.

FIG. 15A is a graph showing one example of the estimated distance $L(i, j)$–reliability $R(i, j)$ characteristic (expressed using a function), which is based on (S1). In this case, the reliability $R(i, j)$ is controlled one dimensionally using only the estimated distance $L(i, j)$ as a parameter.

Figure 15B:
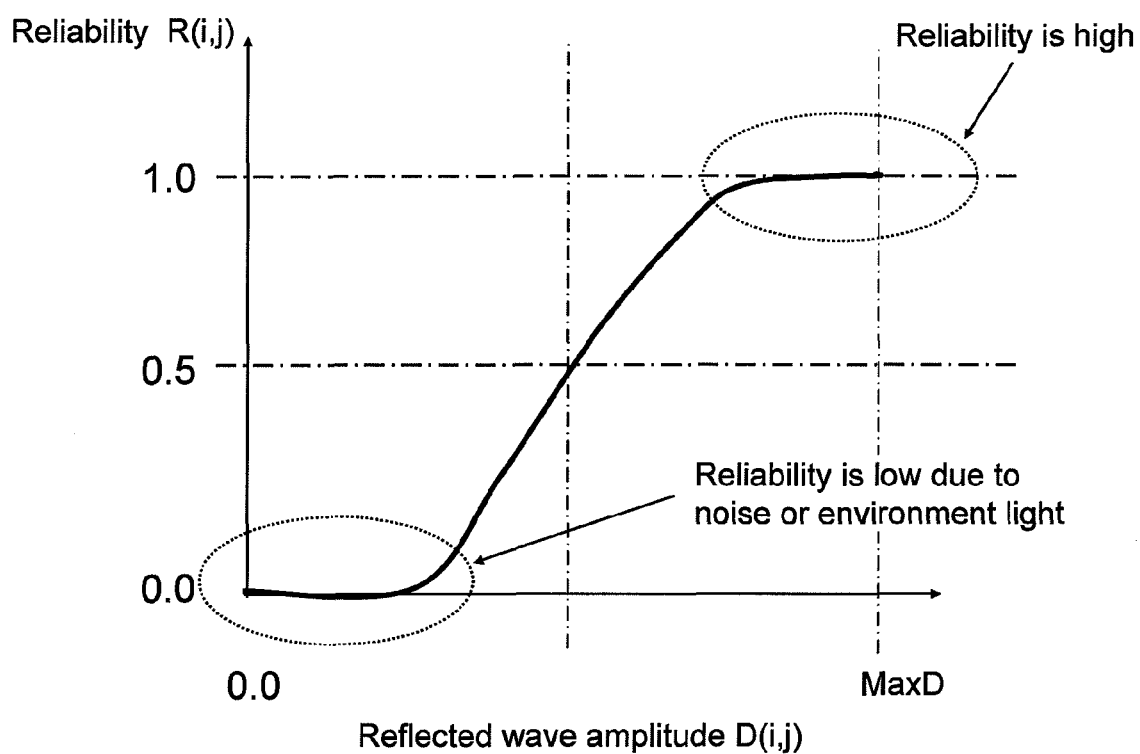
FIG. 15B shows an example of a function that is used to determine the distance reliability according to the third embodiment.

FIG. 15B is a graph showing one example of the reflected wave amplitude $D(i, j)$–reliability $R(i, j)$ characteristic (expressed using a function), which is based on (S2). In this case, the reliability $R(i, j)$ is controlled one dimensionally using only the reflected wave amplitude $D(i, j)$ as a parameter. In equation 14 below, $R2(L)$ is an example of a function expressing the characteristic shown in FIG. 15A.

Figure 16A:
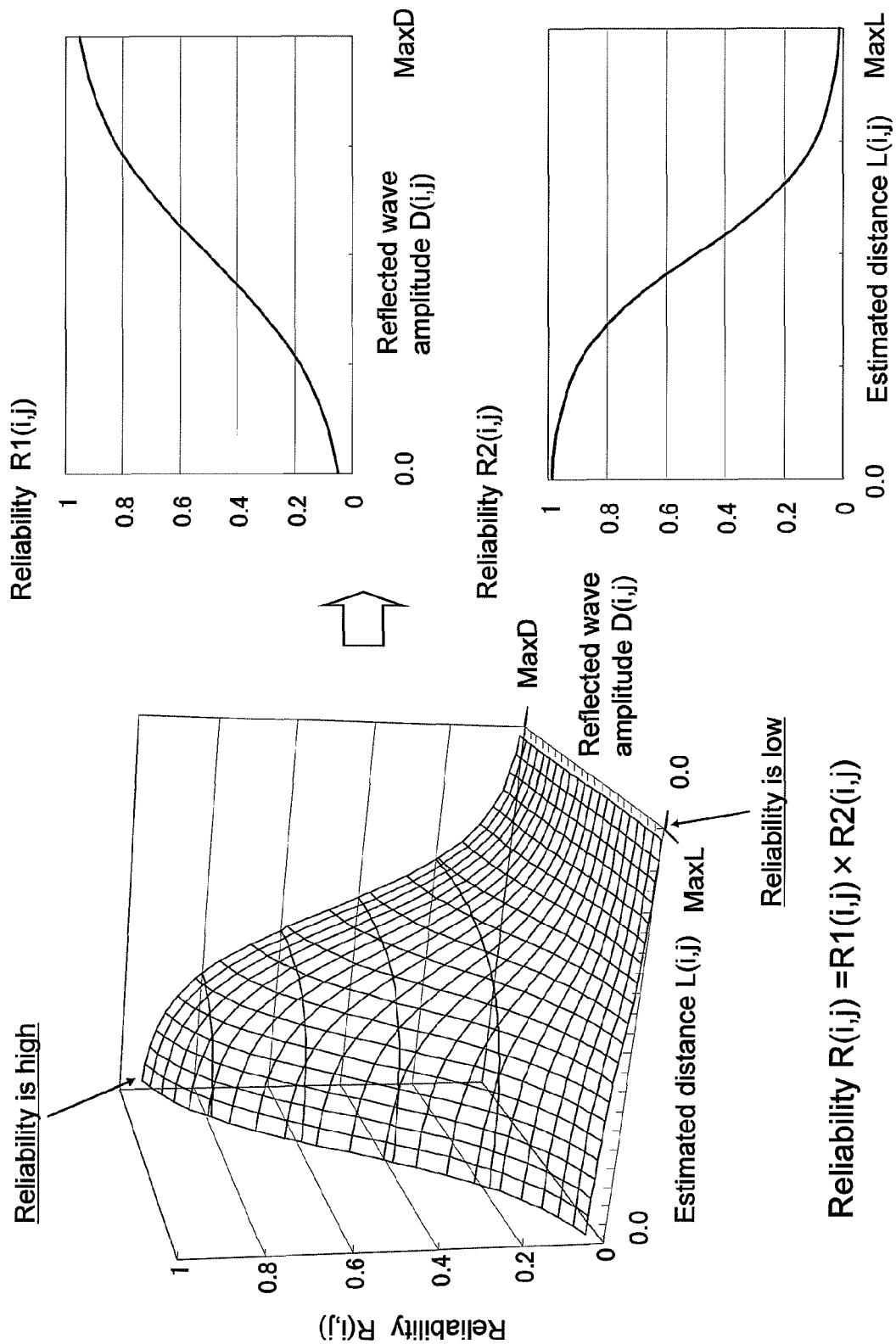
FIG. 16A shows an example of a function that is used to determine the distance reliability according to a fourth embodiment of the present invention.
Figure 16B:
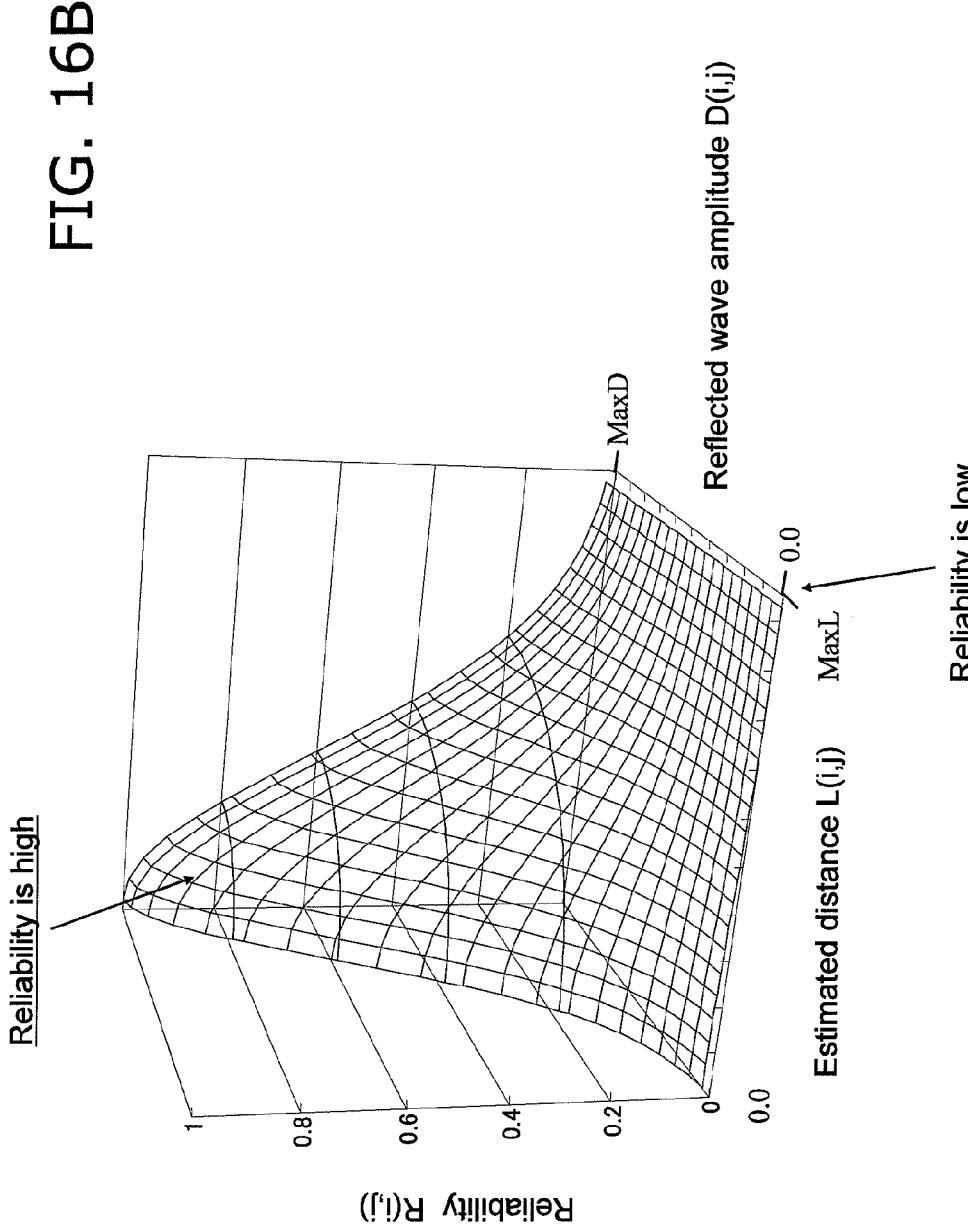
FIG. 16B shows an example of a function that is used to determine the distance reliability according to the fourth embodiment.

FIGS. 16A and 16B are graphs each showing the characteristic when the reliability $R(i, j)$ is determined using two parameters: the reflected wave amplitude $D(i, j)$ and the estimated distance (distance information) $L(i, j)$, which is based on (S1) and (S2). The reflected wave amplitude $D(i, j)$–the reliability $R1(i, j)$ characteristic and the estimated distance (distance information) $L(i, j)$–the reliability $R2(i, j)$ characteristic may be expressed using functions. In this case, the reliability $R(i, j)$ is controlled two-dimensionally using the two parameters: the reflected wave amplitude $D(i, j)$ and the estimated distance $L(i, j)$.

Equation 13 shows an example of a function that expresses the characteristic shown in FIG. 15B. Equation 14 shows an example of a function that expresses the characteristic shown in FIG. 16A. Equation 15 shows an example of a function that expresses the characteristic shown in FIG. 16B. To simplify the equations, the equations below do not include position information (i, j) (coordinates) indicating the position of a pixel in an image. More specifically, although the reliability of the target pixel $P(i, j)$ is referred to as $R(i, j)$ above, the reliability of the target pixel is simply referred to as, for example, $R(d)$ in equation 13, which indicates that the reliability is a function of variable d. The other functions may also be expressed without the coordinates (i, j).

Equation 13

$$R(d)=1.0/(1.0+\exp(-keisuN\times(d-\text{offset}N))) \quad (13)$$

In equation 13, d is the amplitude of a reflected wave (corresponding to $D(i, j)$ in FIG. 16A).

Equation 14

$$R1(d)=1.0(1.0+\exp(-keisu1\times(d-\text{offset}1)))$$

$$R2(L)=1.0/(1.0+\exp(keisu2\times(L-\text{offset}2)))$$

$$R(d,L)=R1(d)\times R2(L) \quad (14)$$

$$R(i,j)=\text{func}(L(i,j),D(i,j))=e^{-((L(i,j)^2+(D(i,j)-MaxD)^2)/delta^2)} \quad \text{Equation 15}$$

In equation 14, d is the amplitude of a reflected wave (corresponding to $D(i, j)$ in FIG. 16A), and L is distance information (estimated distance) (corresponding to $L(i, j)$ in FIG. 16A).

In equations 13 and 14, keisuN, keisu1, keisu2, offset1, and offset2 are predetermined positive constants. In equation 15, delta is a predetermined positive constant.

FIGS. 15B and 16A show the case in which a value obtained by multiplying the maximum estimation distance MaxL is substituted to offset1, a value obtained by multiplying the maximum reflection amplitude MaxD is substituted to offset2, keisuN=keisu1=3.0 is substitued to the gradient keisu1, and keisu2=4.5 is substituted to the gradient keisu2.

Although the values of the gradient keisu1 and the gradient keisu2 may be any positive constants, it is preferable to satisfy $1.0 \leq keisu1 \leq 10.0$ and $1.0 \leq keisu2 \leq 10.0$. When values smaller than 1 are used as keisu1 and keisu2, the changes would be linear. The nonlinearity of the changes will increase as the values of keisu1 and keisu2 become larger.

In equation 15, delta is a value that control the area in which reliability of the reliability function shown in FIG. 16B is "1.0". The lower this value is, the smaller the area in which reliability R(i,j) is "1.0" becomes. The greater this value is, the larger the area in which reliability R(i, j) is "1.0" becomes. Generally, it is preferable using delta that satisfies $1.0 \leq delta \leq Delmax$ where Delmax is the minimum value in MaxL and MaxD.

The reliability R(i, j) calculated by the distance reliability calculation unit 31 is then output to the distance image correction unit 32.

One example of correction performed by the distance image correction unit 32 will now be described with reference to FIG. 14.

Figure 14:
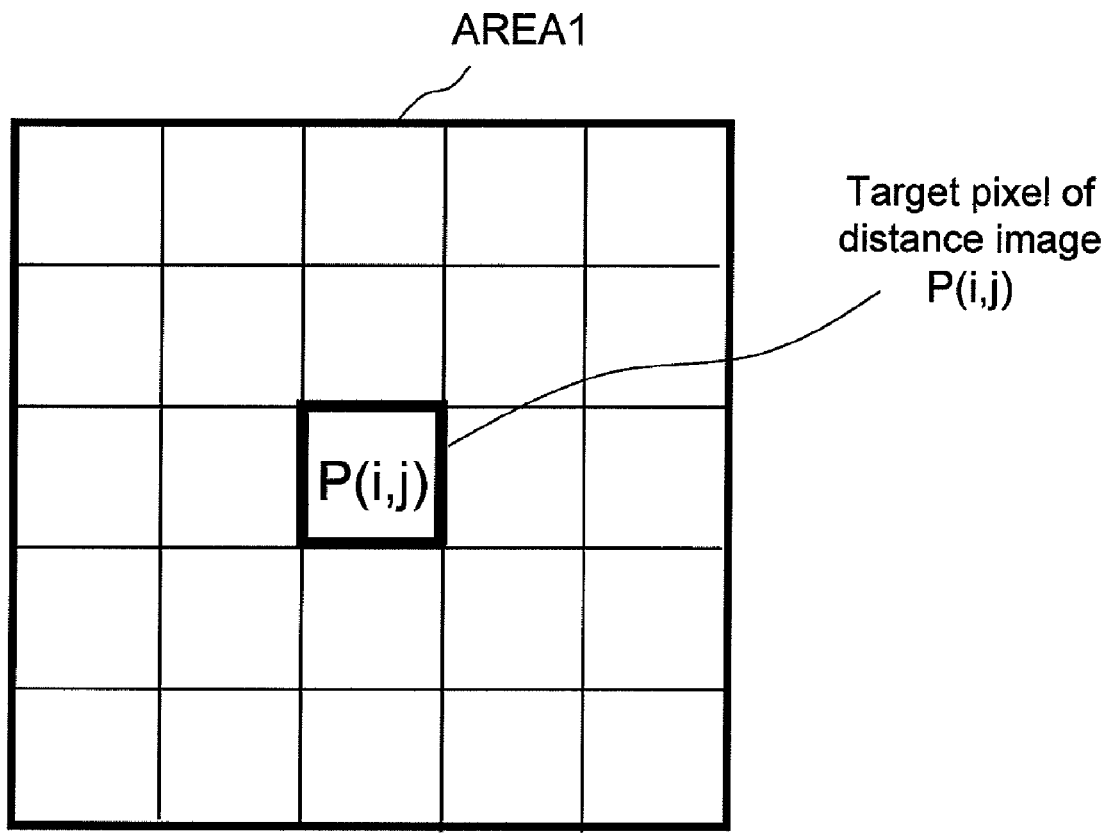
FIG. 14 is a diagram used to describe one example of correction performed by a distance image correction unit 32.

FIG. 14 schematically shows a pixel area with a predetermined size (an area consisting of a plurality of pixels of a distance image), which is extracted from the distance image in a manner that the target pixel P(i, j) of the distance image is at the center of the pixel area. FIG. 13 schematically shows correction performed by the distance image correction unit 32 together with functional units associated with the correction processing.

The distance image correction unit 32 corrects the distance image by, for example, setting a pixel area AREA1 with a predetermined size (pixel area consisting of 5 by 5 pixels in FIG. 14) in a manner that the target pixel (target distance pixel) P(i, j) of the distance image is at the center of the pixel area, and calculating the value dL(i, j) through filtering of distance information (distance data) of each pixel included in the pixel area AREA1 of the distance image using the reliability of each pixel as a weighting coefficient. The calculated value (filtering result) dL(i, j) is then newly used as the distance information (estimated distance) of the target pixel P(i, j) of the distance image (the value dL(i, j) is used as the distance information of the target pixel P(i, j)).

The distance image correction unit 32 performs the above correction processing for each of all pixels of the distance image to obtain a corrected distance image, that is, an optimum distance image. Although FIG. 14 describes the case in which a pixel area with a predetermined size consists of 5 by 5 pixels, the present invention should not be limited to this method. An image area with another size may be set and subjected to filtering using the reliability of each pixel of the pixel area.

The correction method described below may be used as the distance correction method performed by the distance image correction unit 32.

In the correction process, the distance image correction unit 32 may newly use, as distance information of the target pixel P(i, j), distance information (distance data) of a pixel with the highest reliability among the pixels included in the pixel area (pixel area of the distance image) with a predetermined size, which is set in a manner that the target pixel of the distance image (target distance pixel) P(i, j) is at the center.

In the correction process, the distance image correction unit 32 may newly use, as distance information of the target pixel, a value obtained using a predetermined nonlinear function having two variables: the distance information L(i, j) of the target pixel, and the average value (weighted average value) AveL(i, j), which is weighted using the reliability of distance information (distance data) of each pixel included in the pixel area (pixel area of the distance image) with a predetermined size, which is set in a manner that the target pixel (processing target distance pixel) P(i, j) of the distance image is at the center.

As described above, the distance estimation apparatus 300 calculates the reliability of distance information (value of distance image data) of each pixel of the distance image according to distance information of each pixel of the distance image or the intensity of reflected light, and corrects the distance image data based on the calculated reliability to obtain an optimum distance image. As a result, even when the level of reflected light (amplitude of a reflected wave) obtained from a pixel of the imaging element of the light receiving unit 3 is small, the distance estimation apparatus 300 corrects a pixel of the distance image corresponding to the pixel of the imaging element included in the light receiving unit 3 based on the reliability of the distance information. The distance estimation apparatus can therefore effectively prevent the precision of distance estimation of the distance image from decreasing.

As a result, the distance estimation apparatus 300 obtains a distance image with a high precision.

Other Embodiments

The above embodiments may be combined freely.

For example, the present invention may be a combination of (1) the distance estimation apparatus of the first embodiment that performs correction in the spatial direction (correction using spatial correlations), (2) the distance estimation apparatus of the second embodiment that performs correction in the temporal direction (correction using temporal correlations (correction using a motion vector)), and (3) the distance estimation apparatus of the third embodiment that performs correction using reliability.

The distance estimation apparatus combining the functions of the first to third embodiments automatically determines a pixel (pixel of a distance image) having a low distance resolution or precision based on the reliability, and performs correction in the temporal and spatial directions (filtering etc.). As a result, the distance estimation apparatus can correct distance information of the target pixel using distance information of neighboring pixels of the target pixel. The distance estimation apparatus improves the distance precision (distance estimation precision) of the pixel (pixel of the distance image) having a low distance resolution or precision.

Although the above embodiments describe the case in which a CCD is used as the imaging element included in each of the light receiving element and the imaging unit, the present invention should not be limited to this method. For example, a CMOS image sensor may be used as the imaging element.

A distance image obtained with the apparatus and the method of the present invention may be used to generate a parallax image for left eye (a left parallax image of a stereo image) and a parallax image for right eye (a right parallax image of a stereo image). A three-dimensional display apparatus or the like may then display a 3D image (video) based on the generated parallax images for left eye and right eye. Also, in a three-dimensional display system including the distance estimation apparatus of the present invention and a three-dimensional display apparatus, a distance image obtained by the distance estimation apparatus of the present invention may be used to generate a parallax image for left eye (a left parallax image of a stereo image) and a parallax image for right eye (a right parallax image of a stereo image), and the three-dimensional display apparatus may then display a 3D image (video) based on the generated parallax images for left eye and right eye.

Also, the distance estimation apparatus of the present invention may additionally include a 3D image generation unit, which uses a distance image obtained by the distance estimation apparatus of the present invention to generate a parallax image for left eye (a left parallax image of a stereo image) and a parallax image for right eye (a right parallax image of a stereo image), and may output the generated parallax images for left eye and right eye. In this case, for example, a three-dimensional display apparatus may display a 3D image (video) using the parallax images for left eye and right eye output from the distance estimation apparatus that additionally includes the 3D image generation unit.

When the distance information has been obtained, it is possible to generate a parallax image for left eye (a left parallax image of a stereo image) and a parallax image for right eye (a right parallax image of a stereo image) by shifting pixels in the horizontal direction (i.e. rightward or leftward) according to the distance information z(x,y) of the pixel p(x, y) whose position is (x,y) in a reference image. It should be noted that the distance information z(x,y) is a relative value (or value of depth) from a predetermined standard point. Also, with a geometric method, it is possible to calculate a parallax of a pixel based on the relationship between a predetermined standard point and distance information of a pixel in each image.

The distance estimation method and the distance estimation apparatus of the present invention described in each of the above embodiments may be built in or connected to an image processing device, such as a computer, a television set, a digital camera, a mobile telephone, a PDA, and a car TV, and may be realized using an integrated circuit, such as LSI (large scale integration).

Each block of the distance estimation apparatus described in each of the above embodiments may be formed using a single chip, or some or all blocks of the distance estimation apparatus may be formed using a single chip. Although LSI is used as the semiconductor device technology, the technology may be IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks of the distance estimation apparatus. Biotechnology is potentially applicable.

The processes performed by the functional blocks described in the above embodiments may be realized using programs. The processes performed by the functional blocks of the above embodiments are performed by, for example, a central processing unit (CPU) in a computer. Programs realizing the processes may be stored in a storage device, such as a hard disk or a ROM, and are read into a ROM or a RAM before execution.

The processes of the above embodiments may be realized using either hardware or software, or may be realized using both software and hardware. When the distance estimation apparatus of each of the above embodiments is implemented by hardware, the distance estimation apparatus requires timing adjustment for each of its processes. For ease of explanation, timing adjustment associated with various signals required in an actual hardware design is not described in detail in the above embodiments.

The structures described in detail in the above embodiments are mere examples of the present invention, and may be changed and modified variously without departing from the scope and spirit of the invention.

INDUSTRIAL APPLICABILITY

The distance estimation apparatus, the distance estimation method, the storage medium storing the program, and the integrated circuit of the present invention increase the resolution (precision) of a distance image formed with the TOF method by interpolating and estimating distance information between pixels of an imaging element (such as a CCD) based on distance information obtained by an imaging element (such as a CCD) including a small number of pixels. The distance information obtained by the distance estimation apparatus, the distance estimation method, the storage medium storing the program, and the integrated circuit of the present invention enable more natural stereoscopic display of an image that is captured by a movie camera or a DSC. Therefore, the present invention is useful and implementable in the field of imaging.

What is claimed is:

1. A distance estimation apparatus that illuminates an object with light having a modulated light intensity and estimates a distance to an object using reflected light from the object, the apparatus comprising:
   a light source operable to emit light whose light intensity can be modulated;
   a light source control unit operable to control the light source;
   a light receiving optical system operable to focus light from the object;
   a color separation unit operable to separate light received by the light receiving optical system into a first light component and a second light component based on a frequency of the light;
   a light receiving unit operable to convert the second light component separated by the color separation unit to obtain charge;
   a charge accumulation unit operable to accumulate the charge obtained by the light receiving unit and obtain a charge signal;
   a signal processing unit operable to calculate distance information based on the charge signal;
   a distance image generation unit operable to generate a distance image having a first number of pixels based on the distance information;
   an imaging unit operable to convert the second light component separated by the color separation unit to an image generation charge signal;
   a high resolution image generation unit operable to generate a high resolution image having pixels more than the first number of pixels based on the image generation charge signal obtained by the imaging unit;
   an edge information extraction unit operable to extract edge information from the high resolution image generated by the high resolution image generation unit; and a distance image correction unit operable to correct distance information of a target pixel of the distance image based on a neighboring pixel of the target pixel in the distance image and based on the edge information extracted by the edge information extraction unit.

2. The distance estimation apparatus according to claim 1, wherein when an image area of the high resolution image corresponding to the target pixel of the distance image includes edge information, the distance image correction unit corrects the distance information of the target pixel of the distance image by specifying position information Pos(x, y) of the edge information in the distance image, weighting distance information of the neighboring pixel based on a positional relationship between the position information Pos (x, y) and the neighboring pixel, calculating distance information of the position information Pos(x, y) using the weighted distance information of the neighboring pixel, and replacing the calculated distance information of the position information Pos(x, y) with the distance information of the target pixel.

3. The distance estimation apparatus according to claim 1, wherein when an image area of the high resolution image corresponding to the target pixel of the distance image includes edge information, the distance image correction unit corrects the distance information of the target pixel of the distance image by dividing the target pixel into pixel parts based on the edge information in the distance image, and calculating distance information of each pixel part using distance information of a neighboring pixel of the target pixel that is near the pixel part in the distance image.

4. A distance estimation apparatus that illuminates an object with light having a modulated light intensity and estimates a distance to an object using reflected light from the object, the apparatus comprising:
  a light source operable to emit light whose light intensity can be modulated;
  a light source control unit operable to control the light source;
  a light receiving optical system operable to focus light from the object;
  a color separation unit operable to separate light received by the light receiving optical system into a first light component and a second light component based on a frequency of the light;
  a light receiving unit operable to convert the second light component separated by the color separation unit to obtain charge;
  a charge accumulation unit operable to accumulate the charge obtained by the light receiving unit and obtain a charge signal;
  a signal processing unit operable to calculate distance information based on the charge signal;
  a distance image generation unit operable to generate a distance image having a first number of pixels based on the distance information;
  a distance image storage unit operable to store the distance image;
  an imaging unit operable to convert the second light component separated by the color separation unit to an image generation charge signal;
  a high resolution image generation unit operable to generate a high resolution image having pixels more than the first number of pixels based on the image generation charge signal obtained by the imaging unit;
  a high resolution image storage unit operable to store the high resolution image;
  a motion vector detection unit operable to detect a motion vector by comparing a high resolution image Img_color(t) that is obtained at a predetermined unit timing t by the high resolution image generation unit and a high resolution image Img_color(t−α) that is obtained at a timing (t−α) preceding the predetermined unit timing t and stored in the high resolution image storage unit; and
  a distance image correction unit operable to correct distance information of a target pixel of the distance image based on a distance image Img_distance(t) that is obtained at the predetermined unit timing t by the distance image generation unit, a distance image Img_distance(t−α) that is obtained at the timing (t−α) preceding the predetermined unit timing t and stored in the distance image storage unit, and a motion vector that is detected by the motion vector detection unit.

5. A distance estimation apparatus that illuminates an object with light having a modulated light intensity and estimates a distance to an object using reflected light from the object, the apparatus comprising:
  a light source operable to emit light whose light intensity can be modulated;
  a light source control unit operable to control the light source;
  a light receiving optical system operable to focus light from the object;
  a light receiving unit operable to convert the light received by the light receiving optical system to obtain charge;
  a charge accumulation unit operable to accumulate the charge obtained by the light receiving unit and obtain a charge signal;
  a signal processing unit operable to calculate distance information based on the charge signal;
  a distance image generation unit operable to generate a distance image based on the distance information;
  a distance reliability calculation unit operable to calculate a reliability of a pixel of the distance image based on at least one of the distance information and the charge signal; and
  a distance image correction unit operable to correct distance information of the pixel of the distance image based on the reliability calculated by the distance reliability calculation unit.

6. The distance estimation apparatus according to claim 5, wherein the reliability calculation unit calculates the reliability in a manner that a value of the reliability is smaller as a value of distance information of a target pixel of the distance image is larger.

7. The distance estimation apparatus according to claim 5, wherein the reliability calculation unit calculates the reliability in a manner that a value of the reliability is smaller as an amplitude value of the charge signal corresponding to a target pixel of the distance image is smaller.

8. A distance estimation method for illuminating an object with light having a modulated light intensity and estimating a distance to an object using reflected light from the object, the method being used by a distance estimation apparatus including a light source operable to emit light whose light intensity can be modulated, a light receiving optical system operable to focus light from the object, a color separation unit operable to separate light received by the light receiving optical system into a first light component and a second light component based on a frequency of the light, a light receiving unit operable to convert the second light component separated by the color separation unit to obtain charge, a charge accumulation unit operable to accumulate the charge obtained by the light receiving unit and obtain a charge signal, and an imaging unit operable to convert the second light component separated by the color separation unit to an image generation charge signal, the method comprising:
controlling the light source;
calculating distance information based on the charge signal;
generating a distance image having a first number of pixels based on the distance information;
generating a high resolution image having pixels more than the first number of pixels based on the image generation charge signal obtained by the imaging unit;
extracting edge information from the high resolution image generated in the high resolution image generation step; and
correcting distance information of a target pixel of the distance image based on a neighboring pixel of the target pixel in the distance image and based on the edge information extracted in the edge information extraction step.

9. A distance estimation method for illuminating an object with light having a modulated light intensity and estimating a distance to an object using reflected light from the object, the method being used by a distance estimation apparatus including a light source operable to emit light whose light intensity can be modulated, a light receiving optical system operable to focus light from the object, a color separation unit operable to separate light received by the light receiving optical system into a first light component and a second light component based on a frequency of the light, a light receiving unit operable to convert the second light component separated by the color separation unit to obtain charge, a charge accumulation unit operable to accumulate the charge obtained by the light receiving unit and obtain a charge signal, and an imaging unit operable to convert the second light component separated by the color separation unit to an image generation charge signal, the method comprising:
controlling the light source;
calculating distance information based on the charge signal;
generating a distance image having a first number of pixels based on the distance information;
storing the distance image;
generating a high resolution image having pixels more than the first number of pixels based on the image generation charge signal obtained by the imaging unit;
storing the high resolution image;
detecting a motion vector by comparing a high resolution image Img_color(t) that is obtained at a predetermined unit timing t in the high resolution image generation step and a high resolution image Img_color(t−α) that is obtained at a timing (t−α) preceding the predetermined unit timing t and stored in the high resolution image storage step; and
correcting distance information of a target pixel of the distance image based on a distance image Img_distance (t) that is obtained at the predetermined unit timing t in the distance image generation step, a distance image Img_distance(t−α) that is obtained at the timing (t−α) preceding the predetermined unit timing t and stored in the distance image storage step, and a motion vector that is detected in the motion vector detection step.

10. A distance estimation method for illuminating an object with light having a modulated light intensity and estimating a distance to an object using reflected light from the object, the method being used by a distance estimation apparatus including a light source operable to emit light whose light intensity can be modulated, a light receiving optical system operable to focus light from the object, a light receiving unit operable to convert the light received by the light receiving optical system to obtain charge, and a charge accumulation unit operable to accumulate the charge obtained by the light receiving unit and obtain a charge signal,
the method comprising:
controlling the light source;
calculating distance information based on the charge signal;
generating a distance image based on the distance information;
calculating a reliability of a pixel of the distance image based on at least one of the distance information and the charge signal; and
correcting distance information of the pixel of the distance image based on the reliability calculated in the distance reliability calculation step.

11. A storage medium storing a distance estimation program for illuminating an object with light having a modulated light intensity and estimating a distance to an object using reflected light from the object, the program enabling a computer to implement a distance estimation method used by a distance estimation apparatus including a light source operable to emit light whose light intensity can be modulated, a light receiving optical system operable to focus light from the object, a color separation unit operable to separate light received by the light receiving optical system into a first light component and a second light component based on a frequency of the light, a light receiving unit operable to convert the second light component separated by the color separation unit to obtain charge, a charge accumulation unit operable to accumulate the charge obtained by the light receiving unit and obtain a charge signal, and an imaging unit operable to convert the second light component separated by the color separation unit to an image generation charge signal,
the storage medium storing the program enabling a computer to implement the method comprising:
controlling the light source;
calculating distance information based on the charge signal;
generating a distance image having a first number of pixels based on the distance information;
generating a high resolution image having pixels more than the first number of pixels based on the image generation charge signal obtained by the imaging unit;
extracting edge information from the high resolution image generated in the high resolution image generation step; and
correcting distance information of a target pixel of the distance image based on a neighboring pixel of the target pixel in the distance image and based on the edge information extracted in the edge information extraction step.

12. A storage medium storing a distance estimation program for illuminating an object with light having a modulated light intensity and estimating a distance to an object using reflected light from the object, the program enabling a computer to implement a distance estimation method used by a distance estimation apparatus including a light source operable to emit light whose light intensity can be modulated, a light receiving optical system operable to focus light from the object, a color separation unit operable to separate light received by the light receiving optical system into a first light component and a second light component based on a frequency of the light, a light receiving unit operable to convert the second light component separated by the color separation unit to obtain charge, a charge accumulation unit operable to accumulate the charge obtained by the light receiving unit and obtain a charge signal, and an imaging unit operable to convert the second light component separated by the color separation unit to an image generation charge signal, the storage medium storing the program enabling a computer to implement the method comprising:
controlling the light source;
calculating distance information based on the charge signal;
generating a distance image having a first number of pixels based on the distance information;
storing the distance image;
generating a high resolution image having pixels more than the first number of pixels based on the image generation charge signal obtained by the imaging unit;
storing the high resolution image;
detecting a motion vector by comparing a high resolution image Img_color(t) that is obtained at a predetermined unit timing t in the high resolution image generation step and a high resolution image Img_color(t−α) that is obtained at a timing (t−α) preceding the predetermined unit timing t and stored in the high resolution image storage step; and
correcting distance information of a target pixel of the distance image based on a distance image Img_distance (t) that is obtained at the predetermined unit timing t in the distance image generation step, a distance image Img_distance(t−α) that is obtained at the timing (t−α) preceding the predetermined unit timing t and stored in the distance image storage step, and a motion vector that is detected in the motion vector detection step.

13. A storage medium storing a distance estimation program for illuminating an object with light having a modulated light intensity and estimating a distance to an object using reflected light from the object, the program enabling a computer to implement a distance estimation method used by a distance estimation apparatus including a light source operable to emit light whose light intensity can be modulated, a light receiving optical system operable to focus light from the object, a light receiving unit operable to convert the light received by the light receiving optical system to obtain charge, and a charge accumulation unit operable to accumulate the charge obtained by the light receiving unit and obtain a charge signal, the storage medium storing the program enabling a computer to implement the method comprising:
controlling the light source;
calculating distance information based on the charge signal;
generating a distance image based on the distance information;
calculating a reliability of a pixel of the distance image based on at least one of the distance information and the charge signal; and
correcting distance information of the pixel of the distance image based on the reliability calculated in the distance reliability calculation step.

14. An integrated circuit used in a distance estimation apparatus that illuminates an object with light having a modulated light intensity and estimates a distance to an object using reflected light from the object, wherein the distance estimation apparatus includes a light source operable to emit light whose light intensity can be modulated, a light receiving optical system operable to focus light from the object, a color separation unit operable to separate light received by the light receiving optical system into a first light component and a second light component based on a frequency of the light, a light receiving unit operable to convert the second light component separated by the color separation unit to obtain charge, a charge accumulation unit operable to accumulate the charge obtained by the light receiving unit and obtain a charge signal, and an imaging unit operable to convert the second light component separated by the color separation unit to an image generation charge signal, the integrated circuit comprising:
a light source control unit operable to control the light source;
a signal processing unit operable to calculate distance information based on the charge signal;
a distance image generation unit operable to generate a distance image having a first number of pixels based on the distance information;
a high resolution image generation unit operable to generate a high resolution image having pixels more than the first number of pixels based on the image generation charge signal obtained by the imaging unit;
an edge information extraction unit operable to extract edge information from the high resolution image generated by the high resolution image generation unit; and
a distance image correction unit operable to correct distance information of a target pixel of the distance image based on a neighboring pixel of the target pixel in the distance image and based on the edge information extracted by the edge information extraction unit.

15. An integrated circuit used in a distance estimation apparatus that illuminates an object with light having a modulated light intensity and estimates a distance to an object using reflected light from the object, wherein the distance estimation apparatus includes a light source operable to emit light whose light intensity can be modulated, a light receiving optical system operable to focus light from the object, a color separation unit operable to separate light received by the light receiving optical system into a first light component and a second light component based on a frequency of the light, a light receiving unit operable to convert the second light component separated by the color separation unit to obtain charge, a charge accumulation unit operable to accumulate the charge obtained by the light receiving unit and obtain a charge signal, and an imaging unit operable to convert the second light component separated by the color separation unit to an image generation charge signal, the integrated circuit comprising:
a light source control unit operable to control the light source;
a signal processing unit operable to calculate distance information based on the charge signal;
a distance image generation unit operable to generate a distance image having a first number of pixels based on the distance information;
a distance image storage unit operable to store the distance image;
a high resolution image generation unit operable to generate a high resolution image having pixels more than the first number of pixels based on the image generation charge signal obtained by the imaging unit;
a high resolution image storage unit operable to store the high resolution image;
a motion vector detection unit operable to detect a motion vector by comparing a high resolution image Img_color (t) that is obtained at a predetermined unit timing t by the high resolution image generation unit and a high resolution image Img_color(t−α) that is obtained at a timing (t−α) preceding the predetermined unit timing t and stored in the high resolution image storage unit; and
a distance image correction unit operable to correct distance information of a target pixel of the distance image based on a distance image Img_distance(t) that is obtained at the predetermined unit timing t by the distance image generation unit, a distance image Img_distance(t−α) that is obtained at the timing (t−α) preceding the predetermined unit timing t and stored in the distance image storage unit, and a motion vector that is detected by the motion vector detection unit.

16. An integrated circuit used in a distance estimation apparatus that illuminates an object with light having a modulated light intensity and estimates a distance to an object using reflected light from the object, wherein the distance estimation apparatus includes a light source operable to emit light whose light intensity can be modulated, a light receiving optical system operable to focus light from the object, a light receiving unit operable to convert the light received by the light receiving optical system to obtain charge, and a charge accumulation unit operable to accumulate the charge obtained by the light receiving unit and obtain a charge signal, the integrated circuit comprising:

a light source control unit operable to control the light source;

a signal processing unit operable to calculate distance information based on the charge signal;

a distance image generation unit operable to generate a distance image based on the distance information;

a distance reliability calculation unit operable to calculate a reliability of a pixel of the distance image based on at least one of the distance information and the charge signal; and a distance image correction unit operable to correct distance information of the pixel of the distance image based on the reliability calculated by the distance reliability calculation unit.

* * * * *